United States Patent Office 3,293,693
Patented Dec. 27, 1966

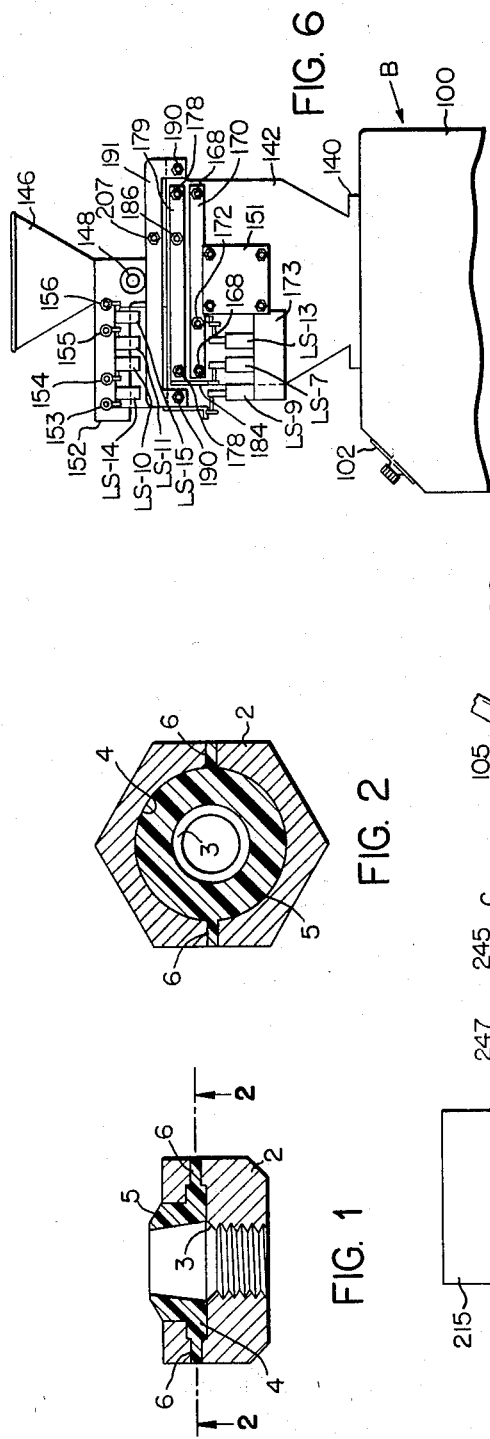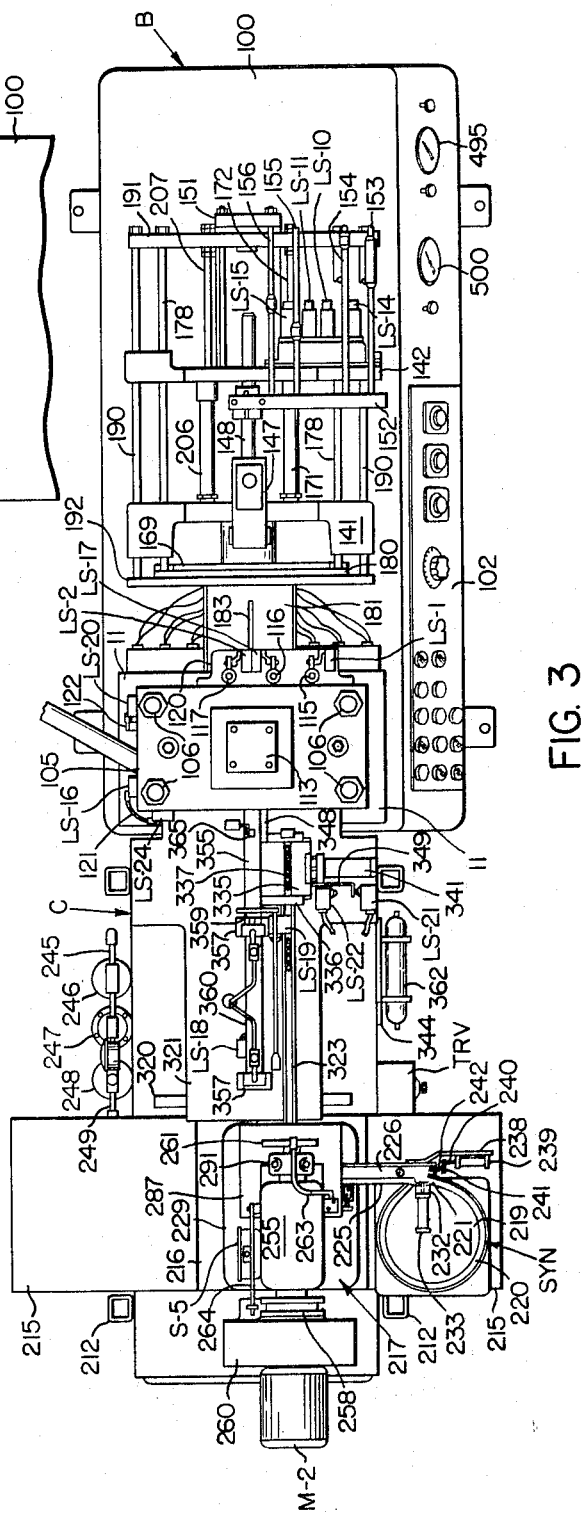

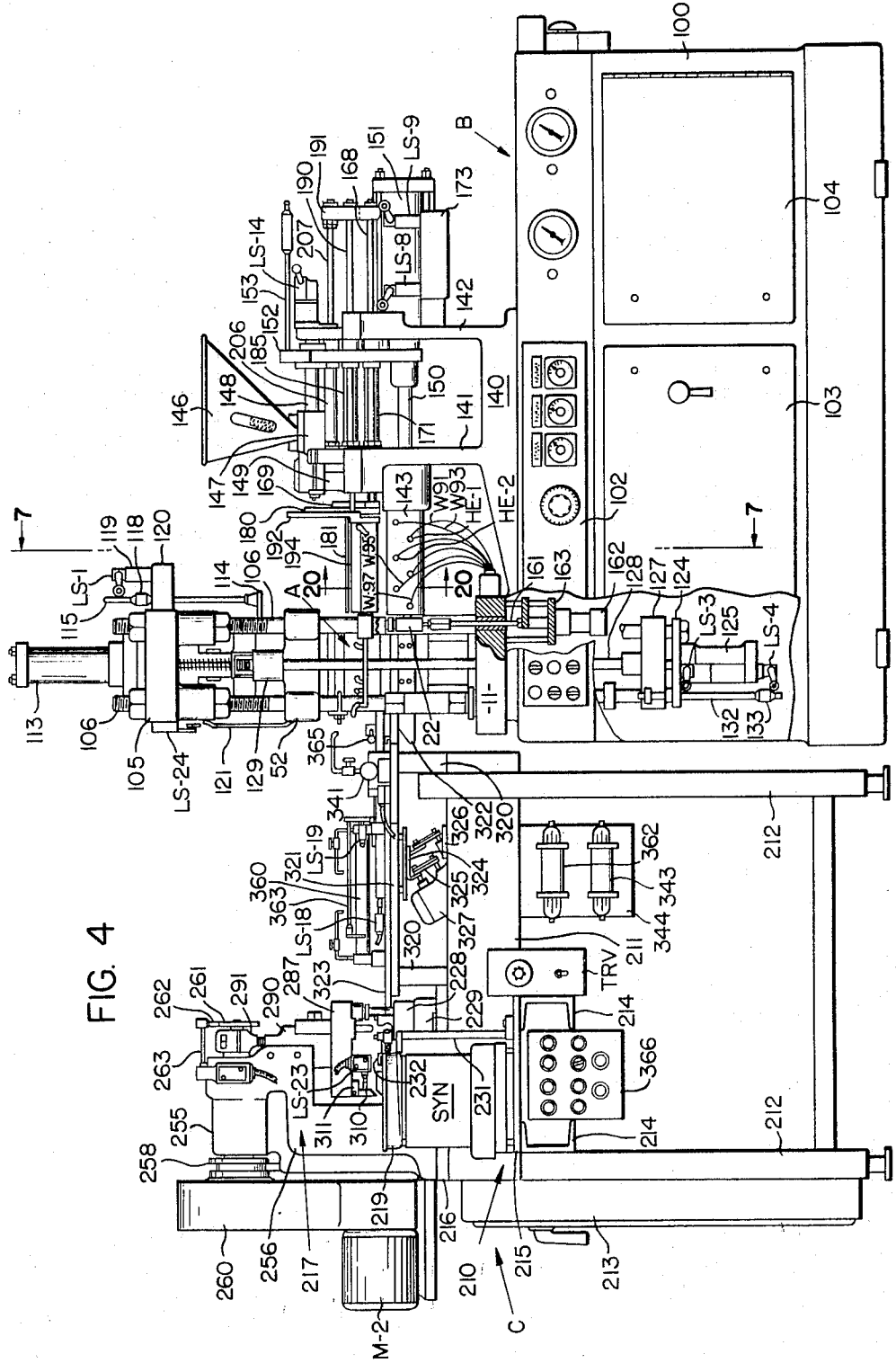

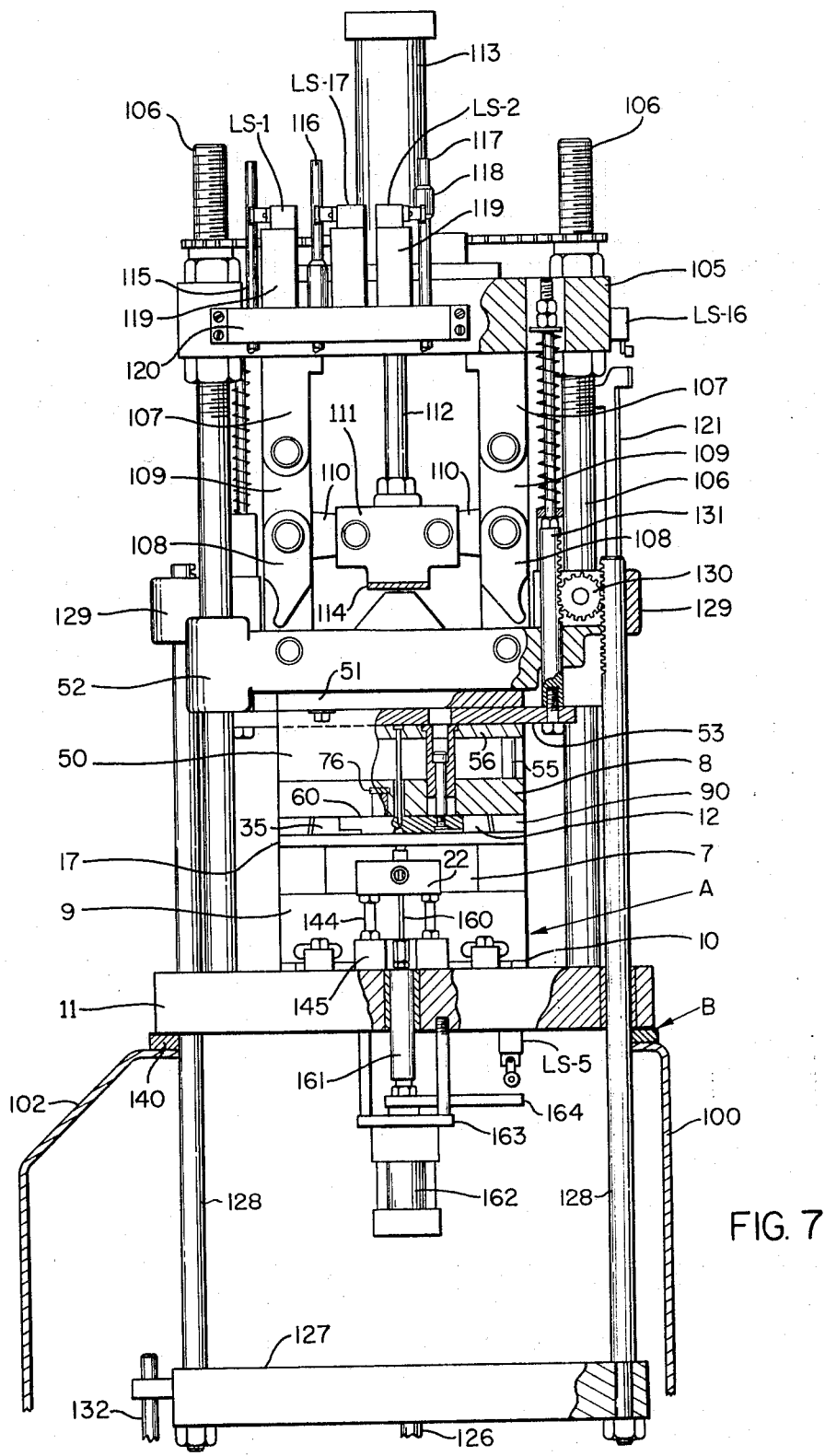

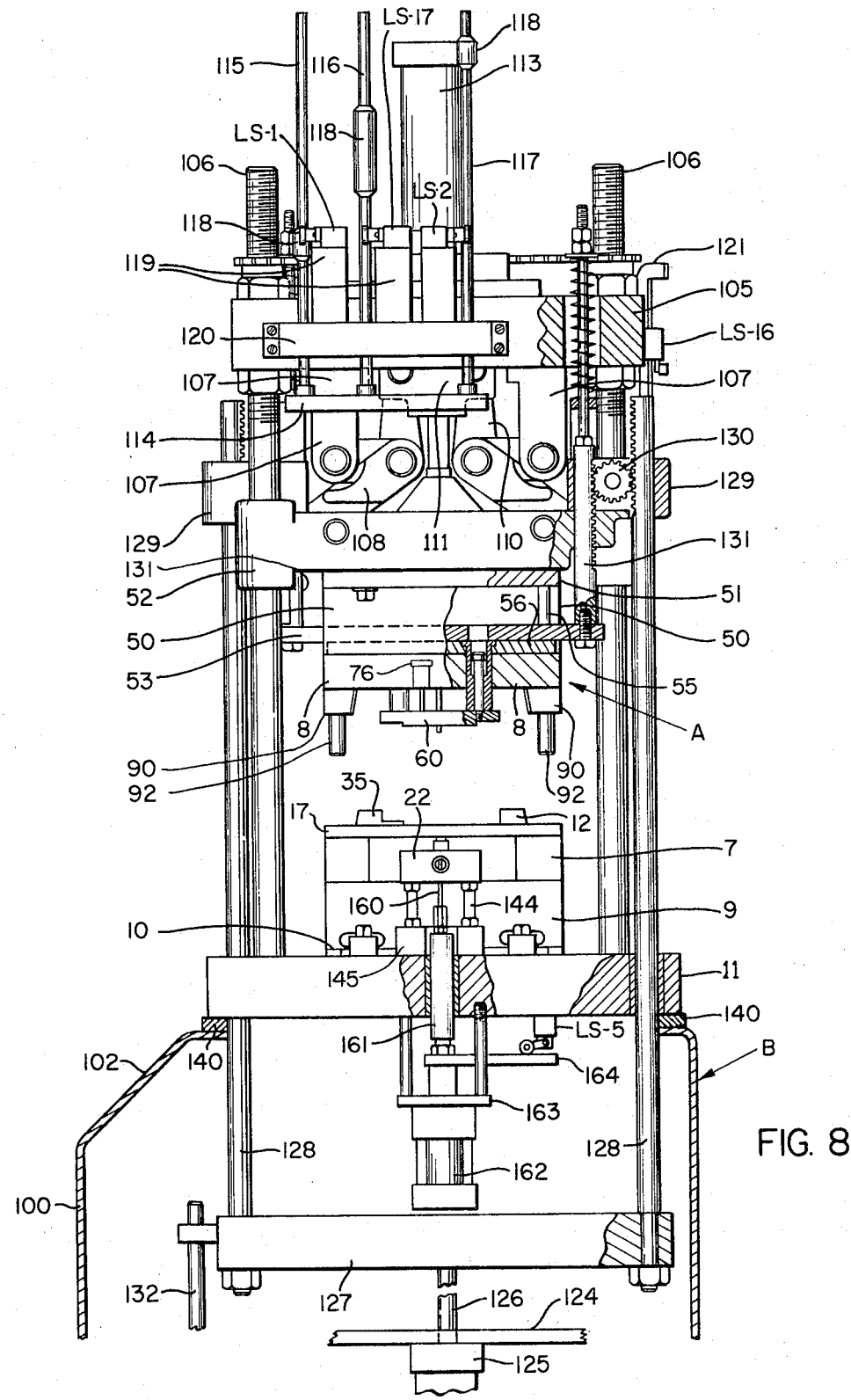

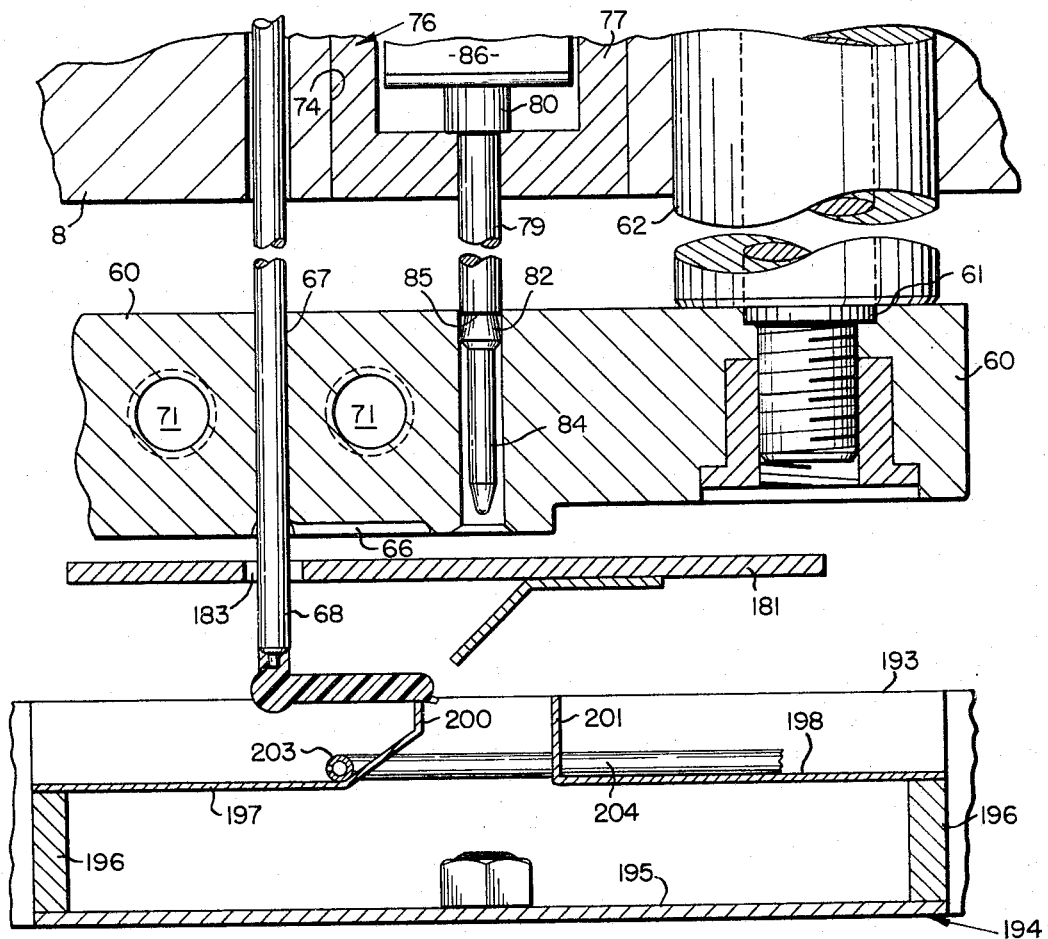
FIG. 16
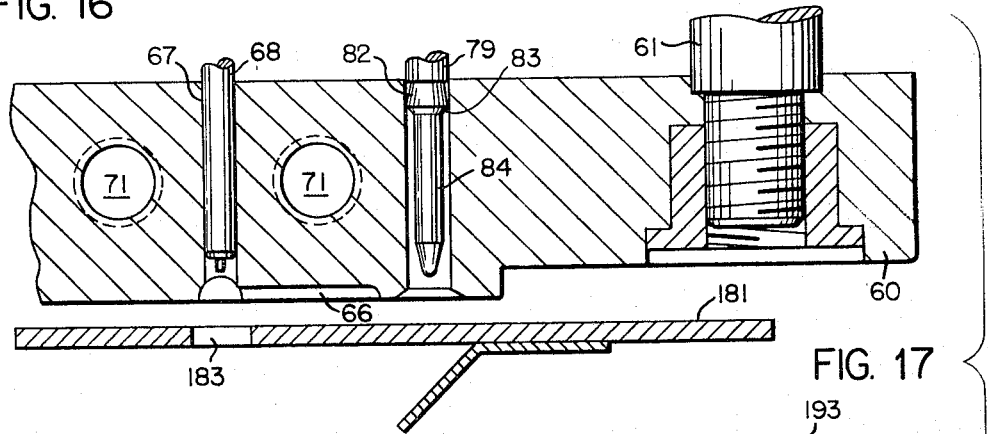
FIG. 17
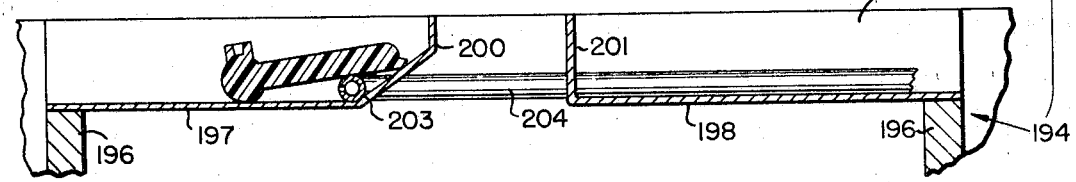

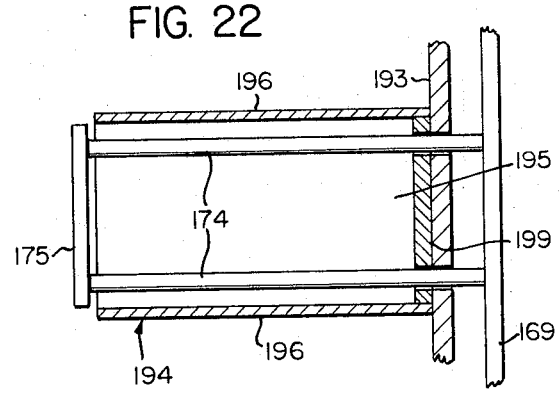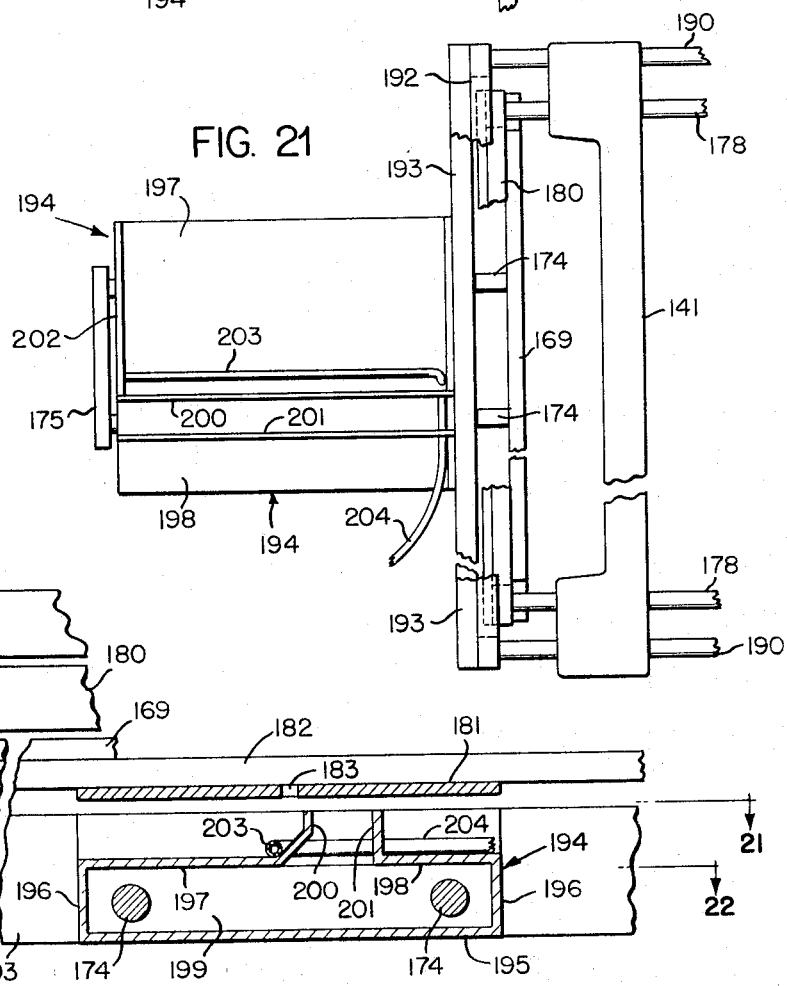

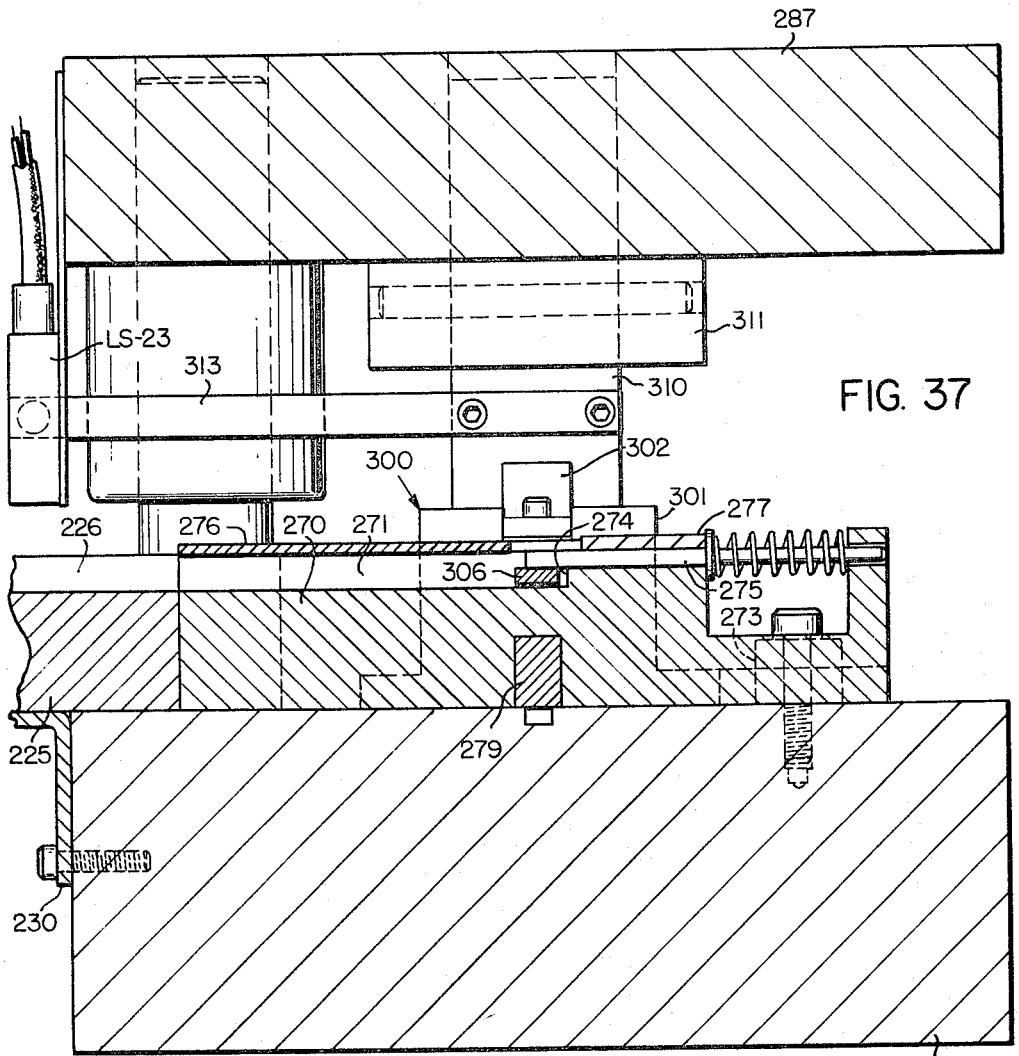
FIG. 37
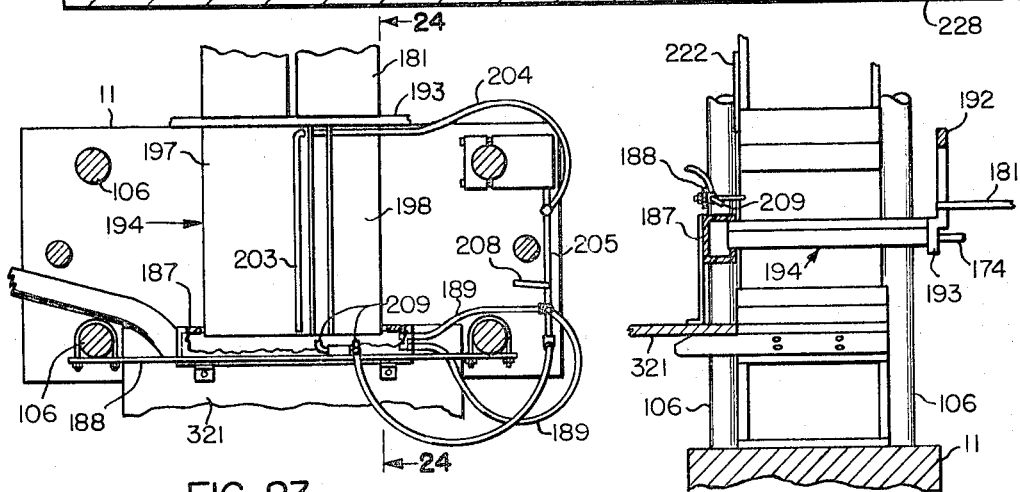
FIG. 23
FIG. 24

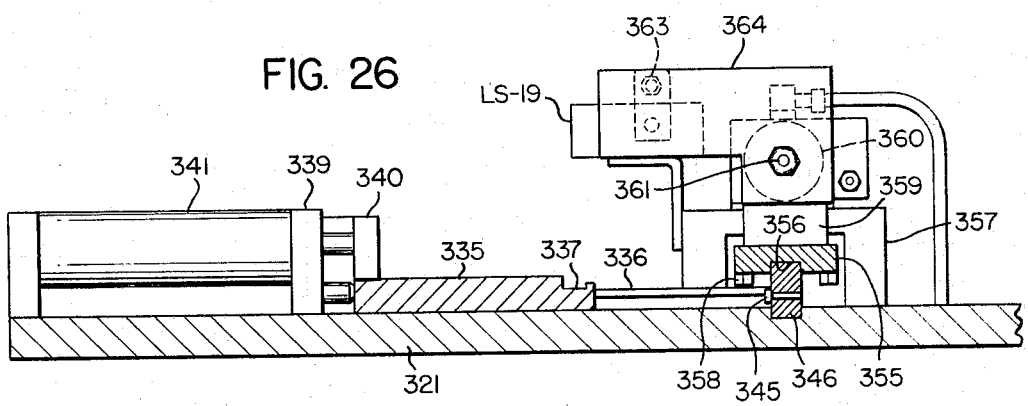
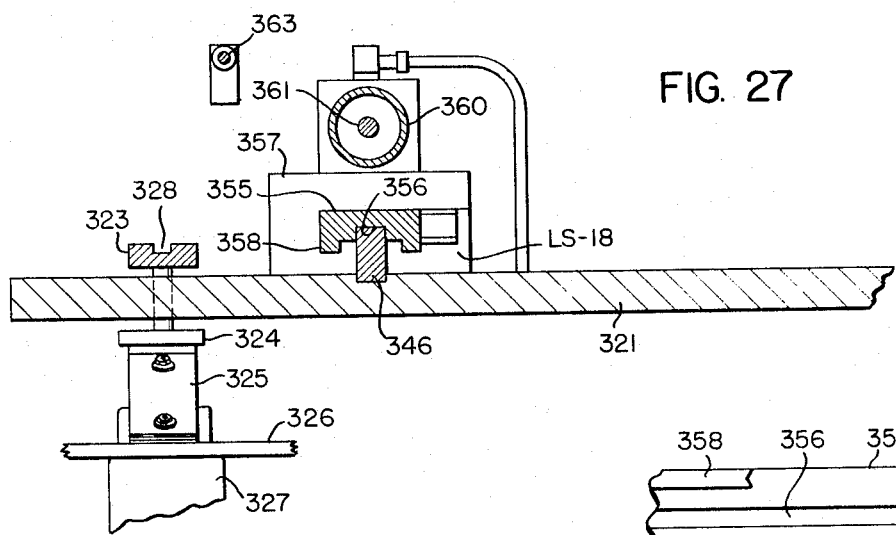
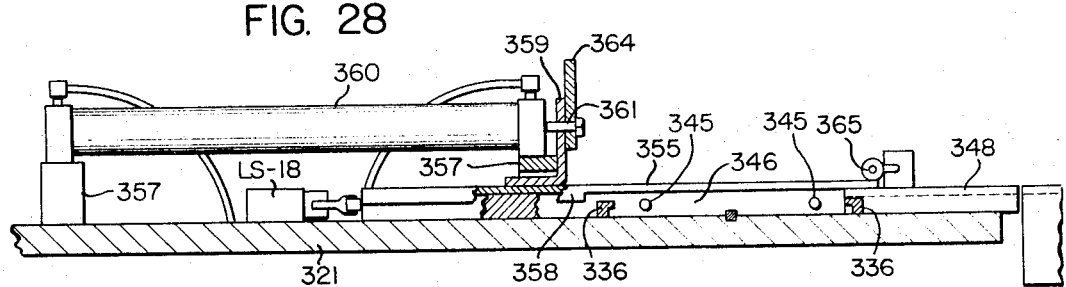

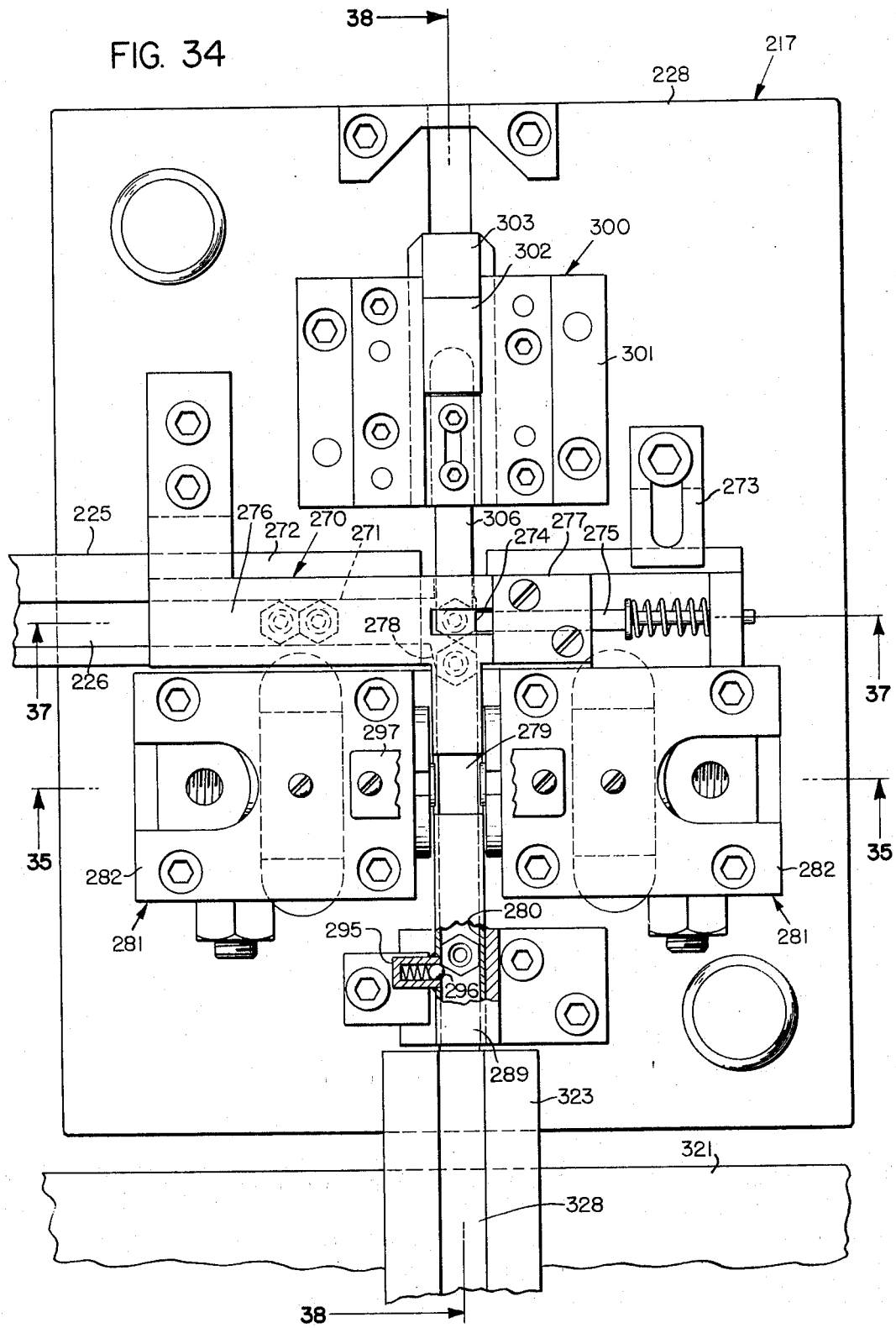

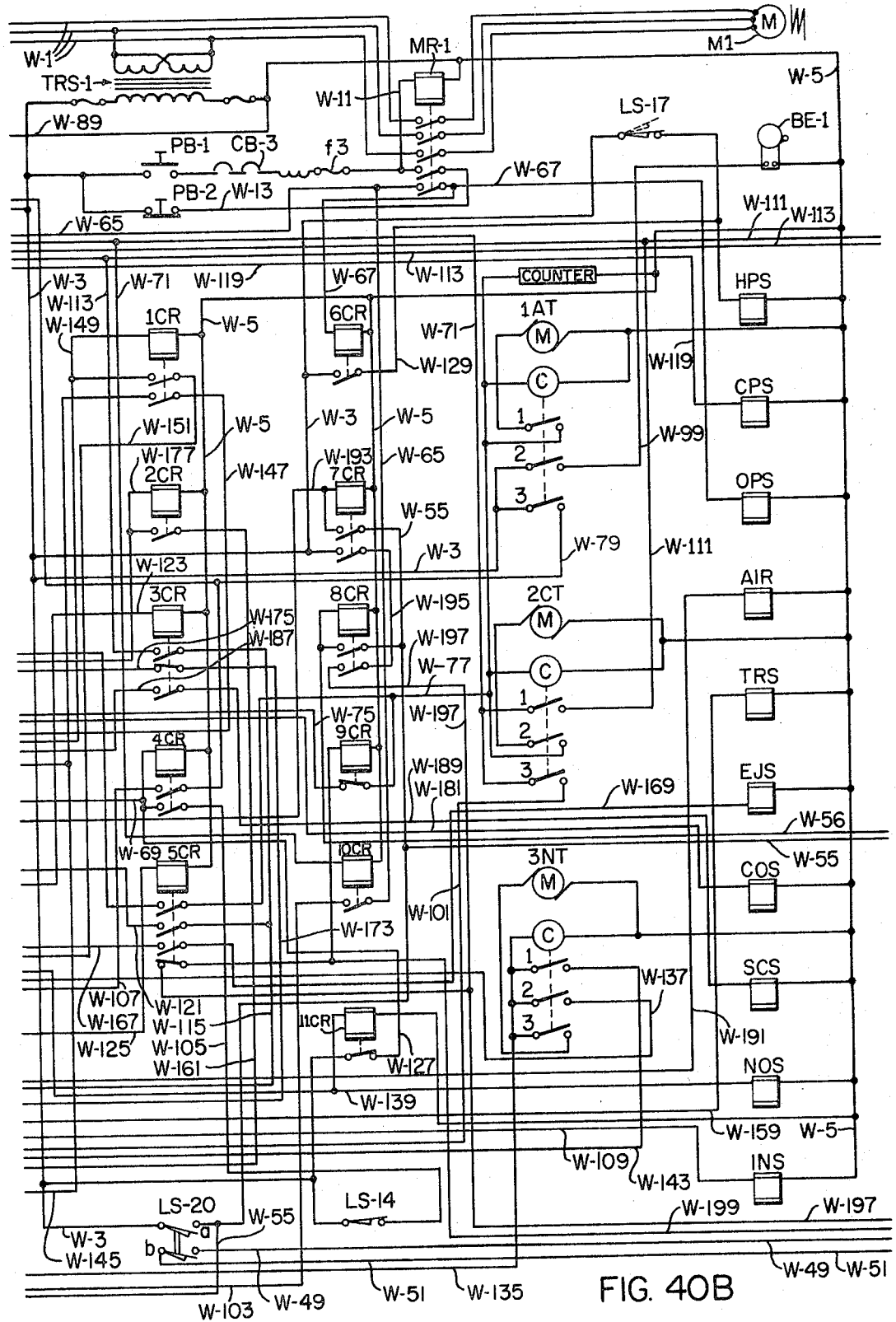

3,293,693
APPARATUS FOR FORMING PLASTIC LOCKING INSERTS IN NUTS
David Ohl, Rochester, N.Y., and Charles C. Davis, Jr., Princeton, N.J., assignors, by mesne assignments, to Standard Pressed Steel Co., Jenkintown, Pa., a corporation of Pennsylvania
Filed Apr. 12, 1963, Ser. No. 272,625
33 Claims. (Cl. 18—30)

The present invention relates to an apparatus for molding plastic in metal bodies, particularly lock nuts.

An object of the invention is to provide a machine having a mold formed with a cavity for receiving a metallic body having a recess and an injection aperture extending between the recess and a side wall of the body with means for alining the body so the injection aperture is registered with an injection nozzle carried by the mold so plastic may be injected through the injection nozzle into the recess in the metal body with means operating upon completion of the molding of plastic material in the recess for sliding the body in the cavity relative to the injection nozzle to shear the plastic between the body and the injection nozzle along the surface of the wall of the body about the injection aperture and subsequently discharge the molded article from the machine.

Another object of the invention resides in forming a mold in two sections movable between open and closed positions having a cavity for receiving an article formed with a recess and an injection aperture extending between the recess and a side wall of the article, in which an injection nozzle formed in the mold opens into the cavity in a position to register with the injection aperture in the article when the mold is closed with a locating member cooperating with the article in the mold to hold the article with the injection aperture in registry with the injection nozzle in the mold and also for moving the article to offset the injection aperture relative to the injection nozzle to shear the plastic along the surface of the article and subsequently move the article outwardly from the cavity so it may be readily removed from the mold after the mold is moved to open position.

A further object of the invention is to provide a machine for molding plastic lock nuts in which the metallic nut body has a recess in one end thereof about the bolt receiving bore formed therein and an injection aperture extending between the recess and opening through one side of the nut body, in which a mold formed of a pair of sections has one section formed with a cavity for receiving the nut body, an injection nozzle formed in the mold communicates with the cavity and a locating means arranged on the mold cooperates with both mold sections to form a portion of the cavity for locating a nut in the cavity with the injection aperture registered with the injection nozzle in the mold, while a mold pin mounted on one of the mold sections engages in the bore in the nut body when the mold sections are closed to define the bolt receiving opening through the nut body and throughout the recessed portion thereof to form the inner wall of the recess in the nut body while means is provided for injecting plastic through the mold and injection nozzle into the recess in the nut body while located in the cavity about the mold pin so the mold pin and locating member subsequently cooperate to remove the nut from the cavity with the locating member moving the nut body along the wall of the cavity formed with the injection nozzle to shear the plastic along the sidewall of the nut for subsequent removal from the cavity and the mold as the mold opens and further removal from the mold pin and discharge from the machine.

A still further object of the invention is to provide a machine for simultaneously molding a plurality of nuts having means for locating each of the nuts with injection apertures extending through the side walls thereof in registry with injection nozzles formed in the mold, then inserting mold pins in each of the nuts to form the inner face of the recesses in the nut bodies, molding of plastic in the nut bodies through injection of plastic materials through the mold and the injection nozzles into the recesses in each nut body through the injection apertures therein, shearing of the plastic along the side walls of the nut bodies, removal of the nuts from a cavity in the mold on the mold pins and means for subsequently removing the nuts from the mold pins and discharge them from the machine.

Another object of the invention resides in providing a machine for automatically molding one or more nuts by feeding the nuts into a mold in oriented position with injection apertures positioned to register with injection nozzles in the mold and means for alining the injection apertures and nozzles when the mold is closed while other means holds the nuts tightly against the mold in position against the injection nozzles so means injecting plastic through channels in the mold into the injection apertures in the nut bodies will fill the recesses in the nut bodies and injection apertures with subsequent operation of the machine to shear the plastic along the sides of the nut bodies, remove the nuts from the cavity in the mold and automatically discharge them from the machine.

A further object of the invention is to provide an automatic machine having means for receiving a supply of nuts, means for feeding nuts in oriented position from the supply into a punch where the punch forms injection apertures in a side wall of the nut body to communicate with a recess in the nut body about the bolt receiving bore therein, means for feeding the nuts into a mold in oriented position to aline the injection apertures with injection nozzles in the mold and inject plastic through the injection nozzles and apertures into the recesses in the nut bodies, and means for automatically severing the plastic along the side walls of the nut bodies and subsequently removing the nuts from the cavity or guideway in the mold and automatically discharging them from the machine.

FIG. 1 is a vertical cross section through a lock nut having a molded plastic locking insert molded in a recess in the nut body about the bore formed therein through an injection aperture connecting the recess with an outside wall of the nut body;

FIG. 2 is a cross section taken substantially on line 2—2 of FIG. 1;

FIG. 3 is a plan view diagrammatically illustrating a machine for feeding and molding the plastic locking inserts in a plurality of nuts according to the invention;

FIG. 4 is a diagrammatic front elevation of the machine for making molded lock nuts with portions broken away to show details of construction;

FIG. 6 is a diagrammatic end elevation of the machine looking from the right as shown in FIG. 4, with the lower portion broken away;

FIG. 7 is a vertical transverse cross section on a larger scale taken approximately on the line 7—7 of FIG. 4 showing the mold in closed position and the mold mounting and operating mechanism in side elevation with portions broken away and shown in cross section to illustrate details of construction and the lower portion of the casing and supporting structure omitted;

FIG. 8 is a view similar to FIG. 7 showing the mold in open position with portions broken away and shown in cross section to illustrate details of construction;

FIG. 16 is a fragmentary detail view illustrating the upper movable mold section after it has been moved to open position and the ejector plate has been moved downwardly away from the upper mold section to eject the nuts from the mold pins, with the tray and comb in position for receiving the nuts upon discharge from the mold pins and the sprue when it is discharged from the sprue pins;

FIG. 17 is a fragmentary view similar to FIG. 16 showing another position of the parts during operation in which the sprue pins have been retracted through the ejector plate and engaged the sprue with the comb for removing it with the sprue discharged into the tray;

FIG. 20 is a vertical cross section taken approximately on line 20—20 of FIG. 4 for showing the tray, comb and scraper construction and mounting diagrammatically on an enlarged scale;

FIG. 21 is a cross section taken approximately on line 21—21 of FIG. 20;

FIG. 22 is a cross section taken approximately on line 22—22 of FIG. 20;

FIG. 23 is an enlarged fragmentary plan view showing the nut discharge casing and air nozzles;

FIG. 24 is a cross section taken approximately on line 24—24 of FIG. 23 illustrating a fragment of the tray engaged in the casing in position for discharging nuts by the operation of the scraper into the discharge casing;

FIG. 26 is a transverse cross section on an enlarged scale taken approximately on line 26—26 of FIG. 25;

FIG. 27 is a cross section on an enlarged scale taken approximately on line 27—27 of FIG. 25;

FIG. 28 is a cross section on an enlarged scale taken approximately on line 28—28 of FIG. 25;

FIG. 29 is an enlarged fragmentary bottom plan view of the pusher showing the construction of the feeding flange;

FIG. 34 is a plan view of the lower stationary die carrying the nut punching and feed mechanism forming part of the nut punching unit;

FIG. 37 is a cross section taken approximately on line 37—37 of FIG. 34;

FIGS. 40A, 40B and 40C is a wiring diagram showing the electrical connections, relays, switches etc. for securing automatic operation of the machine.

Figure 5:
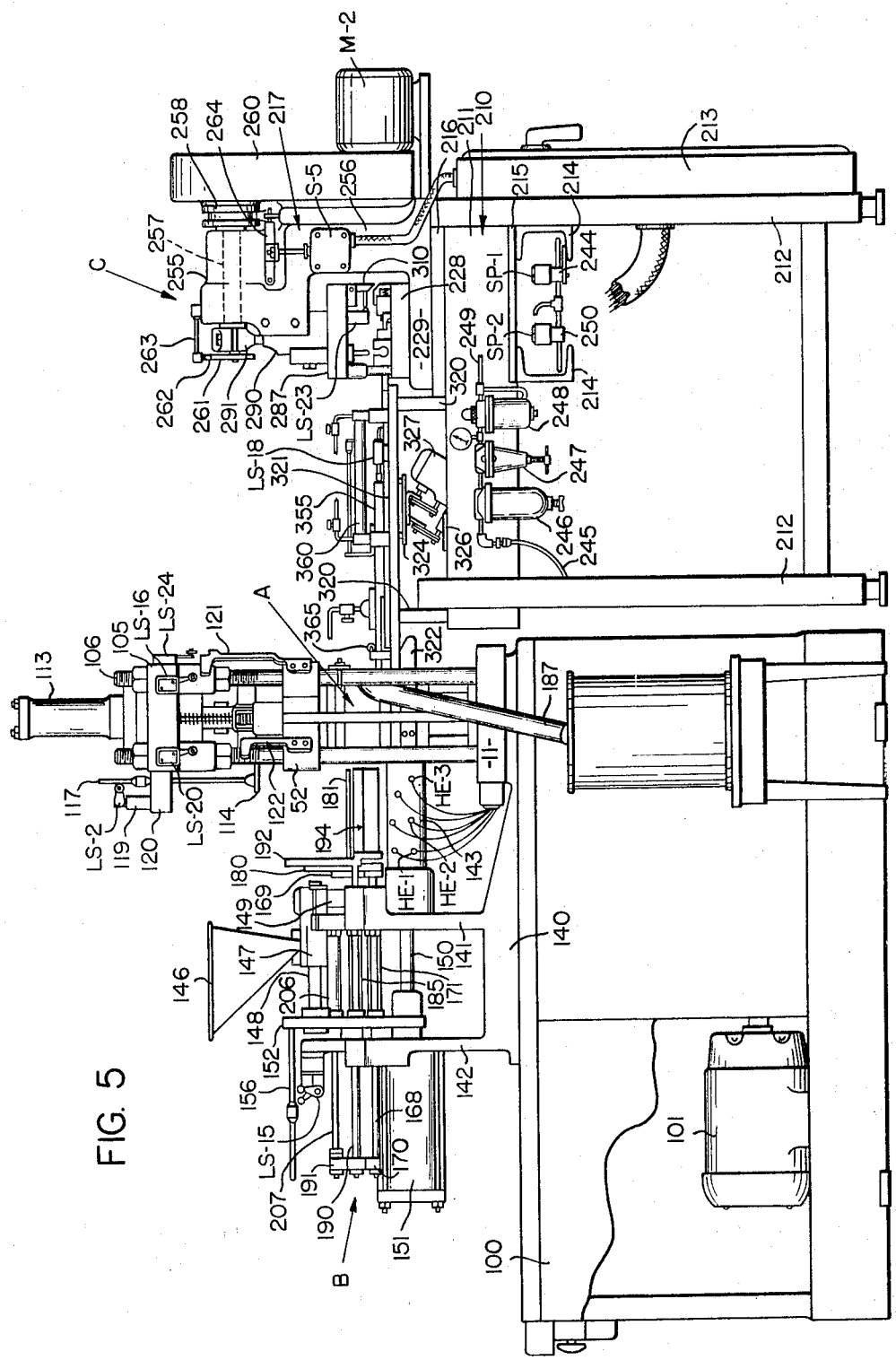
FIG. 5 is a diagrammatic rear elevation of the machine for making molded lock nuts with portions broken away.

The invention is directed to molding plastic in a recess formed in a metallic body and more particularly to molding a plastic locking insert in a recess formed within one end of a nut body about the bolt receiving bore formed therein through an injection aperture extending from the recess through the nut body and opening through one side wall of the nut body. The construction of such an article as a lock nut is shown in FIGS. 1 and 2 and in application Serial No. 418,431, now Patent No. 3,275,054, assigned to the assignee of this invention.

A nut is shown in FIGS. 1 and 2 having a metallic body 2 formed with a threaded bore in one end portion terminating at the inner end in a beveled portion 3, while the opposite end of a nut body 2 is formed with an enlarged recess generally indicated by the numeral 4 for receiving a molded plastic insert 5. An injection aperture 6, two being shown, extends from one outer side wall through the metallic body 2 for communication with the enlarged recess 4. One of these injection apertures 6 is used for injecting plastic into recess 4 for forming the molded plastic insert 5, as illustrated in FIGS. 1 and 2. This construction is shown in the above mentioned applications and the machine forming the present invention provides a mechanism for automatically feeding a plurality of nut bodies 2 and molding the plastic insert 5 into the recess 4, as shown in FIGS. 1 and 2.

The invention provides for the assembly of a group of machine parts which include a mold generally indicated by the letter A shown in assembled relation in the machine in FIGS. 3 to 8.

The mold A forms one of the principal parts of the invention and has a pair of sections, one of which is movable relative to the other during the molding operation which will be hereinafter described in detail. The mold A is mounted in a molding machine B for operating the mold between open and closed positions, see FIGS. 3 to 8. These figures show the mold and molding machine in assembled relation and also show the nut orienting, feeding and punching mechanism indicated generally by the letter C for illustrating the location of the major parts of the machine which will be described individually in greater detail.

The mold structure

The mold A has a stationary bottom section and a movable top section. The bottom section has a bottom support plate 7 and the top section has a movable top support plate 8, see FIGS. 9 and 10. The bottom support plate 7 is supported on a pair of spaced substantially parallel bottom rails 9 supported at opposite ends on bottom bars 10. Suitable bolts or the like extend through the bottom bars 10, bottom rails 9 and engage in bottom support plate 7, as shown in FIG. 10, for securing these parts rigidly together. The bottom rails 10 are mounted on and secured to the bottom platen 11 shown in FIGS. 6 and 7. The bottom rails 9 extend along the side edges of the bottom plate 7 from the front to the rear thereof while the bottom bars 10 extend across the front and rear portions of the bottom support plate 7. The front portion of the mold and molding machine is shown at the left in FIGS. 6 and 7. A filler block 12 extends between opposite sides of the bottom support plate 7 at one side of the center portion thereof, FIGS. 7, 8, 12 and 19. The filler block 12 is rigidly attached to the top face of bottom support plate 7 to form a rigid part of the plate structure.

Figure 10:
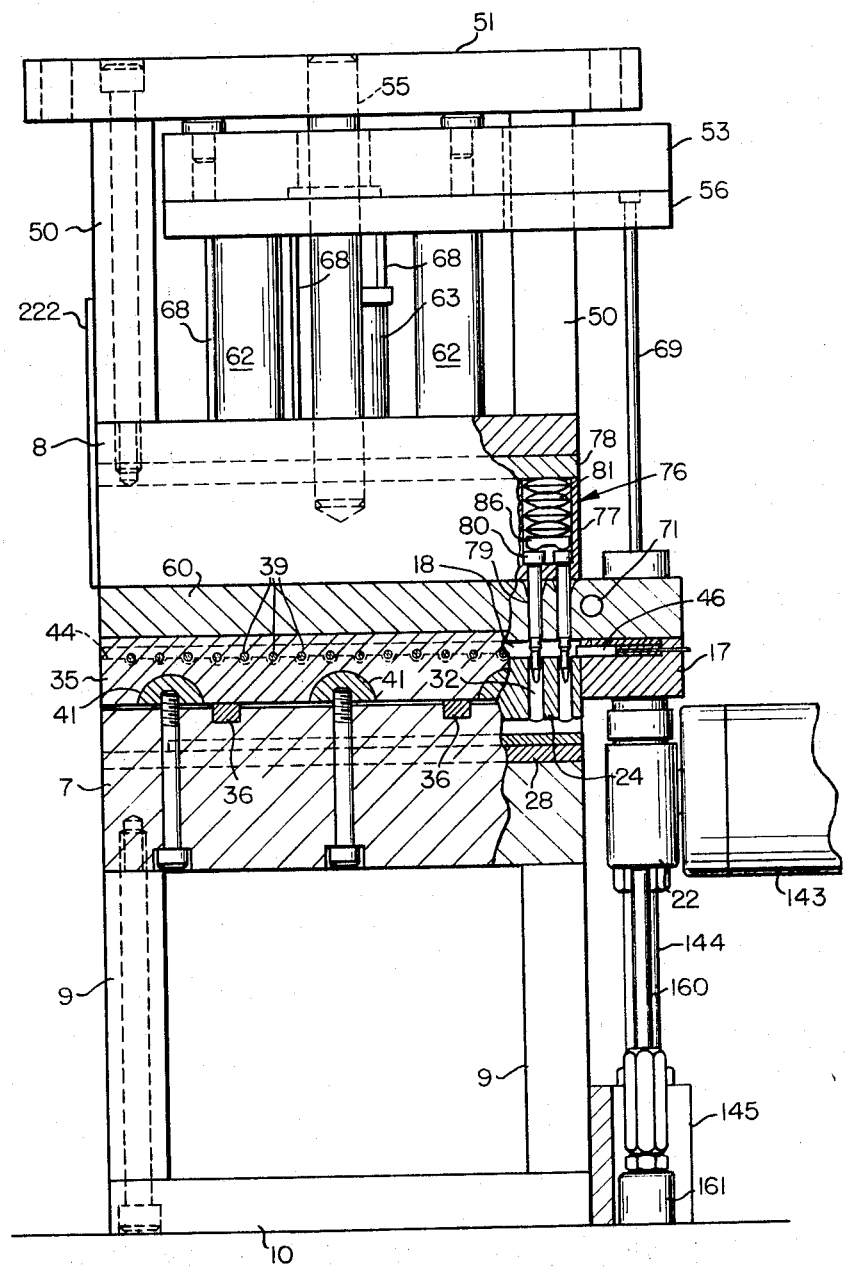
FIG. 10 is a front elevation showing the mold in closed position with portions broken away and shown in cross section to illustrate details of construction of the mold.
Figure 11:
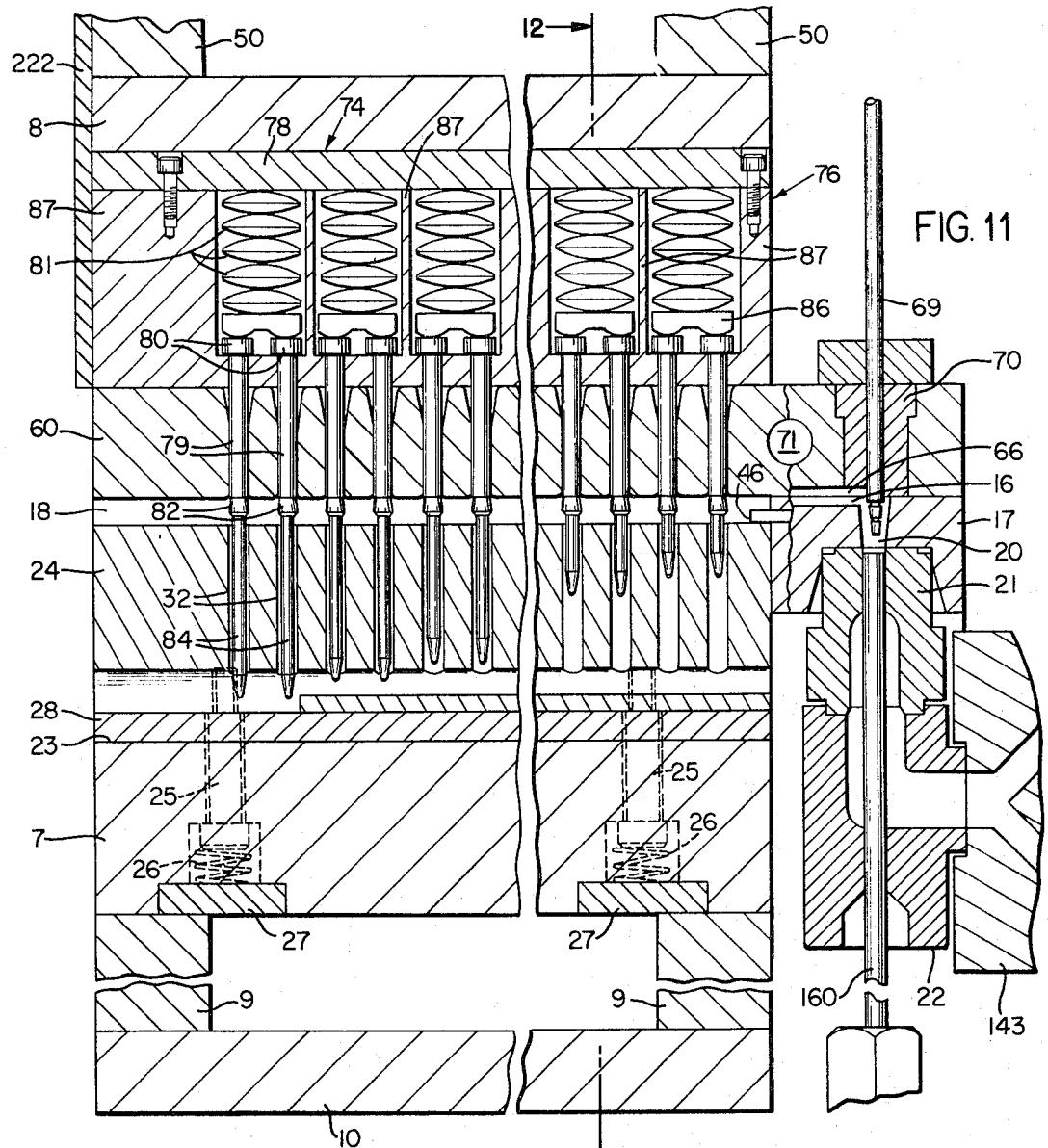
FIG. 11 is a substantially enlarged cross section showing the mold in closed position taken approximately along the line 11—11 of FIG. 9, portions being broken away for convenience in illustrating details of construction.
Figure 12:
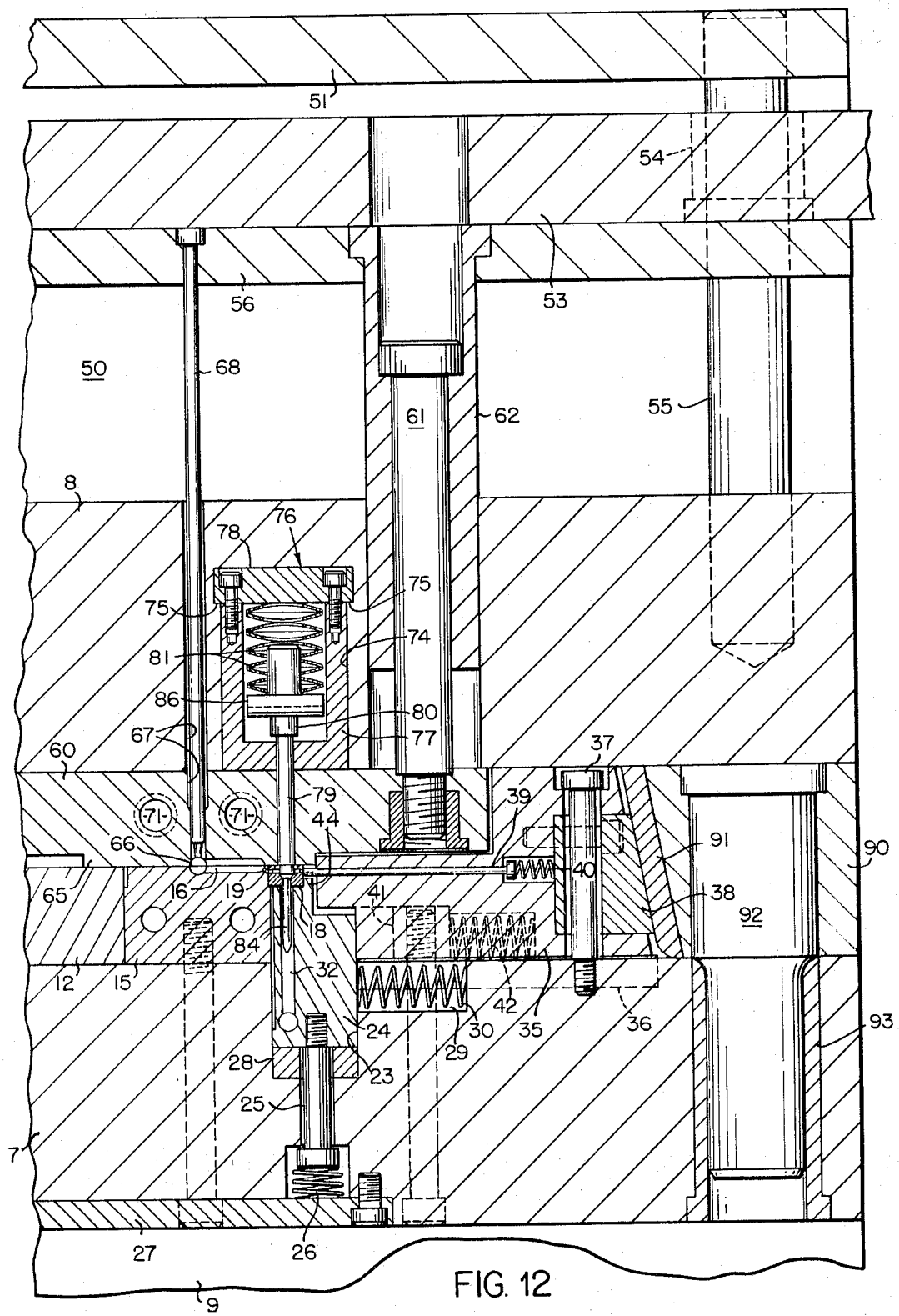
FIG. 12 is a cross section taken approximately on the line 12—12 of FIG. 11 with portions broken away and omitted, for illustrating details of construction of portions of the stationary and movable mold sections in closed position.
Figure 19:
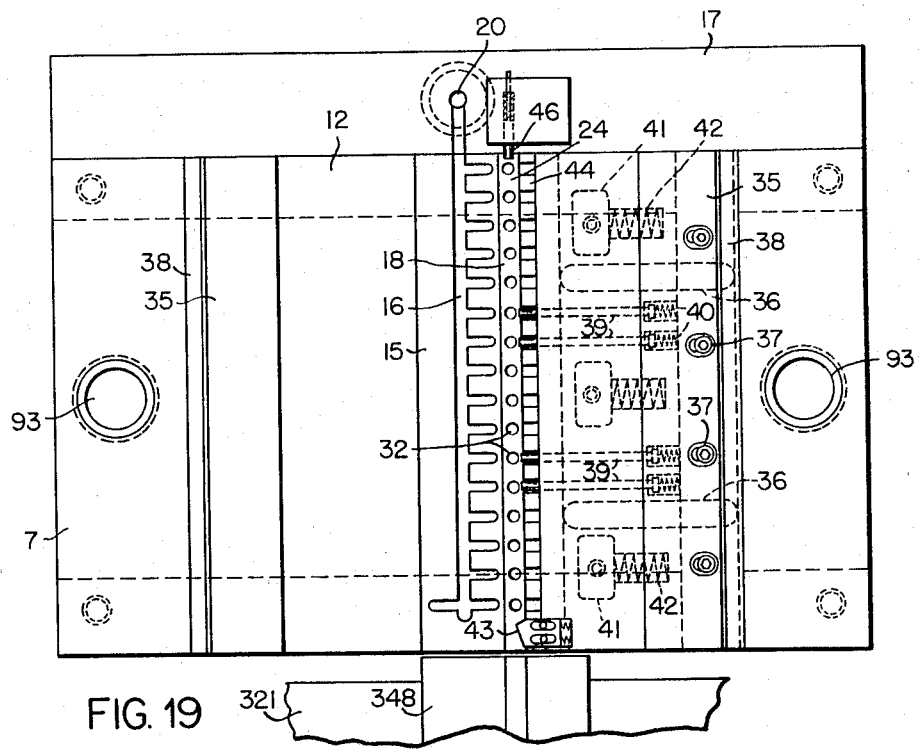
FIG. 19 is a plan view looking down at the top face of the bottom stationary mold section.

A runner block 15 is mounted in the central portion on the top face of bottom support plate 7 with one side engaged with the filler block 12, as shown in FIGS. 12 and 19. The runner block 15 extends between opposite sides of the bottom support plate 7 and has the upper surface terminating in coplanar relation with the adjacent portion of the filler block 12. The runner block 15 is detachably secured to the bottom support plate 7 by any suitable means, such as bolts. The runner block 15 has its upper face formed with channel portions indicated at 16 in the form of a longitudinally extending channel portions running throughout the length of the channel block so that at the outer side of the mold the longitudinally extending portion of the channel will be closed while at the inner side of the mold the channel will open into a registering channel portion formed in the nozzle bar 17. The nozzle bar 17 is mounted on the inner side wall of the bottom support plate or section 7 in detachable relation by bolts or the like, see FIGS. 10, 11 and 19. The channel portions 16 in runner block 15 have a plurality of equally spaced portions extending laterally from the longitudinal channel portion toward the side wall of the runner block 15 opposite to the filler block 12 with the outer ends terminating in spaced relation to the side wall of the runner block.

The side wall of the runner block 15 opposite to the filler block 12 is formed to provide one side wall of a guideway 18 for slidably receiving a plurality of nuts in position to have plastic molded in the recesses formed therein. The side wall of the runner block 15 forming the guideway 18, is formed with a plurality of equally spaced injection nozzles 19 opening through the side wall of the runner block into guideway 18 and also opening at the inner ends into the short lateral channel portions 16, see FIGS. 12, 13 and 15. The runner block 15 is formed with the spaced parallel lateral channel portions 16 and the injection nozzles 19 communicating therewith are spaced a distance apart so a plurality of nuts equal in number to the number of injection nozzles 19 arranged in adjacent relation in guideway 18 will have the injection aperture in each nut in position to register with the adjacent injection nozzle 19 in the runner block 15. The distance of the injection nozzles 19 from the upper edge of the runner block is also a fixed distance equal to the distance between an injection aperture and the bottom of a nut. When a plurality of nuts are arranged in the guideway 18, the injection apertures in the nuts will register in a horizontal direction with the injection nozzles 19 when the mold is closed.

The upper face of the nozzle bar 17 is arranged in coplanar relation with the upper face of runner block 15 and filler block 12. The channel portion 16 formed in the nozzle bar 17, as a continuation of channel portion 16 in the runner block, FIG. 11, terminates in an intermediate portion of the nozzle bar in a nozzle aperture 20 which is slightly larger at the top than at the bottom and opens into a recessed portion extending upwardly from the bottom of the nozzle bar to form a seat for the nozzle 21 on the upper end of nozzle block 22. The nozzle block 22 and nozzle bar 17 are bolted or otherwise secured together to prevent leakage of plastic material in the joint where the end of the nozzle 21 engages the seat portion in the nozzle bar 17, as shown in FIG. 11. The nozzle block 22 is part of the molding machine and will be hereinafter more specifically described.

The bottom support plate or section 7 is formed with a recess 23 extending between opposite sides thereof, opening through the upper face adjacent to the side wall of the runner block 15 formed to provide one side wall of the guideway 18 with one wall of the recess 23 forming a continuation of the guideway formed by the side wall of the runner block, as shown in FIG. 12. A locating member or bar 24 is mounted in recess 23 for vertical sliding movement with one side adjacent to the side wall of the runner block 15. The upper edge of the locating bar 24 adjacent to the runner block 15 is formed to provide the bottom face of the guideway 18, see FIGS. 11, 12, and 13, while the opposite side of the upper edge of the locating bar 24 is recessed below the portion forming the bottom of the guideway. The locating bar 24 extends between opposite side portions of the bottom support plate 7.

The locating bar 24 is secured in the recess 23 for limited vertical sliding movement by a plurality of bolts 25 extending loosely through vertical bores in the bottom section 7, see FIG. 12, and having the head portions located in enlarged recesses in the bottom of the section 7. Compression springs 26 are detachably held in the recesses against the bottom of the heads of bolts 25 by keeper plates 27 mounted in channel formed in the lower face of the bottom support plate 7. This construction provides for the compression springs 26 normally operating on the lower ends of bolts 25 to move the locating member 24 upwardly in recess 23 to its upper limit of movement.

Figure 9:
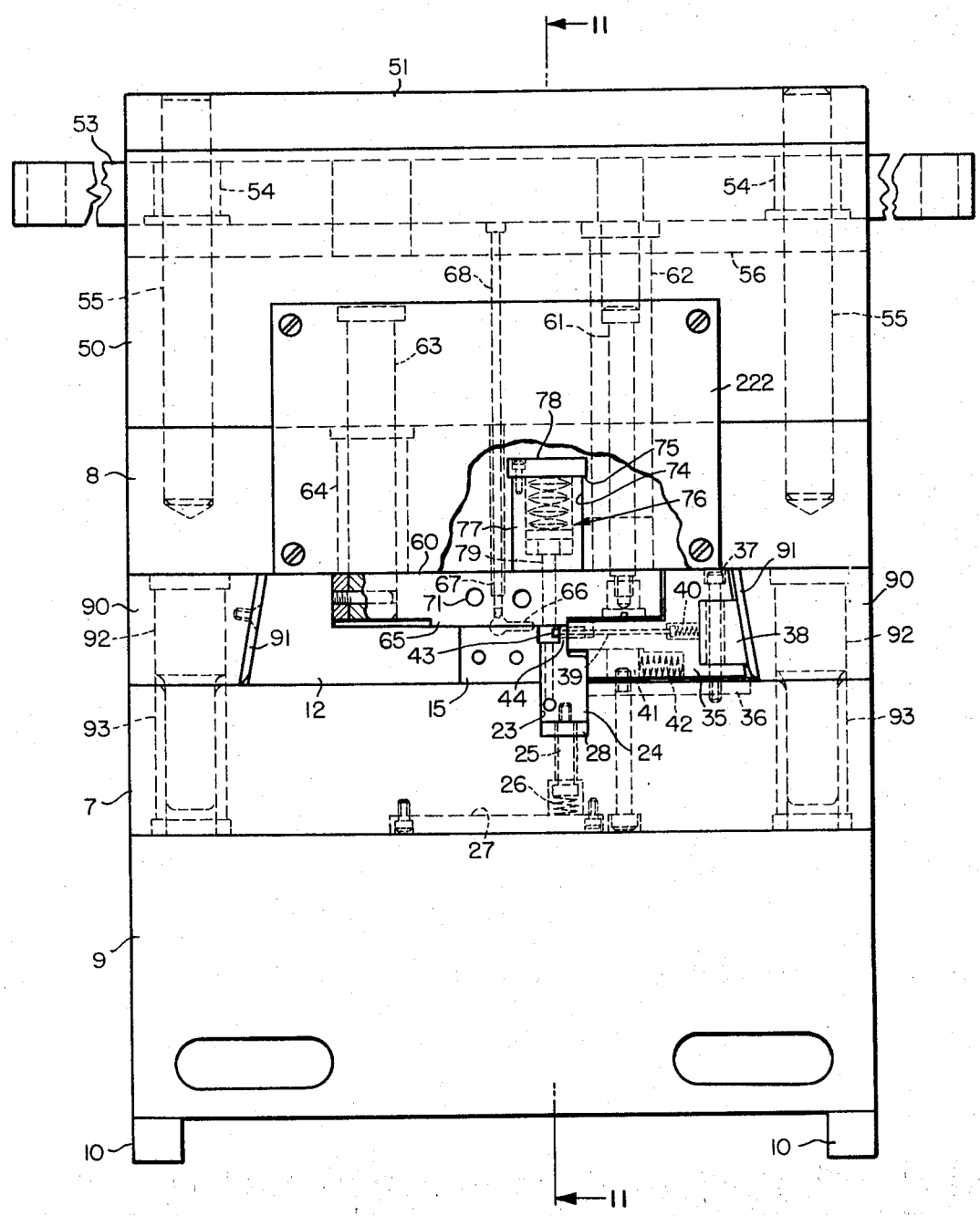
FIG. 9 is an enlarged side elevation of the mold shown in closed position looking at the side into which the nuts are fed which faces toward the left in the illustration in FIG. 4.

A bifurcated stop bar 28, FIGS. 9, 11 and 12, is slidably mounted in the bottom of the recess 23 under the lower end of the locating bar 24 for limiting the downward movement of the locating bar in the recess. The stop bar 28 is provided for the purpose of determining the depth of the guideway 18 by limiting the downward movement of the locating bar 24 in recess 23 for positioning a plurality of nuts engaged with the upper face of the bar so the injection apertures will register with the injection nozzles 19 in the runner block, FIG. 12. The lower face of the locating bar 24 at the side adjacent the runner block 15 is formed with a very slight rib portion for providing clearance between the intermediate surfaces of the side wall of plate 7 alined with the side wall of the runner block so that the slidable movement of the locating bar will be facilitated by engagement of the bar along the upper and lower edges with the side wall of the runner block 15 and the side wall of the bottom support plate 7 in the recess 23 when there are no nuts in the guideway as will be understood from the illustration in FIG. 12.

The upper face of the bottom support plate 7 is formed with recesses 29 extending rearwardly from the recess 23 and opening through the upper face of the plate 7 for receiving compression springs 30, one in each recess to extend between the end wall of the recess and the side wall of the locating bar 24 opposite to the runner block for normally moving the locating bar toward the runner block. Three of these compression springs 30 are used with one located in the central portion of the plate 7 and the other two located near opposite sides of the plate 7, so as to hold the locating bar 24 with the upper edge engaged with the runner block 15 under a substantially uniform pressure throughout its length.

The runner block 15, see FIG. 12, has a pair of bores extending in spaced parallel longitudinal relation therethrough and opening through opposite ends for the connection of suitable pipes for conducting cooling fluid through the runner block to maintain a desired temperature in the runner block and prevent it from exceeding a certain temperature maximum. The locating bar 24 is formed with a plurality of spaced parallel vertically extending bores 32 arranged in the same spaced relation as the injection nozzles 19 so that each bore will be opposite one of the injection nozzles. These bores 32 are adapted to slidably receive the lower ends of mold pins carried by the top support plate 8.

A slide bar 35 extends between opposite sides of the mold and is slidably mounted on a pair of gibs 36 mounted in the top of bottom support plate 7 in suitable slotted portions formed therein for receiving the gibs in a position so that the top faces thereof project only a slight amount above the top face of plate 7. This provides a guiding surface for receiving the bottom face of the slide bar 35, the gibs 36 being formed of hardened metal in order to provide a long wearing bearing surface. A plurality of bolts 37 are used to secure the slide bar 35 in position for limited slidable movement along the top face of bottom support plate 7 toward and from the runner block 15 and locating bar 24. The bolts 37 each extend through a slot formed in the slide bar 35 and a spring retainer bar 38 and have the lower ends threaded into sockets formed in the bottom support plate 7, FIG. 12.

The outer face of the slide bar 35 and spring retainer bar 38 are inclined upwardly and inwardly from the bottom edges and the inclined face on the spring retainer bar 38, projects slightly beyond the face of slide bar 35, as shown in FIG. 12. The spring retainer bar 38 is formed of hardened metal so that the inclined outer face will provide a long wearing surface. Spring retainer bar 38 is detachably mounted in a recess in the outer side of slide bar 35 by a plurality of bolts or other suitable means.

A plurality of side clamp pins 39 are slidably mounted in horizontal spaced parallel relation in bores formed in the slide bar 35, FIGS. 9, 10, 12, 13, 15 and 19, and are arranged in spaced horizontal relation, as shown in FIGS. 10 and 19. The spaced relation of the side clamp pins 39 is the same as the spacing between injection nozzles 19 and each pin has its inner end projecting into the opposite side of the guideway from the side wall of the runner block 15 for engaging the side of a nut opposite to the runner block for holding it engaged with the runner block. The outer ends of the slide clamp pins 39 are formed with heads for limiting their inward movement into the guideway which are located in enlarged recesses opening outwardly into the recessed portion receiving the spring retainer bar 38. Compression springs 40 are mounted in the enlarged recesses and retained by the spring retainer bar 38 for engaging and normally moving the side clamp pins 39 inwardly toward the guideway in the mold. The illustration of the bottom mold section 7 in FIG. 19 shows only four of the side clamp pins 39 in dotted lines for ment in the slide bar as well as other parts.

The mold as illustrated in FIG. 19 provides a guideway 18 for receiving sixteen nuts in position to have plastic molded in the recesses therein. The channel portions 16 in the runner block 15 have sixteen laterally extending portions communicating with sixteen injection nozzles 19 while the locating block 24 has sixteen bores 32 and slide bar 35 has sixteen side clamp pins 39. These injection nozzles, bores 32 and side clamp pins 39 are all arranged in the same spaced relation with the center lines extending through these parts intersecting one another in the guideway so as to be arranged in the centered position for a nut in order to receive sixteen nuts in centered relation therewith in the guideway 18.

The slide bar 35 is formed with three spaced parallel slots in the bottom face thereof extending inwardly from the inner bottom edge for slidably engaging over three semicircular spring supporting blocks 41, FIGS. 9 and 12. A bolt extending through a bore from the bottom of the bottom support plate 7 secures each spring supporting block 41 with the bottom face tightly engaged with the upper surface of the plate 7. Compression springs 42, FIGS. 9, 12 and 19, are located in recesses in the bottom face of the slide bar 35 and engaged between the outer face of the supporting blocks 41 and the face of the slide bar 35 at the opposite end of the recess, one spring being located in each recess between the bar and one of the blocks 41. These compression springs 42 normally tend to move the slide bar 35 outwardly to disengage the side clamp pins 39 from the nuts in the guideway 18.

The side clamp pins 39 in the slide block 35 have their inner ends projecting beyond the inner face of the slide bar 35, as shown in FIG. 12, to project through recesses formed in the upper edge of flange 44 projecting upwardly from the upper edge of the locating bar 24 to form the outer side of the guideway 18 in opposed relation to the side of the guideway formed by the runner block 15. The flange 44 of the locating bar will engage the side faces of the nuts in the guideway 18 opposite to the side wall of the runner block 15 and by reason of the tension of the compression springs 30 will move the nuts toward the side wall of the runner block 15 so as to hold the side walls of the nuts having the injection apertures tightly against the side wall of the runner block 15 over the injection nozzles therein. The side clamp pins 39 projecting through the recesses in flange 44 will have each clamp pin engage with the side of one nut so that where there are any variations in the dimensions of the nuts in the guideway between flange 44 and runner block 15, the spring pressed side clamp pins 39 will cooperate with flange 44 to compensate for the difference in dimension between different nuts of the sixteen nuts in the guideway 18 for holding them tightly engaged with the side wall of the runner block 15.

A spring pressed latch 43 is shown diagrammatically in FIG. 19 at the entrance end of the guideway 18. The latch 43 is mounted for horizontal sliding movement in a recess in the top portion of slide bar 35 for spring pressed movement into guideway 18. Suitable bolts secure latch 43 to slide bar 35 by engaging through slots in the latch and also limit outward movement thereof into the guideway. The end of the latch extending into guideway 18 has a long angle face at the side next to the receiving end of guideway 18 and a short angle face at the inner side, as shown in FIG. 19. This construction enables nuts being fed into guideway 18 to engage the long angle face and move the latch into the recess in slide bar 35 against the tension of the springs. When the guideway 18 is filled with sixteen nuts as provided in the construction illustrated, the short angle face will engage the end nut in guideway 18 for holding it and the other nuts in the guideway with the injection apertures 6 approximately in position to register with injection nozzles 19.

A spring pressed plunger 46 is slidably mounted at the inner end of guideway 18 in a recess in nozzle bar 17, FIG. 19 and detachably retained therein by a suitable retainer plate secured in a recess in the upper side of the nozzle bar. Plunger 46 has a compression spring mounted in the recess normally moving the inner end of the plunger into the end of guideway 18. When the predetermined number of nuts are engaged in guideway 18 plunger 46 will engage the nut at the inner end of the guideway and cooperate with spring pressed latch 43 in positioning the nuts so the injection apertures will approximately register with the injection nozzles. Plunger 46 will be moved outwardly and compress the spring which operates it in the positioning of the nuts in guideway 18.

The top support plate 8 has the side margins of the top face engaged with the bottom edges of top rails 50, FIGS. 7 to 10. The upper edges of the top rails 50 are engaged with the underface of the top clamp plate 51. A plurality of bolts are engaged through bores in the corner portions of the top clamp plate 51, the top rails 50 and are screw threaded in the corner portions at the top of the top support plate 8 for rigidly securing these parts together in assembled relation. The top clamp plate 51 is bolted to the underface of the movable platen 52 of the molding machine B which supports the top movable mold section for movement into open and closed positions relative to the bottom stationary support plate 7. The top rail 50 at the inner side of the top mold section 8 is formed in two pieces, arranged with one piece at the front side of the mold and the other piece at the rear side of the mold to leave the center portion between the two pieces open.

An ejector supporting plate 53 extends longitudinally from the front to the back of the mold between top support plate 8 and the top clamp plate 51 for movement toward and from the top plate 8. The ejector supporting plate 53 has a pair of guide pin bushings 54 each mounted in an aperture at the front and rear ends of the plate for receiving guide pins 55 for mounting the ejector supporting plate 53 for slidable movement thereon toward and from the top support plate 8. The guide pins 55 are arranged with one pin at the front and one pin at the rear center portion of the mold structure with opposite ends engaged and secured in apertures in the top clamp plate 51 and the top support plate 8, FIG. 9. A sprue pin retainer plate 56 is detachably secured to the underface of ejector supporting plate 53 by bolts or the like. The sprue pin retainer plate 56 extends transversely throughout the central portion of ejector supporting plate 53, as shown in FIG. 10.

A top mold and stripper or ejector plate 60 extends transversely of top support plate 8 across the underside thereof and has the inner end projecting over the upper face of nozzle bar 17, as shown in FIG. 11. Stripper plate 60 has three stripper bolts 61, FIGS. 12 and 18, detachably secured at the lower ends in the side marginal portions thereof and slidably engaged in knockout sleeves 62. Knockout sleeves 62 have the upper ends detachably secured by retainer plate 56 against the underside of ejector supporting plate 53. The upper end of each knockout sleeve 62 has a radially extending flange formed thereon seated in the enlarged upper end of an aperture extending through pin retainer plate 56 so the knockout sleeves are detachably retained in fixed relation to the underside of ejector supporting plate 53 when the sprue pin retainer plate 56 is mounted thereon.

The upper ends of stripper bolts 61 are formed with heads which slidably engage in enlarged recesses in the upper ends of knockout sleeves 62, FIG. 12, which limit the relative downward movement of the stripper bolts relative to sleeves 62 by the lower portion of the head engaging the shoulder formed by the enlarged recess in the upper end of the sleeves. The heads on stripper bolts 61 are movable upwardly out of the recesses in the sleeves and through apertures in ejector supporting plate 53. This provides for relative movement of ejector supporting plate 53 to stripper plate 60 for a purpose that will be hereinafter described.

Figure 18:
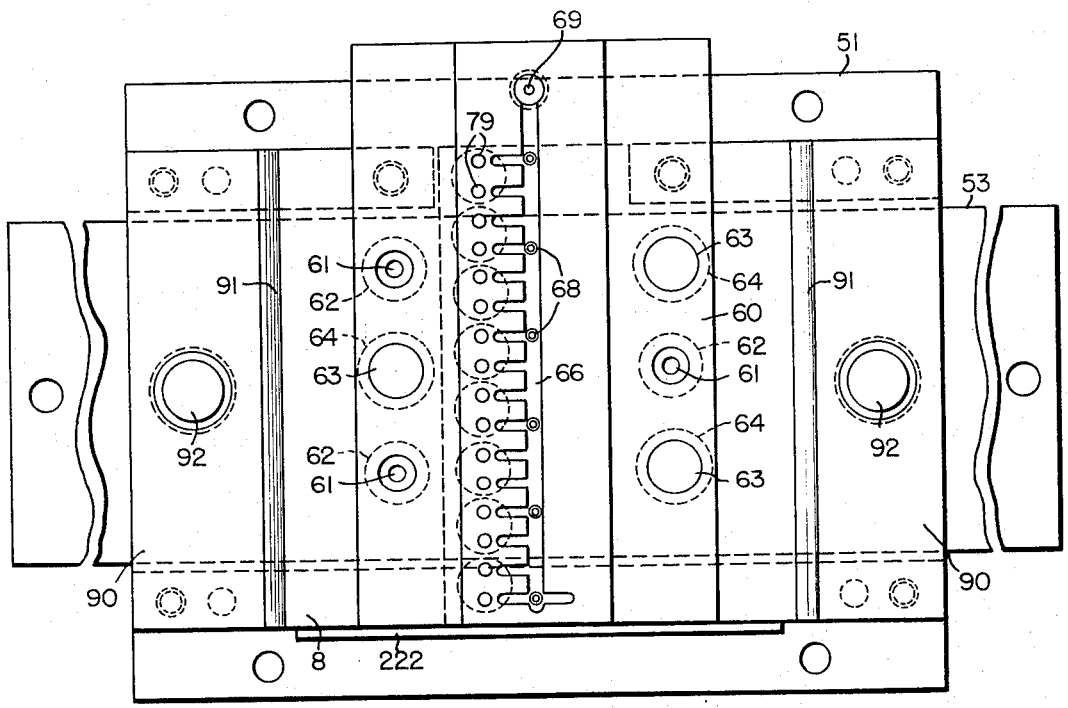
FIG. 18 is a view looking at the underside of the upper movable mold section.

By referring to FIG. 18 it will be noted that one of the stripper bolts 61 is arranged in the center portion of stripper plate 60 at one side thereof while the other two stripper bolts 61 are secured to the other side of stripper plate 60 in spaced relation to each other in supporting and guiding stripper plate 60 toward and from the bottom face of the top support plate 8. The stripper plate 60 also has three leader pins 63 secured thereto at the lower end, having the intermediate portions slidably engaged in leader pin bushings 64 mounted in top support plate 8 and the upper ends formed with heads to limit the sliding movement of the leader pins in the leader pin bushings relative to top support plate 8.

One of the leader pins 63 is arranged in the central portion on one side of the stripper plate 60 between the stripper bolts 61, as shown in FIG. 18, while two of the leader pins 63 are arranged in spaced relation at the opposite side of the plate and at opposite sides of the center portion of the plate on opposite side of stripper bolt 61. These leader pins 63 cooperate with the bolts 61 in supporting the stripper plate 60 for limited movement relative to top support plate 8. The ejector supporting plate 53 and sprue pin retainer plate 56 are formed with apertures in alined relation with the upper ends of leader pins 63 so the upper ends of the leader pins will not be engaged by the ejector supporting plate or retainer plate in downward movement relative to top support plate 8.

The lower face of stripper plate 60 has the central portion projecting slightly below the side portions throughout the length thereof, as indicated by numeral 65, FIG. 12, to form an upper mold portion on the bottom face of the stripper plate. The bottom face of the upper mold portion 65 is formed with channel portions 66 of the same size and shape as the channel portions 16 in runner block 15 for cooperation therewith in forming a longitudinally extending channel between the runner block 15 and stripper plate 60 for conducting melted plastic material therethrough for passage into the laterally extending channels and ejection through the injection nozzles 19 into the recesses within the nuts in the guideway.

The channel portions 66 have a plurality of vertically extending bores 67 communicating therewith and extending through the stripper plate 60 and top support plate 8, as shown in FIG. 12, for receiving a plurality of sprue pins 68. There are six sprue pins 68 used in the construction illustrated in the drawings arranged in substantially equal spaced relation throughout the length of the longitudinally extending portion of the channel portion 66. The upper ends of the sprue pins 68 extend through apertures in the sprue pin retainer plate 56 and have heads at the upper terminals which seat in apparatus in plate 56 for mounting in fixed relation against the lower face of the ejector supporting plate 53, as shown in FIG. 12.

The lower end or terminal portion of each sprue pin 68 is formed with a reduced extension positioned adjacent to the upper portion of the longitudinally extending part of the channel portion 66. This arrangement is such that when plastic is flowing through the channel portions 66 and 16 in the closed position of the mold, as shown in FIG. 12, the plastic will flow about the lower reduced ends of the sprue pins and be firmly molded thereon so the sprue will be removed from the channel portion 16 in the runner block 15 when the upper movable mold section moves from the closed position toward the open position.

A sprue pin 69 is mounted on the rear end of the sprue pin retainer plate 56 and has the lower end slidably guided in a bushing 70 mounted in the inner end of stripper plate 60 with the terminal portion extending below stripper plate 60 into the nozzle aperture 20 in the nozzle bar 17. The terminal portion of the sprue pin 69 is formed with annular grooves about the outer surface thereof for receiving the plastic material therein so it will be molded about the terminal portion of the sprue pin. When the plastic cools at the end of a molding operation it will adhere to the sprue pin 69 sufficiently for the sprue pin to withdraw the plastic from the aperture in nozzle bar 17 with the sprue attached to the sprue pin.

The stripper plate 60 is formed with spaced parallel bores 71 at opposite sides of the bores 67 for the sprue pins extending throughout the length of the stripper plate so that suitable pipes may be attached to the stripper plate for circulating cooling fluid through the stripper plate to maintain the desired temperature thereof and prevent the stripper plate from being heated to too high a temperature by the heat radiated from the plastic material in the channel portions 66. Similar bores 71 may be provided in the runner block 15 for cooling fluid to control its temperature.

The top support plate 8 over the locating bar 24 is formed with a transversely extending channel 74 enlarged at the upper end portion to form shoulders 75. A mold pin unit 76 is slidably inserted through the open end of the channel 74 from one side of plate 8 with the bottom of a U-shaped casing 77 lying in coplanar relation with the bottom face of plate 8. The sides of the casing 77 slidably engage the side walls of the channel 74 and a cover plate 78 detachably mounted on the upper ends of the U-shaped casing 77, have the side edges extending beyond the sides of the casing for slidable engagement on the shoulders 75 for slidably guiding the mold pin unit into the channel 74.

A plurality of mold pins 79 are slidably mounted in apertures in the bottom of the U-shaped casing 77 in substantially vertical spaced parallel relation with the centers of the mold pins arranged to lie in the same vertical planes as the centers of the injection nozzles 19. The intermediate portion of each mold pin 79 is slidably guided in an aperture extending through stripper plate 60 alined with one of the apertures in the bottom of the U-shaped casing 77. The upper ends of the mold pins 79 each have a head portion 80 mounted thereon and extending outwardly to form an annular shoulder portion for supporting the lower end of compression disc type springs 81. The head portion 80 and the compression springs 81 are housed within the U-shaped casing 77, as shown in FIG. 11.

The head portions 80 of each pair of mold pins 79 are engaged by a rocker member 86 arranged in the U-shaped casing 77 so that opposite ends of the rocker member 86 will engage the heads 80 of a pair of mold pins and have springs 81 normally operate to move the heads on the mold pins to engage with the bottom of the casing. The mold pin unit 76 has the U-shaped casing 77 formed with a plurality of transverse walls 87, FIG. 11, connecting the sides of casing 77 to form separate closed compartments for each of the springs 81 and the associated rocker member 86 and pair of heads 80 of a pair of mold pins 79. The mold pin unit 76 is held in position in the top support plate 8 by any suitable means.

Figure 14:
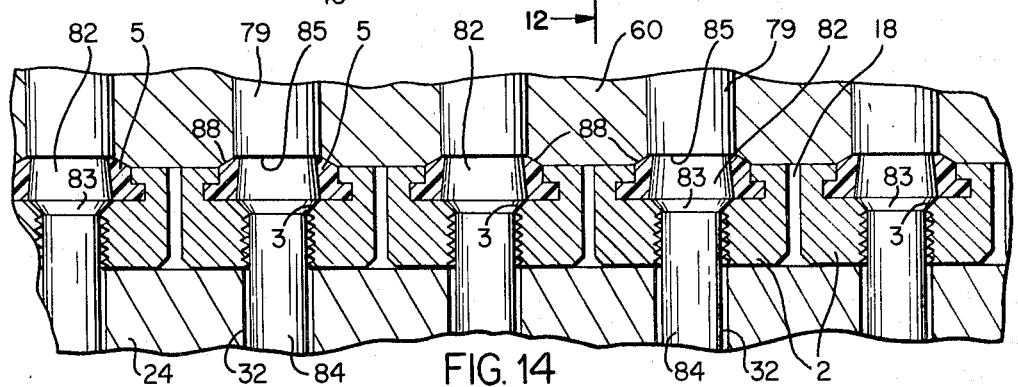
FIG. 14 is a further enlarged fragmentary cross section taken substantially on line 14—14 of FIG. 13 showing how a plurality of nuts have the plastic inserts molded therein about the mold pins.

The intermediate portions of the mold pins 79 terminate in mold sections 82, FIG. 14, of reduced size beginning at the lower face of the stripper plate 60 when it is in its uppermost position with the upper face engaging the lower face of the plate 8. The mold section 82 on each mold pin 79 has a tapered surface terminating in a shoulder 83 at the lower end thereof while the portion of the mold section above the shoulder 83 is tapered inwardly from the shoulder 83 toward shoulder 85 formed at the juncture of the mold section 82 with the intermediate portion of the mold pin, see FIGS. 11 to 17.

The mold pins 79 are arranged in pairs, as shown in FIG. 11, each pair having centering portions 84 of reduced diameter extending below the mold sections 82 and shoulder 83 with the centering portions 84 of each pair of mold pins of a different length than the adjacent pair. The varying lengths of these centering portions 84 are arranged so that the longest centering portions 84 are on the pair of mold pins at the end of the guideway 18 where the nuts are fed into the guideway. Each successive pair of pins is progressively shorter than the preceding pair of pins. The lower terminals of all of the mold pins 79 have tapered conical portions for further aiding in centering nuts in the guideway 18 so the mold pins will engage in the threaded bores in the nuts as they are moved downwardly when the movable mold is closed.

When the centering portions 84 of the mold pins are moved downwardly with support plate 8 to engage through the bores of nuts in the guideway 18, they will extend into bores 32 in locating bar 24. The lower face of stripper plate 60 above the guideway 18 is formed so that it will provide the upper face of the guideway 18 and in the closed position of the movable mold section it will engage and move the nuts downwardly in the guideway 18 against locating bar 24 for compressing the springs 26 until the bottom of the locating bar 24 engages the stop bar 28 which will register the injection apertures 6 in each of the nuts with a corresponding injection nozzle 19 in the runner block 15.

A pair of wedge bars 90 are mounted on the under face of the support plate 8 with each bar mounted in transversely extending relation across one end of the plate 8, FIG. 9. The wedge bars 90 are secured to the plate by suitable bolts or the like and have inner inclined faces on each of the bars. A cam wear plate 91 is mounted on the inner inclined face of each wedge bar 90 by bolts or the like and is formed of suitable hardened material having the inner surface inclined at approximately the same angle as the inclined face on the outer side of slide bar 35 and spring retainer bar 38, FIGS. 9 and 11. When the top support plate 8 is moved into position to close the mold for molding plastic in a supply of nuts in guideway 18, the cam wear plates 91 will operate to engage the inclined surface on the filler block 12 on one end of the bottom mold section and the inclined face of the spring retainer bar 38 on the other end of the bottom mold section to move slide bar 35 inwardly toward runner block 15. This will engage the ends of side clamp pins 39 with the sides of nuts in the guideway 18 opposite to the side walls engaging the runner block for moving the nuts into tight surface engagement with the side wall of the runner block with the injection apertures 6 in each nut in registry with an injection nozzle 19 in the runner block.

Leader pins 92 are mounted in wedge bars 90, one in each wedge bar in the central portion between opposite ends thereof and has a guide portion on the lower end projecting below the wedge bar for engaging in the upper end of the leader pin bushing 93 on the bottom support plate 7 for guiding the top mold section and top support plate 8 in a fixed relation with respect to the bottom plate 7 to register all parts of the top mold section with the bottom mold section.

When the top mold section is moved to open position such as indicated in FIG. 8, a plurality of nuts equal to the number of mold pins 79 and injection nozzles 19 are slidably moved into the guideway 18 between the side wall of the runner block 15 and the flange 44. The nuts upon engaging flange 44 will move the upper end of locating member 24 outwardly into spaced relation from runner block 15 as shown in FIG. 12. The spring pressed latch 43 at the entrance to the guideway 18 and the spring pressed plunger 46 at the inner end of the guideway cooperate to position the sixteen nuts fed into the guideway in an approximate location for the injection apertures to be alined with the injection nozzles. When the top mold and support plate 8 move downwardly into the closed position, as shown in FIGS. 9 and 12, the cam wear plates 91 are operated by the wedge bars 90 to move the slide bar 35 inwardly toward the guideway 18 for engaging the side clamp pins 39 with the sides of the nuts opposite to the runner block 15 and tightly clamp the nuts against the side wall of the runner block.

The bottom face of the mold portion 65 of the stripper plate 60 engages the top ends of the nuts as it reaches closed position and moves the nuts downwardly with locating bar 24 to register the injection apertures 6 with the injection nozzles 19 in the runner block. As the movable mold section moves towards the closed position, the centering portions 84 of varying lengths will progressively engage in the bores in the nuts and positively move the nuts into proper position in the guideway as each of the pairs of mold pins engages in the next pair of nuts from where they are fed into the guideway to the other end of the guideway. As the mold moves into closed position, the mold pins will have the mold sections 82 move into the recesses in the nuts until the shoulders 83 engage the beveled portions 3 at the inner portions of the recesses 4 for sealing the threaded bore in the nut and forming the inner wall of the recess and the inner wall of the plastic insert 5, as shown in FIG. 1.

The shoulder 85 on the lower end of the intermediate portion of each of the mold pins 79 at the upper end of the mold sections 82 closes the opening in the upper end of the nut as shown in FIG. 14. The stripper plate 60 is formed with an annular recess having an inclined wall 88 about the upper portion of each mold section 82 cooperating with shoulder 85 to form the outer end of the recess 4 in the nut so that the plastic insert 5 will have the tapered projection extending beyond the end of the nut. When the mold is in the closed position shown in FIGS. 12 to 14, centering portions of the mold pins extending below the bottom portions of the nuts in the guideway 18 are loosely engaged in the bores 32 in locating bar 24.

Plastic material is then injected through the channel portions 16 and 66, the injection nozzles 19 and the nozzle apertures 20 of each of the nuts, for filling the recesses 4 to form a plastic locking insert 5 in each of the nuts of the character shown in FIGS. 1 and 2. The operation of the upper movable mold is such that when it is in closed position the mold pins 79 have the shoulders 83 engaged under tension with the bevelled portions 3 of the nuts, as shown in FIG. 14. The mold pins 79 will have a slight upward movement in the stripper plate 60 for moving the head portions 80 away from the bottom of the U-shape casing 77 for compressing springs 81 to maintain the mold pins engaged with the nuts under tension. The rocker members 86 will move slightly to compensate for slight variations in nut dimensions while holding them in molding position. All nuts of any particular size will have the transverse dimension between the opposite side faces thereof vary slightly, so that when as many as sixteen nuts are engaged in the guideway 18 some will be slightly wider than others so that the faces of the wider nuts which engage the flange 44 will have those nuts that may be of slightly less width positioned in the guideway 18 in a partially loose condition. The side clamp pins 39 which individually engage each nut will compensate for this clearance caused by the slight difference in the dimension of the nuts so as to tightly hold the sides of the nuts having the injection apertures engaged with the side wall of the runner block 15 to prevent leakage of plastic between the injection nozzle 19 and the injection aperture 6 during the molding of the insert 5 in each of the nuts. The taper on the mold sections 82 is just sufficient so that the upper mold section will withdraw the nuts from the guideway 18 in the bottom stationary section of the mold when the top movable mold section is moved to the open position.

*The molding machine*

Figure 39:
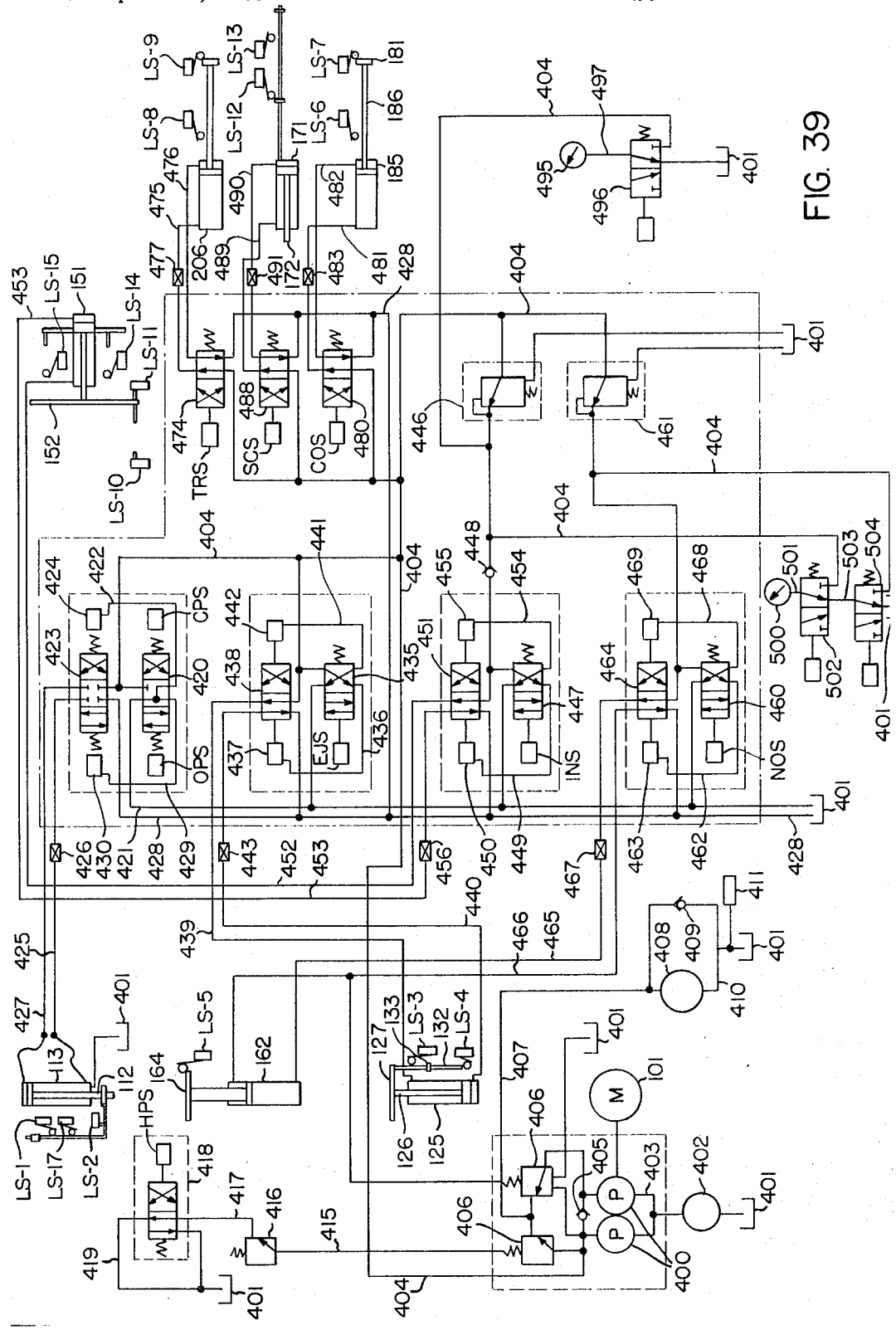
FIG. 39 is a diagram illustrating the hydraulic connections for operating the molding machine in moving the mold section between open and closed positions, molding plastic in the nuts and removing and discharging the nuts from the machine.

The molding machine B shown diagrammatically in FIGS. 3 to 8 and the fluid pressure diagram in FIG. 39 is essentially a conventional molding press known as Model 701–3 made by F. J. Stokes Corporation of Philadelphia, Pennsylvania, in which some modifications have been made to facilitate its operation and use with the present invention. This machine is disclosed in one or more of the following patents: 2,242,189, Zelov et al., May 13, 1941; 2,391,362, Strauss, Dec. 18, 1945; 2,317,823, Strauss, April 27, 1943; 2,582,891, Strauss, Jan. 15, 1952; 2,380,084, Strauss, July 10, 1945; 2,739,349, Strauss, Mar. 27, 1956.

The molding machine B is illustrated essentially in diagrammatic form and to an extent sufficient to disclose the essential feature of construction and operation for its use in connection with the combination forming the present invention. The modifications are specifically described hereinafter.

The molding machine has a bottom casing 100 containing a fluid reservoir 401 for hydraulic fluid with an electric motor M1 for driving a pair of single fixed displacement hydraulic pumps 400 shown diagrammatically in FIG. 39 to circulate fluid under pressure through the hydraulic system for operating the machine according to a plurality of controls which will hereinafter be described. The bottom casing 100 has an instrument panel 102 on which the switches, push buttons, gauges, etc. are mounted for manual operation in starting, stopping and controlling the operation of the machine.

Figure 40A:
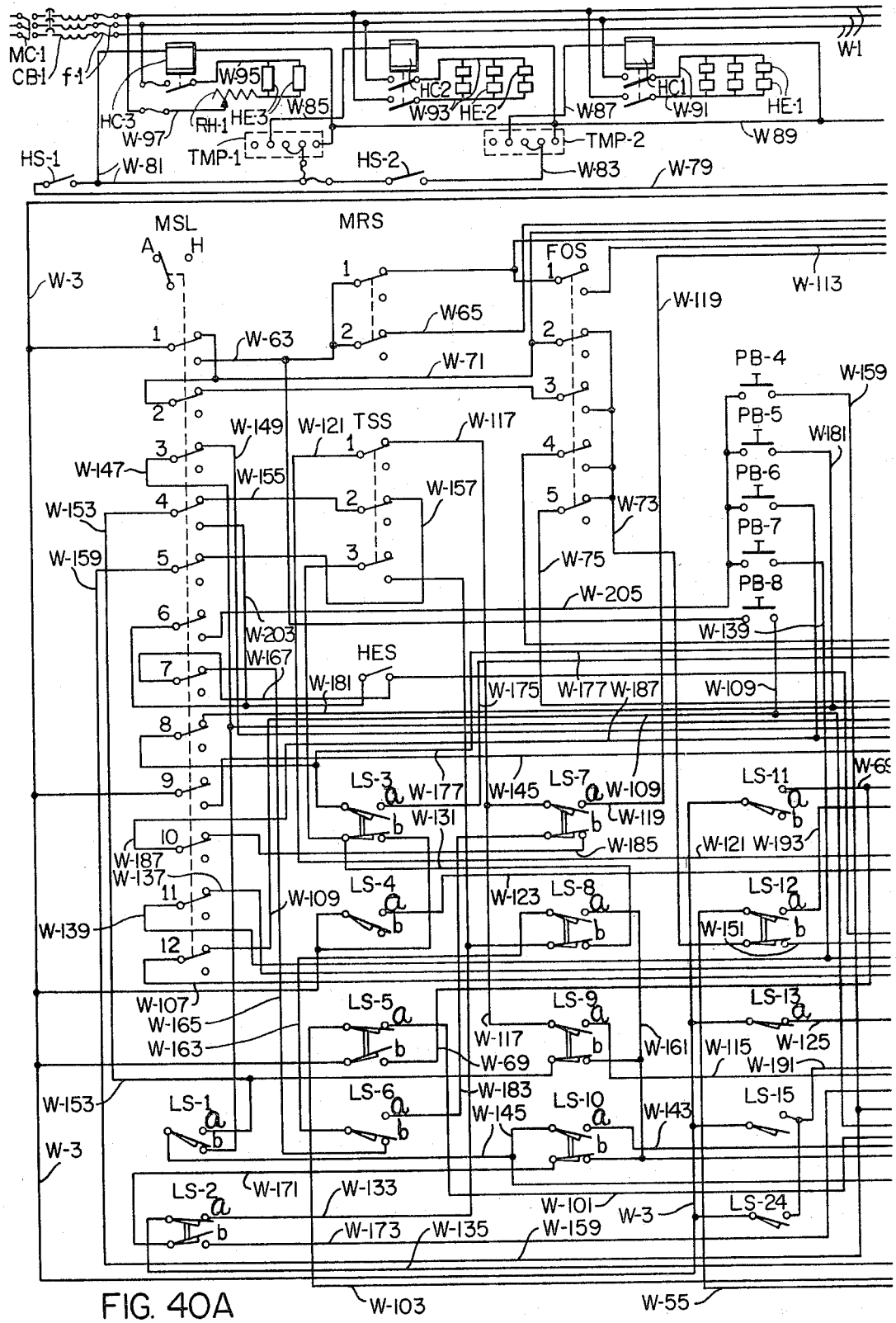

The doors 103 and 104, FIG. 4, provide closures for the compartments containing the control relays, hydraulic valves, solenoids and other parts of the fluid pressure or hydraulic control mechanism for the machine, as shown in FIG. 39 and FIGS. 40A and 40B. The bottom platen 11 is mounted on the left hand end of the bottom casing 100, as shown in FIG. 4, for rigidly supporting the mold structure, hereinbefore described. The top platen 105 is rigidly mounted in spaced substantially parallel relation above bottom platen 11 on four corner posts or tie rods 106. The tie rods 106 extend through apertures in the corners of the top platen 105 and have nuts threaded thereon for adjustably supporting the top platen on the tie rods for adjustment relative to the bottom platen 11. The lower ends of the tie rods 106 are mounted in the corner portions of the bottom platen 11.

The movable platen 52 is slidably mounted on the tie rods 106 under the top platen 105 for supporting the top movable mold section as hereinbefore described. The movable platen 52 is suspended from the top platen 105 by toggle link mechanism including a pair of top toggle members 107 mounted on the under face of the top platen 105. A pair of bottom toggle members 108 are pivotally mounted on the movable platen 52. Toggle links 109 pivotally connect the top and bottom toggle members 107 and 108 respectively. Toggle link yokes 110 one for each set of toggle links 109, connects the toggle links with the toggle yoke 111. The toggle yoke 111 is mounted on the lower end of a piston rod 112 and has a guide pin projecting from the bottom of the toggle yoke slidably engaged in the central portion of the movable platen 52 for guiding the shaft in the operation of the platen between open and closed positions, as shown in FIGS. 7 and 8.

The piston rod 112 extends through and is slidably guided in the top platen 105 and has the upper end connected with the piston in clamp cylinder 113. The clamp cylinder 113 is mounted on the top surface of the top platen 105 and extends vertically above the top platen. The fluid or hydraulic pressure pipe connections between the several hydraulic cylinders, shown on the molding machine B, are omitted from the illustration of the machine in FIGS. 3 to 8 for convenience in illustrating the structural features of the machine and are illustrated diagrammatically in FIG. 39. The clamp cylinder 113 has hydraulic fluid pipe connections with the upper and lower ends thereof connected to a hydraulic control valve mounted on a valve supporting and control panel in bottom casing 100 and accessable through door 103. The connections and operation is described hereinafter in connection with FIGS. 39 and 40A, 40B and 40C.

A movable platen rod bracket 114 is mounted on toggle yoke 111, as shown in FIG. 8, and projects outwardly beyond the inner side of the movable platen 52 and the top platen 105, as shown in FIGS. 4 and 5. Three limit switch operating rods 115, 116, and 117 have their lower ends secured to movable platen rod bracket 114 and extend vertically in spaced parallel relation from the bracket, as shown in FIGS. 7 and 8. These limit switch operating rods each have a switch operating cam 118 adjustably mounted thereon. The cam 118 on limit switch operating rod 115 is positioned to engage the lever arm for operating press open limit switch LS1. The limit switch operating rod 117 has the cam 118 thereon positioned to engage and operate the operating arm on press closed limit switch LS2 and the cam 118 on limit switch operating rod 116 engages and operates the arm on low-high pressure limit switch LS17 as shown in FIGS. 7 and 8 for example and shown in the fluid pressure diagram in FIG. 39 and the wiring diagram in FIGS. 40A and 40B. These three limit switches are mounted on junction boxes 119 supported on the bracket 120 mounted on the inner side of top platen 105, as shown in FIGS. 7 and 8. These limit switches control the operation of the piston in clamp cylinder 113 in a manner that will be hereinafter described.

Top platen 105 is adjusted on the corner post or tie rods 106 for positioning the top mold section including top support plate 8 and stripper plate 60 to firmly and accurately engage the upper surface of the bottom mold section in the closed position of the mold. When the piston in clamp cylinder 113 is operated by hydraulic pressure to move the toggle yoke 111 downwardly for straightening the toggle links and members, the bottom mold face of the top mold section will engage and be forced against the top face of the bottom mold section under a substantial and predetermined pressure sufficient to prevent leakage of plastic when it is injected into the recesses in the nuts through the channel portions 16 and 66. The top platen 105 is constructed so that a fine adjustment may be made to position the top platen in proper spaced relation to the bottom platen 11 in securing this predetermined pressure between the mold sections in closed position.

A micro switch operating arm 121 has the lower end mounted on movable platen 52 at the outer rear corner thereof and the upper end formed with projections for engaging the operating arms of limit switches LS16 and LS24. A switch operating arm 122 has the lower end mounted on the rear inner side of the platen 52, as shown in FIG. 5, and the upper end formed to operate the switch arm for limit switch LS20.

The limit switch LS16 controls operation of the nut punching and feeding mechanism to prevent feeding of nuts into the mold when it is in closed position. The limit switch LS20 is operated when the mold is open to close circuits to the nut punching and feeding mechanism to secure operation thereof and feeding of nuts into the guideway 18 for the next molding operation while the upper movable mold is in open position. The limit switch LS24 is closed to operate the air blast for cleaning the mold as the movable mold section moves toward and nears open position. These three limit switches control and the operating means modify the construction and operation of the molding machine to secure a different cycle of operation from the conventional machine in a manner hereinafter described.

An ejector cylinder 125 is mounted under bottom platen 11 near the bottom of bottom casing 100, as shown in FIGS. 4 and 8 on a supporting plate 124 secured to casing 100 in a conventional manner, not shown. A piston rod 126 is connected to a piston in the ejector cylinder 125 at one end and has the outer end connected to the central portion of a cross bar 127 for moving the cross bar up and down in the bottom casing. The opposite ends of the cross bar 127 have the lower ends of ejector operating rods 128 secured thereto while the upper ends of the rods are formed with gear teeth on the inner sides and extend through guide portions 129 formed on the front and rear ends of movable platen 52, as shown in FIGS. 7 and 8.

The gear teeth formed on the inner side of ejector rods 128 each engage in intermeshing relation with a pinion 130 rotatably mounted in guide portion 129 between an ejector rod 128 and an ejector operating rod 131 slidable in the guide portions 129. Each ejector operating rod 131 has gear teeth on the outer side meshing with the adjacent pinion 130 arranged as shown in FIG. 7, so that when the ejector piston in ejector cylinder 125 is moved upwardly to move cross bar 127 upwardly, the ejector rods 128 will rotate the pinions 130 at opposite ends of movable platen 52 to move the ejector operating rods 131 downwardly, FIG. 8. The lower ends of ejector operating rods 131 are secured to the ejector supporting plate 53. One of the rods is secured at one end of the plate 53 and the other rod at the other end, see FIGS. 7 and 8.

The cross bar 127 carries a limit switch operating rod 132, FIG. 4, having a switch operating cam 133 mounted thereon, positioned for operating two limit switches mounted on a bracket carried by supporting plate 124 at opposite ends of the travel of the piston in the ejector cylinder 125. The ejector advance limit switch LS3 is operated by switch operating cam 133 when the stripper plate 60 has been moved away from top support plate 8 into advance position, as shown in FIG. 8 for ejecting the nuts from the mold pins. The ejector return limit switch LS4 is operated by the switch operating cam 133 when the piston in ejector cylinder 125 has moved the parts for returning the stripper plate 60 into return position against the under side of top support plate 8, see FIG. 7.

FIGS. 7 and 8 show the movable platen 52 in the open position of the mold in FIG. 8 and the closed position of the mold in FIG. 7. When the mold is in the closed position as shown in FIG. 7, the stripper plate 60 is firmly engaged against the lower face of the top support plate 8. After the nuts in the guideway 18 have had the plastic molded in the recesses, as shown in FIGS. 13 to 17, the mold is moved to the open position shown in FIG. 8. Then, the piston in ejector cylinder 125 is operated to move ejector supporting plate 53 downwardly and move stripper or ejector plate 60 downwardly as also shown in FIG. 8. As the stripper plate 60 is moved downwardly relative to the mold pins 79 it will push the molded nuts off of the mold sections 82 after which they will slide off the centering portions of the lower ends of the mold pins for discharge from the mold. The operation of the stripper or ejector plate will also move the sprue pins downwardly to disengage the sprue from the under face of the stripper plate so that the sprue may be removed from the sprue pins and discharged from the mold. The details and timing of this operation will be more completely described hereinafter.

The bottom casing 100 of the molding machine B includes a top supporting plate construction indicated at 140 including a portion which extends under and supports the bottom platen 11 and another portion extending toward the opposite end of the bottom casing having a pair of upwardly extending supporting frames 141 and 142 formed thereon in spaced parallel relation, see FIGS. 3 to 6. These upwardly extending supporting frames 141 and 142 extend upwardly in spaced relation to each other and the inner side of the mold A.

A heater cylinder 143 has one end mounted on supporting frame 141 and extends in substantially horizontal relation toward the bottom stationary mold section and has the other end connected to nozzle block 22, FIGS. 4, 10, and 11. The nozzle block 22 has the nozzle 21 thereon tightly secured in nozzle bar 17 as previously described and retained in position by a pair of adjustable bolts 144 engaging the bottom side of nozzle block 22 and mounted in the bar 145 on the upper face of bottom platen 11, as shown in FIG. 7. The heater cylinder is provided with a plurality of suitable electric heating elements HE1, HE2 and HE3 which extend along the outer side of heater cylinder 143 for heating the plastic and maintaining a desired temperature for the plastic in the heating cylinder. These heater elements are only partially and diagrammatically indicated by the terminal portions and connecting wires in FIGS. 4 and 5 while the circuits for the heating elements are shown in the circuit diagram FIG. 40A with the automatic controls for maintaining the desired degree of heat in each heating element.

Granular plastic material is preferably used and is introduced into the heating cylinder 143 by pouring a supply of granular plastic material into the hopper 146, FIG. 4. The hopper 146 is omitted in FIG. 3. The granular plastic material flows into a feed housing 147 from which a charge is fed by a feed plunger 148 into a vertical delivery tube 149 for discharge into the heater cylinder 143. An injection ram 150 slidably extends through supporting frames 141 and 142 and has one end slidably engaging in heater cylinder 143 for injecting the plastic received from the delivery tube 149 into and through the heater cylinder 143 into the nozzle block 22 and a nozzle 21. The other end of injection ram 150 is attached to a piston in the injection cylinder 151. A feed yoke or plate 152 is attached to feed plunger 148 and injection ram 150 so that when the piston in injection cylinder 151 moves forwardly to feed plastic material into the heater cylinder 143 it will also move feed plunger 148 forwardly to feed a new charge of granular plastic material into delivery tube 149 for subsequent feeding into the heater cylinder on the next stroke of the injection ram 150. The details of this construction are only partially illustrated because it is part of the conventional molding machine, as above stated.

The feed plate 152 has four limit switch operating rods 153, 154, 155, 156 respectively, secured thereto at one end along the upper marginal portion thereof and extending toward the opposite side of the machine from that mounting the mold structure, as shown in FIGS. 3, 4, 5 and 6. These limit switch operating rods have switch operating cam blocks thereon spaced at different distances away from the feed yoke or plate 152.

The limit switch operating rod 153 has the cam block thereon positioned to operate pre-pack position limit switch LS14 whenever the piston in the injection cylinder 151 moves forwardly an amount sufficient for injection ram 150 to force a substantial portion of the plastic in heater cylinder 143 outwardly through nozzle block 22. The cam block on limit switch operating rod 153 will engage the arm and open normally closed limit switch LS14 which controls a circuit hereinafter described for returning the piston in injection cylinder 151 to feed a new supply of plastic granules toward and into the heater cylinder. The control relay 11CR, FIG. 40B controls the operation of the piston in injection cylinder 151 and the operation of the piston by pre-pack position limit switch LS14. The piston in injection cylinder 151 will be operated at the end of a molding cycle when the nuts in the mold are filled with plastic for feeding a new supply of plastic material into heater cylinder 143 through the operation of control relay 11CR and the cam block on limit switch operating rod 153 engaging and operating the arm of the limit switch LS14. If one operation is insufficient to supply enough plastic for the next molding operation, the cam on rod 153 will operate pre-pack position limit switch LS14 to move the piston in cylinder 151 back so another supply of plastic will be fed into the heater cylinder. The plastic supply is adjusted and controlled to normally avoid a repeat operation for supplying plastic to the heater cylinder. The cam block is normally positioned on rod 154 for operating injection limit switch LS10. As shown in FIG. 3, the cam block is positioned on rod 154 so that it will not engage and operate limit switch LS10 because limit switch LS10 is not used with the present invention. The limit switch operating rod 155 has a switch operating cam block positioned thereon for normally operating the injection return limit switch LS11.

The cam block is located in a position so it will not engage or operate injection return limit switch LS11 because it is not used in connection with the present invention. This non-use of limit switches LS10 and LS11 is a modification of the conventional molding machine for the purpose of the present invention. The limit switch operating rod 156 carries a switch operating cam block thereon for engaging and operating air blast limit switch LS15 as the injection piston in injection cylinder 151 approaches the return position and just before it reaches the return position for periodically operating an air valve for allowing compressed air to be discharged from discharge nozzles through a discharge casing and through the tray. The air discharge will discharge the nuts and sprue delivered to the discharge casing 187 and the tray at the end of the previous molding cycle while the mold is in closed position allowing sufficient time for the plastic last molded to harden.

The opening in the nut discharge casing 187 for receiving the outer end of the tray 194 is covered by a closure plate 222 mounted on the outer side of the top support plate 8 when the air blast produced by the operation of air blast limit switch LS15 blows the nuts out of casing 187.

An injection shut off pin 160 is slidably mounted in nozzle block 22 in substantially vertical position, as shown diagrammatically in FIG. 11, and has the upper end engaged in nozzle 21 for movement in the closed position into an aperture in the upper end of the nozzle 21 so as to slidably engage the walls of the aperture and close the nozzle to prevent further flow of plastic material out of the nozzle. The lower end of injection shut off pin 160 is detachably mounted on the upper end of injection pin operating rod 161. The injection pin operating rod 161 is slidably mounted and guided in a bushing in bottom platen 11, extends through the platen and has the lower end detachably and adjustably mounted on the upper end of the piston rod for nozzle cylinder 162, as shown diagrammatically in FIGS. 4, 7 and 8.

The nozzle cylinder 162 is mounted on a supporting plate 163 secured by a plurality of rods to bottom platen 11 for suspending the nozzle cylinder below bottom platen 11. An arm 164 is mounted at the lower end of injection pin operating rod 161 where it is secured to the piston rod for nozzle cylinder 162 and extends outwardly from the rod 161 for operating the nozzle closed limit switch LS5 when the piston in nozzle cylinder 162 is in the upper position for moving injection shut-off pin 160 into closed position as shown in FIG. 11.

Figure 40C:
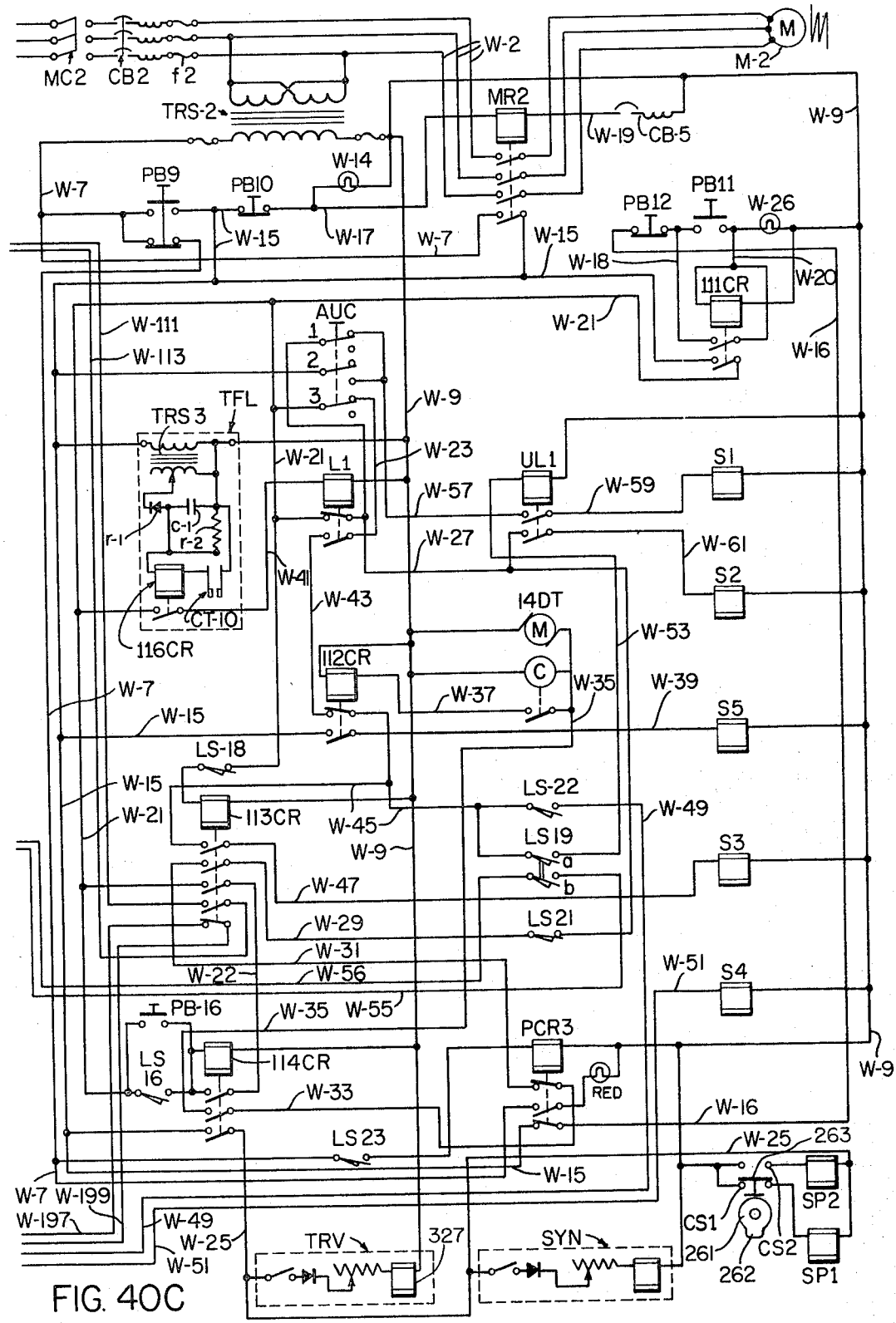

The hydraulic connections for operating the piston in ejector cylinder 125 and the piston in nozzle cylinder 162 are not shown in FIGS. 4, 7 and 8 for the purpose of eliminating illustration of unnecessary details of construction and for simplifying the drawings in view of the connections for controlling and operating the pistons in these cylinders being shown in the fluid pressure diagram FIG. 39 and the electric control circuits for operating the machine being illustrated in the wiring diagram FIGS. 40A, 40B, and 40C.

As the top movable mold section moves toward open position and just prior to reaching open position, the microswitch operating arm 121 engages and operates air blast limit switch LS24 for operating an air valve to discharge compressed air through air discharge manifold 205 and through discharge nozzles 208 and 209. Nozzle 208 is mounted on air supply manifold 205 while nozzles 209 are mounted on a bar 188 detachably secured to two of the corner posts 106 at the end of the machine adjacent the feeding mechanism. The bar 188 extends from the front to the rear portion of the machine and is mounted above nut discharge casing 187. Air discharge nozzles 209 are connected by flexible tubing to air manifold 205. A pair of air discharge tubes 189 are connected at one end to air manifold 205 and have the opposite ends mounted in the front end of air discharge casing 187 for discharging compressed air in casing 187 for blowing nuts out of the rear end thereof. The rear end of air discharge casing 187 is curved around the rear corner post 106 and terminates in a downwardly inclined portion detachably receiving one end of a tube for conveying discharged nuts into a container at the rear portion of the machine, FIGS. 5, 23 and 24.

The compressed air is discharged simultaneously through nozzles 208 and 209 air discharge tubes 189 and air discharge tube 203 as the mold reaches open position. In this discharge of compressed air the bottom mold section is cleaned and the sprue from the previous molding operation is discharged from the tray. The nuts and sprue from the present molding operation are moved upwardly and are supported on the upper movable mold section before the tray, comb and scraper are moved toward advance positions.

Mechanism is provided in the molding machine for discharging the molded nuts and the sprue from the mold. The upwardly extending supporting frames 141 and 142 slidably mount a pair of spaced parallel shafts 168 carrying a scraper supporting plate 169 on the inner ends and a scraper shaft connecting bar 170 at the outer ends. A scraper cylinder 171 has one end mounted on upwardly extending supporting frame 141 and the other end secured to upwardly extending supporting frame 142 in substantially horizontal relation, as shown in FIGS. 3, 4 and 5. This scraper cylinder 171 contains a piston for hydraulically operating scraper piston rod 172, FIG. 3, extending outwardly through the end of the scraper cylinder 171 secured to frame 142 and attached at its outer end to scraper shaft connecting bar 170.

Suitable pipe connections and control valve mechanism are connected with the scraper cylinder 171 for controlling the supply of fluid to the scraper cylinder from suitable control valves, omitted from FIGS. 3 to 5 and shown diagrammatically in FIG. 39. The scraper shaft connecting bar 170 is provided with a limit switch operating arm for engaging and operating scraper return limit switch LS13 when the scraper is in the return or starting position, as shown in FIGS. 3 to 6. When the scraper is moved forward, the scraper advance limit switch LS12 will be operated. When these limit switches LS12 and LS13 are operated by the scraper they control electric circuits for securing operation of the control valve mechanism for the scraper cylinder 171 to automatically move the scraper between the advance and return positions in the operation of the machine. These circuits and the control of the valves for the scraper cylinder 171 are shown in the fluid pressure diagram in FIG. 39 and the wiring diagram in FIGS. 40A, 40B and 40C. The scraper advance and scraper return limit switches LS12 and LS13 respectively, are mounted on the upper end of connection boxes supported by a terminal box 173, see FIGS. 4 and 6. The terminal box 173 is secured to and extends outwardly from the outer side of upwardly extending supporting frame 142 at the front portion of the machine below the horizontal plane of spaced parallel shafts 168 toward the right hand side of the machine, as shown in FIG. 4. The scraper advance limit switch LS12 is mounted on terminal box 173 at the end adjacent to supporting frame 142 at the rear side in alined relation with scraper return limit switch LS13 as shown in FIGS. 4 and 6.

A pair of scraper supporting rods 174, FIGS. 20 to 22, have one end secured to scraper supporting plate 169 and carry the scraper 175 on the opposite free ends thereof, projecting toward the mold construction. The operation of the scraper will be hereinafter described.

A pair of spaced parallel comb supporting shafts 178 are slidably mounted in upwardly extending supporting frames 141 and 142 at opposite sides thereof in horizontal relation above scraper supporting shafts 168. A comb shaft connecting bar 179 is secured at opposite ends to the outer ends of comb supporting shafts 178 and a comb supporting frame member 180 of inverted U-shape form has the free ends secured to the inner ends of comb supporting shafts 178, FIGS. 3, 4, 5 and 6. A comb 181 in the form of a flat plate has one marginal portion secured to a cross bar 182, FIGS. 20 to 22, extending in horizontal relation and attached at opposite ends to intermediate portions of the legs of the comb supporting frame member 180 in spaced parallel relation below the horizontal portion thereof.

The comb plate 181 extends from cross bar 182 toward mold member A and is formed with a slot 183 alined with the sprue pins 68 and 69 so that the sprue pins will extend through the slot with the sprue carried by the lower ends of the pins supported below comb plate 181 in the open position of the mold when the stripper plate 60 has been moved to its advance position below top support plate 8, FIGS. 16 and 17. This comb construction provides a modification of the conventional molding machine. The comb advance limit switch LS 6 is engaged by operating arm 184, FIG. 6, when the comb plate 181 is in the advance position. The operating arm 184 engages and operates the comb return limit switch LS 7 when the comb plate 181 and comb supporting frame member 180 are in the return or starting position, as shown in FIGS. 3 to 6.

A comb operating cylinder 185 is mounted at one end on upwardly extending supporting frame 141 between comb supporting shafts 178, see FIG. 5, and is mounted in supporting frame 142 at the opposite end. A comb operating piston rod 186, FIG. 6, extends from the piston in comb operating cylinder 185 outwardly and has the outer end secured to comb shaft connecting bar 179. The hydraulic connections for controlling the operation of the piston in comb operating cylinder 185 are shown in the fluid pressure diagram in FIG. 39 and the electrical control circuits are shown in the circuit diagram FIGS. 40A, 40B and 40C.

The comb is moved to the forward position for extending comb plate 181 under stripper plate 60 when the mold is in the open position as shown diagrammatically in FIGS. 16 and 17, with stripper plate 60 in the advance position for engaging comb plate 181 between the sprue carried by the lower ends of sprue pins 68 and 69 and the lower face of stripper plate 60 so the sprue will be removed from the ends of the sprue pins as the ejector supporting plate 53 is moved from the lower position shown in FIG. 8 toward the upper position shown in FIG. 7. During this movement, as illustrated in FIGS. 16 and 17, the sprue pins 68 and 69 are withdrawn upwardly through ejector or stripper plate 60. The sprue will engage the under face of comb plate 181 and be withdrawn from the lower ends of the sprue pins as they continue their upward movement through the slot 183 in the comb plate 181. The operating arm 184 will engage and operate comb advance limit switch LS6 when the comb reaches the forward position for stripping the sprue from the sprue pins. This comb advance limit switch LS6 and comb return limit switch LS7 are mounted on top of connection boxes supported by terminal box 173. These limit switches LS6 and LS7 are located at the inner and outer ends of the terminal box in the central portion between the front and rear edges adjacent limit switches LS12 and LS13 respectively. This operation will be more completely described hereinafter in connection with the description of the machine operation.

A pair of spaced parallel tray supporting shafts 190 are slidably supported in supporting frames 141 and 142 in the same horizontal plane as comb supporting shafts 178 and are spaced outwardly therefrom, as shown in FIGS. 3, 4, 5 and 6. An inverted U-shape tray shaft connecting bar 191 FIGS. 3, 4, 5 and 6 has the ends of the legs connected to the outer ends of shafts 190 with the central portion extending horizontally above comb shaft connecting bar 175. A tray supporting frame member 192 of inverted U-shape has the free ends of the legs secured to the inner ends of tray supporting shafts 190 and is located between supporting frame 141 and the mold structure. A tray supporting bar 193, FIG. 20, has opposite ends secured to the lower ends of the leg portions of the inverted U-shape tray supporting frame member 192 at opposite ends thereof and mounts the tray member 194 in the central portion thereof under comb plate 181.

The tray 194 is formed of a bottom tray plate 195 having spaced parallel side walls 196 extending upwardly from the side margins of tray plate 195 and supporting a pair of spaced cover plates 197 and 198 with the outer margins of each plate secured to the upper edges of one of the side walls 196. The inner ends of tray plate 195, side walls 196 and cover plates 197 and 198 are secured to an inner supporting bar 199 for closing the inner end of the tray and cooperating in attaching the tray member 194 to tray supporting bar 193. The inner side edges of the cover plates 197 and 198 are spaced apart throughout the length of the tray so as to provide an opening alined with mold pins 79 to provide for discharge of molded nuts from the mold pins through the opening onto bottom tray plate 195.

Cover plate 197 is formed along the inner edge with an upwardly inclined portion terminating in a vertical marginal portion as indicated at 200, and cover plate 198 is formed with a vertical wall portion 201 along the inner marginal portion to define opposite sides of the slot or opening in the top portion of the tray for the discharged nuts. The rear end of cover plate 197 has an up standing wall formed thereon secured to inner supporting bar 199. A front forward wall extends upwardly from the forward edge of cover plate 197, as indicated at 202.

A compressed air discharge tube 203 is mounted on the top face of cover plate 197 along the inner marginal portion, as shown in FIGS. 20 and 21. This tube 203 has a plurality of openings formed therein for discharging compressed air for blowing sprue outwardly and rearwardly from the cover plate 197 after its deposit on the cover plate upon being stripped from the sprue pins. A flexible pipe connection 204 extends from the inner end of tube 203 through openings in wall portions 201 and 202 and along the top face of tray cover plate 198 forwardly to form a flexible loop having the opposite end connected to a compressed air supply manifold 205 shown in FIGS. 23 and 24. This flexible pipe 204 bends during reciprocation of the tray without affecting the compressed air connection of the discharge tube 203 with manifold 205.

A tray operating cylinder 206 is mounted at the inner end on supporting frame 141 and is mounted at the outer end on supporting frame 142. A piston rod 207 has one end connected to the piston in cylinder 206 and the opposite end extends outwardly and is connected at the outer end to tray shaft connecting bar 191. When the tray is in the return position an operating arm on the front end of tray shaft connecting bar 191 engages and operates tray return limit switch LS9, FIGS. 4 and 6, to close the circuits controlled by the limit switch. When hydraulic fluid is supplied to operate the piston in tray cylinder 206 to move the tray into forward position the operating arm on tray shaft connecting bar 191 will engage and operate the tray advance limit switch LS8 to close the circuits controlled thereby.

The tray advance and tray return limit switches LS8 and LS9, respectively, are mounted on top of connection boxes supported by terminal box 173. The tray advance limit switch LS8 is mounted on the inner end at the front side of terminal box 173 and tray return limit switch LS9 is mounted at the outer end at the front side of terminal box 173, as shown in FIGS. 4 and 6.

The comb advance limit switch LS6 and scraper advance limit switch LS12 do not show in FIG. 4 because they are in transversely alined relation with tray advance limit switch LS8 in FIG. 4 along the inner end of connection box 173 and behind tray advance limit switch LS8. These limit switches LS6 and LS12 do not show in FIG. 6 because limit switch LS6 is in longitudinally alined relation with comb return limit switch LS7 and limit switch LS12 is in longitudinally alined relation with scraper return limit switch LS13. This description gives the location of these several limit switches on the molding machine while these switches are further shown with the electric circuits they control in the wiring diagram, FIGS. 40A, 40B and 40C.

When the tray 194 is moved into the advance position for receiving the nuts discharged from the mold pins 79 and the sprue discharged from the sprue pins 68 and 69 as described above and shown in FIGS. 16 and 17, the free end of the tray projects slightly into a nut discharge casing 187 through an opening in the side wall thereof, see FIGS. 23 and 24. The scraper 175 in moving from return to advance position pushes the discharged nuts from bottom tray plate 195 into the nut discharge casing 187.

Figure 13:
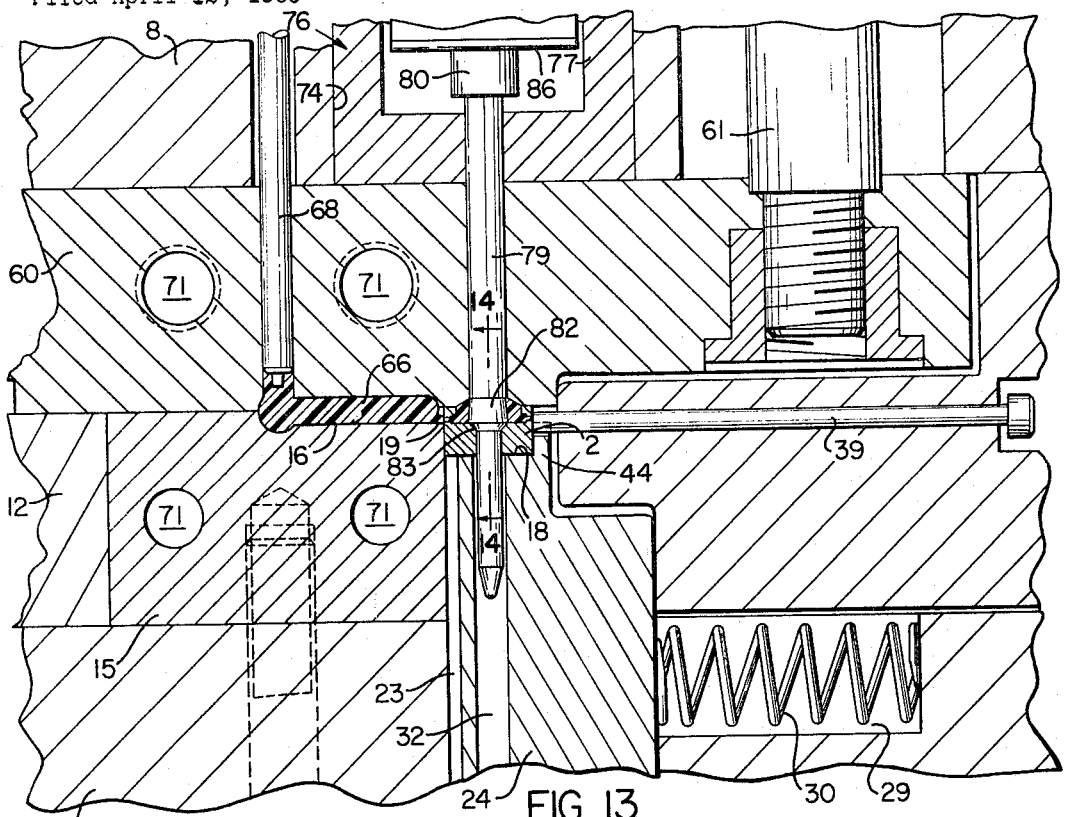
FIG. 13 is a fragmentary cross section similar to FIG. 12 on a substantially enlarged scale with the mold in closed position illustrating the runner block, the locating block and the upper section of the mold, showing how plastic is molded in the recesses in the nuts.
Figure 15:
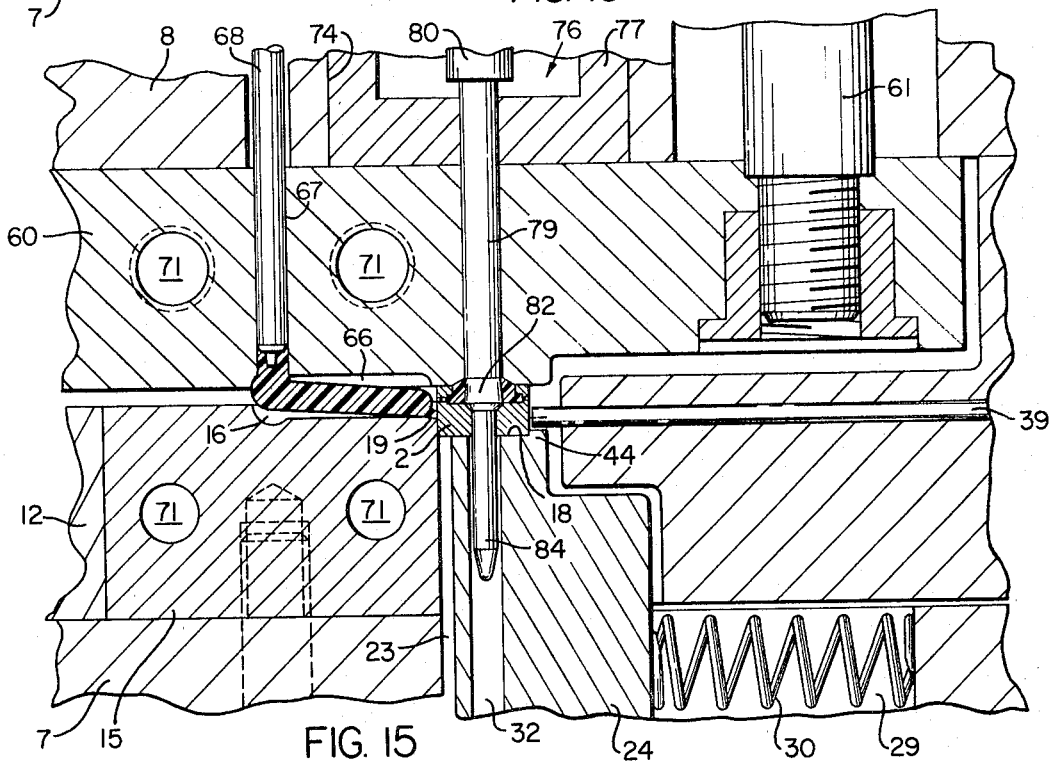
FIG. 15 is a view similar to FIG. 13 illustrating the upper or movable mold section moved slightly away from the lower stationary mold section to show how the locating block and movable mold section cooperate to move the nuts in the guideway upwardly along the side wall of the runner block to shear the plastic along the outer side walls of the nuts.

By reference to FIGS. 3, 4, 5, 6, 13, 15, 16 and 17, it will be understood that when the molding of the inserts 5 in the nuts 2 has been completed, as shown in FIGS. 13 and 14, air blast limit switch LS15 will be operated to blow the nuts and sprue from the previous molding operation out of casing 187 and cover plate 197, respectively, as injection ram 150 is moved to return position. The mold will then be operated to start movement of the top support plate 8 and ejector or stripper plate 60 upwardly from the closed position shown in FIG. 13 toward open position. In the first portion of the opening movement, as shown in FIG. 15, locating bar 24 is moved upwardly by the springs 26 for shearing the plastic between the ends of the injection nozzles 19 and injection apertures 6 in the nuts 2. The sprue pins 68 will lift the sprue out of the channel portions 16 in runner block 15 upwardly, as indicated in FIG. 15. The slide member 35 will also be moved slightly toward the right in FIG. 15 to disengage side clamp pins 39 from the sides of the nuts.

The upper mold section then continues its upward movement to the open position of the mold shown in FIG. 8 with the ejector or stripper plate 60 engaged with the under face of top support plate 8. The air blast limit switch LS24 is operated just before the top mold section reaches open position to clean the mold, as hereinbefore described. After the top mold section has moved to the full open position, the stripper plate 60 is then moved from the return position against top support plate 8 downwardly toward the advance position, shown in FIGS. 8 and 16. Before the stripper plate 60 starts its movement toward advance position, the tray 194 is moved to its advance position under the top mold, as shown in FIGS. 16, 17, 23 and 24.

The ejector supporting plate 53 is operated in downward movement to move knockout sleeves 62 and sprue pins 68 and 69 downwardly. The lower ends of knockout sleeves 62 will engage the upper face of stripper plate 60 after a predetermined downward movement of ejector supporting plate 53. The further downward movement of ejector supporting plate 53 will move the ejector or stripper plate 60 downwardly away from the bottom face of top support plate 8. The sprue pins 68 and 69 will have the lower ends carrying the sprue moved below the bottom face of support plate 8 and stripper plate 60 in the downward movement thereof before the stripper plate 60 is engaged by knockout sleeves 62.

The first portion of the downward movement of stripper plate 60 by knockout sleeves 62 will strip the molded nuts from the mold section 82 of mold pins 79 so they will slide downwardly off of the lower ends of centering portions 84. The nuts will then drop through the opening between cover plates 197 and 198 of the tray 194 on to the bottom tray plate 195, as shown in FIG. 16.

As soon as the nuts are stripped from the mold section 82, the stripper plate will move downwardly until the heads on leader pins 63 engage the upper ends of leader pin bushings 64 for limiting downward movement thereof. The ejector supporting plate 53 will move downwardly to the top of support plate 8 for moving the lower ends of sprue pins 68 and 69 with the sprue into spaced relation below the stripper plate 60 supported by leader pins 63 in the advance position as shown in FIG. 16. The greater downward movement of ejector supporting plate 53 relative to ejector or stripper plate 60 is indicated by the distance between the lower ends of knockout sleeves 62 and the upper surface of stripper plate 60 together with the length of the leader pins 63.

The comb plate 181 is then moved into position under ejector plate 60 into the advance position, as shown in FIG. 16, between the sprue suspended on the ends of sprue pins 68 and 69 and the bottom face of ejector or stripper plate 60. The stripper plate 60 is then moved from the advance position spaced below top support plate 8 toward the return position against top plate 8 while the comb is held in advance position, as shown in FIGS. 16 and 17. The stripper plate 60 is moved from the advance position toward the return position by ejector supporting plate 53.

The ejector supporting plate 53 has a preliminary movement relative to the ejector or stripper plate 60 upwardly in movement toward the return position sufficient to withdraw sprue pins 68 from the position shown in FIG. 16 to the position shown in FIGS. 15 and 17. This movement is obtained by knockout sleeves 62 moving upwardly until the shoulders engage the heads of bolts 61. In this movement of the ejector supporting plate 53 the upward movement of sprue spins 68 and 69 above comb plate 181 will engage the sprue supported on the ends of the sprue pins with the under face of the comb plate and detach the sprue from the lower ends of the sprue pins. The sprue will fall downwardly onto the top of the cover plate 197, as shown in FIG. 17. The ejector supporting plate 53 will continue its upward movement into the return position moving the ejector plate 60 into the return position after the heads on bolts 61 engage the shoulders in sleeves 62 where it will remain while the top mold section is in open position.

This operation to strip the nuts from the mold pins and the sprue from the sprue pins with the operation of the tray and comb is described in greater detail hereinafter in connection with the fluid pressure diagram in FIG. 39 and the wiring diagram in FIGS. 40A, 40B and 40C. It will be understood that after the nuts and the sprue are discharged into the tray that the scraper 175 is then operated to push the nuts out of the tray into the nut discharge casing 187. This operation is secured while the tray and comb remain in advance position. When the nuts have been pushed out of the tray into nut discharge casing 187 by scraper 175, the scraper, the tray and the comb are then simultaneously returned to the starting position. These last nuts discharged into the nut discharge casing 187 are discharged from the casing during the next air blast operation by air blast limit switch LS15 the next time the mold is closed while closure plate 222 closes the opening in the side of the discharge casing 187. The sprue is blown out of the tray at the same time.

*Feeding and punching mechanism*

Figure 25:
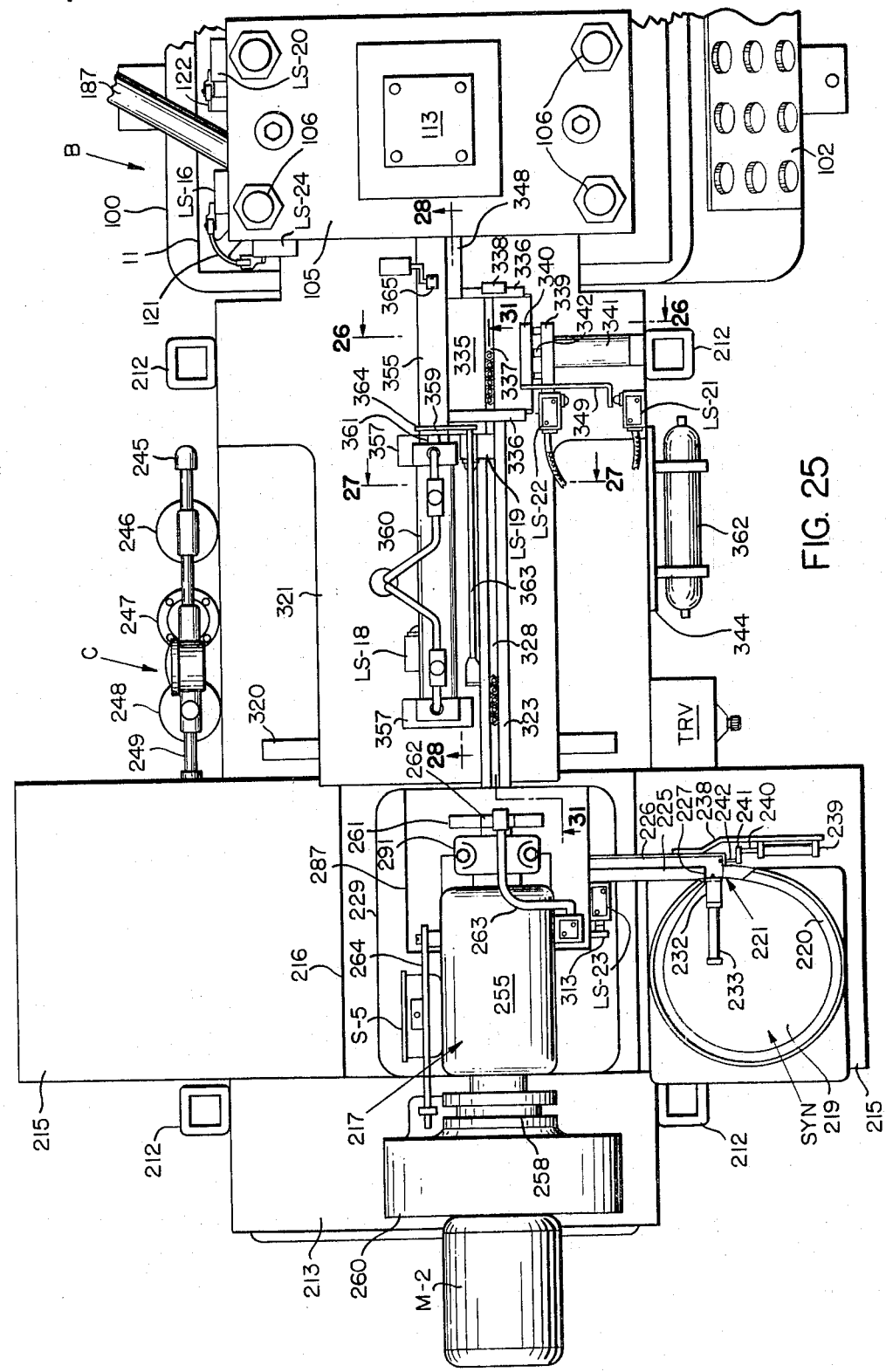
FIG. 25 is an enlarged plan view of one end of the machine showing the nut feeding, orienting, punching and conveying mechanism for delivering nuts to the mold for molding plastic in the recesses.

The feeding and punching mechanism C is shown in assembled relation with the mold and molding machine in FIGS. 3, 4 and 5. FIG. 25 shows an enlarged plan view of the assembled feeding and punching mechanism.

The feeding and punching mechanism has a supporting frame 210 formed of top longitudinally extending supporting bars 211 supported on legs 212 having tie rod connections between the lower ends of the legs and adjustable feet for adjusting the height of the supporting frame relative to bottom casing 100 of the molding machine. A terminal box 213 is mounted on the legs 212 at the outer side of supporting frame 210 for housing the relays and other controls for the feeding and punching mechanism. Crossbars 214 are mounted in spaced relation on the undersides of longitudinal supporting bars 211 at the outer side of supporting frame 210, project forwardly and rearwardly from the supporting frame and supporting bars 211 and carry supporting plate 215 at the front and rear portions of the frame. A supporting plate 216 is mounted on the upper edges of longitudinal supporting bars 211 at the outer side of supporting frame 210 for supporting a conventional punch 217.

A nut receiving hopper, orienting and feed device of conventional form, known as a Syntron feeder SYN is mounted on supporting plate 215 at the front side of the machine, as shown in FIGS. 3, 4, 25 and 40C. A hopper 219 at the upper part of this nut supply, orienting and feed device is mounted for vibratory movement in such a way that it feeds the nuts from the central portion of the hopper onto a circular track 220 in oriented position and discharges the nuts at an outlet indicated at 221. This conventional feeding device SYN is disclosed in one of the following patents:

2,464,216, Devol, Mar. 15, 1949; 2,609,914, Balsiger et al., Sept. 9, 1952; 2,615,184, Williams, Oct. 28, 1952; 2,654,465, Sgriccia, Oct. 6, 1953; 2,654,466, Spurlin, Oct. 6, 1953; 2,658,609, Weyandt, Nov. 10, 1953; 2,662,192, Weyandt, Dec. 8, 1953; 2,662,193, Weyandt, Dec. 8, 1953; 2,746,599, Weyandt, May 22, 1956; 2,758,704, Spurlin, Aug. 14, 1956.

A receiving track 225 is formed of an elongated bar having a guideway 226 formed therein and opening through the upper side as shown in FIG. 25, with an offset portion 227 at the outer end. The outer end of receiving track 225, has the offset portion 227, of guideway 226, alined with outlet 221 from the circular track 220 of the Syntron feed device SYN. The opposite end of receiving track 225 extends inwardly to the front portion of the punch 217 where the inner end is positioned to engage the bottom punch block 228 mounted on the base portion 229 of punch 217. The guideway 226 is supported in registry with the punch feed track on the bottom punch block 228. An angle bracket 230 is secured to the front wall of bottom punch block 228 and the bottom portion of receiving track 225. The outer end of receiving track 225 alined with the outlet 221 of the nut feed mechanism SYN is mounted on supporting plate 215 by a supporting post 231. The supporting post 231 is formed with suitable adjustable parts so that the front end of receiving track 225 can be accurately adjusted to register with the outlet 221 of the Syntron nut feed device SYN.

A bracket 232 is mounted at the outer end on the sidewall of the receiving track adjacent the nut feed device SYN which extends upwardly above the upper end of hopper 219 and inwardly over the hopper. The inner end of bracket 232 supports a cylinder 233 containing a piston mounted on piston rod 234 extending through bracket 232 and having the outer end slidably mounted in the sidewall of receiving track 225 for projection into the offset portion 227 of the guideway. Suitable tube connections are secured to the cylinder 233 and connected with a control valve mechanism and a compressed air supply for reciprocating the piston and piston rod in the cylinder 233 so that the outer end will move into the offset portion 227 in the guideway, engage a nut delivered thereto by the nut feed device SYN and push it laterally from the offset portion 227 into the outer end of guideway 226.

Figure 33:
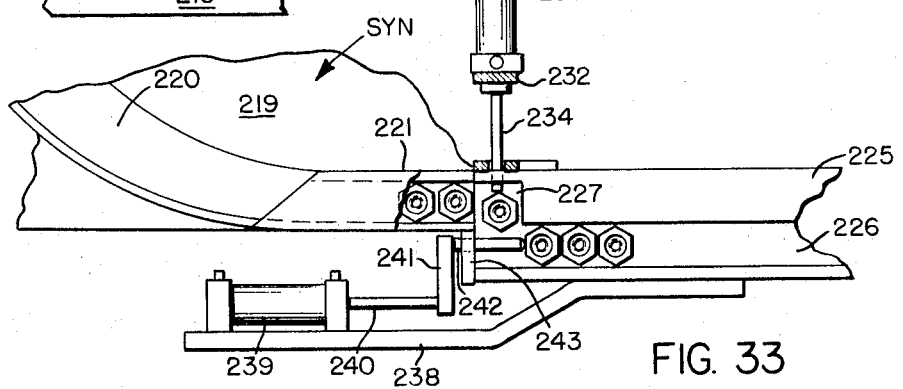
FIG. 33 is an enlarged fragmentary plan view showing the construction for feeding nuts into and along the receiving track.

A bracket 238 is mounted on the side of receiving track 225 opposite to the bracket 232, as shown in FIGS. 25 and 33, which has the outer end offset relative to the receiving track and extends beyond the end of the receiving track for supporting the feed cylinder 239 thereon. A piston rod 240 is slidably mounted in cylinder 239 with the piston mounted on the end of the rod in the cylinder and the outer end of the rod attached to a crosshead 241 extending from piston rod 240 toward the side of the nut unit SYN into alined relation with the end of the guideway 226 in receiving track 225. A feed pin 242 is mounted on the offset end of crosshead 241 is slidably guided in the end plate 243 at the outer end of receiving track 225 in alined relation with the center of the guideway 226. Suitable fluid pressure connections not shown, are attached to feed cylinder 239 and control valves for connecting the cylinder with a compressed air supply, to operate the piston to move feed pin 242 back and forth for feeding nuts in guideway 226.

When a nut is fed into the end of guideway 226 by the end of piston rod 234 from the offset portion 227 of the guideway, the piston in feed cylinder 239 will operate feed pin 242 to engage the nut and feed it in the guideway 226 toward the punch 217. The feed pin 242 engages the flat face on one side of the nut and feeds it forward in the guideway 226 with the flat faces at opposite sides of a series of nuts engaged with one another in alined relation in the guideway. Where hexagon nuts are fed by the machine as shown in the drawings, the corners between two intersecting sides of the nut will be positioned adjacent to the walls of the guideway 226 during the feeding movement of the nuts in the receiving track 225 for delivery into the punch 217.

The valve mechanism for controlling the operation of feed cylinders 233 and 239 is mounted on and between cross bars 214, see FIG. 5, and is electrically operated to alternately operate the pistons in the two feed cylinders for feeding a nut from the offset portion 227 of the guideway into the guideway 226 at the outer end thereof and then feed the nut toward the punch in the guideway 226. The electric circuits for controlling the automatic operation of the valves and these feed cylinders 233 and 239 is shown in the wiring diagram FIG. 40C. An electrically operated control valve 244, FIG. 5, is mounted on one of the cross bars 214 and has pipe connections not shown with feed cylinder 239 for controlling a supply of compressed air to operate the piston in the cylinder to feed nuts in the manner above described.

A pipe 245 is connected to a source of suitable compressed air which passes through a conventional filter 246, a control valve 247, and an oiling device 248. The air is then carried by a pipe 249 to the valve 244 for control thereby in operating the piston in feed cylinder 239. An electrically operated control valve 250 has a compressed air supply connection with the pipe 249 and other pipe connections not shown, controlled thereby with feed cylinder 233 for controlling the operation of the piston and piston rod 234 in feeding nuts from offset portion 227 of the guideway in receiving track 225 into the guideway 226.

The control valve 244 has an electromagnetic operating solenoid SP1 forming part of the valve for electrically operating the valve to one of its positions. The control valve 250 has an electro-magnetically operated solenoid SP2 for operating the valve to one of its operating positions. The electro-magnetic solenoids SP1 and SP2 are illustrated in FIG. 5, in connection with the illustration of the valves 244 and 250 and also in FIG. 40C, in the wiring diagram illustrating the electric circuits for controlling the operation of the machine.

The punch 217 has a head 255 secured to the base 229 by an upright 256 for rotatably supporting a drive shaft 257 mounting a clutch 258 at the outer end thereof for detachably connecting drive shaft 257 with a fly wheel and drive pulley constantly driven by an electric motor M2, mounted on a plate secured to the punch base 229. The drive mechanism is contained within the cover member 260.

The clutch 258 of the punch press 217 is operated by a control lever 264, FIG. 5, which is electro-magnetically operated by press trip solenoid S5, mounted on the upright 256 of the punch press, as shown in FIGS. 5 and 40C. The punch will be continuously operated whenever the press trip solenoid S5 is energized in the automatic control of the machine, as hereinafter described. This part of the punch construction except for soleoid S–5 is of conventional form and the details of construction are not illustrated.

The inner end of the drive shaft 257 carries an operating cam 261 having a switch operating cam lobe 262 projecting from the periphery thereof, as shown in FIGS. 5 and 40C. In the rotation of drive shaft 257 when the clutch 258 is engaged with the fly wheel and drive pulley, the operating cam 261 will be rotated so that the cam lobe 262 will operate the switch arm 263 to alternately close the switch contacts CS1 and CS2, FIG. 40C. This will operate the electro-magnetic solenoids SP1 and SP2 to alternately operate the control valves 244 and 250 for moving the piston rod 234 in feed cylinder 233 to feed a nut delivered into offset portion 227 into the guideway 226. The piston in feed cylinder 239, piston rod 240 and feed pin 242 are then operated to feed the nut from the end of the guideway 226 toward the punch 217 in guideway 226 and hold the nut with the piston rod 240 in its projected position until the cam lobe 262 operates the switch to feed another nut.

The receiving track 225 has the inner end engaged with one end of the punch feed track section 270 formed with a guideway 271 in the top portion in registry with the guideway 226 of receiving track 225, as shown in FIGS. 34 and 37. The bottom of punch feed track 270 is formed with a side flange 272 engaged by a clamping bar 273 bolted to bottom punch block 228 for retaining punch feed track section 270 in fixed position on the bottom punch block. The guideway 271 terminates in the intermediate portion of track section 270 at the stop shoulder 274. The top portion of track section 270 beyond shoulder 274 and guideway 271 has a portion formed with an upwardly opening channel slidably receiving spring pressed pin 275. Spring pressed pin 275 is alined with guideway 271. The punch feed track section 270 has the opposite end portion adjacent the portion formed with the channel, recessed to receive the outer reduced end of spring pressed pin 275.

A compression spring is engaged between the track section 270 at the outer end of the recessed portion and an outwardly facing shoulder on pin 275 located in the recessed portion for normally moving the spring pressed pin inwardly. The inner end of pin 275 will move inwardly into the end of guideway 271 adjacent stop shoulder 274 until the compression spring engages the track section 270 at the inner end of the recessed portion, FIGS. 34 and 37. A cover plate 276 is secured on the top face of punch feed track section 270 between the end engaged by receiving track 225 and the channel portion just beyond stop shoulder 274 where it engages the inner end of retainer plate 277. The cover plate 276 has an attaching portion extending from one side thereof downwardly and outwardly to engage one side of track section 270 with the outer end secured by screws or the like to bottom punch block 228. This cover plate 276 cooperates with clamping bar 273 to hold the punch feed track section in position on the bottom punch block. The retainer plate is suitably secured to the top face of the track section over the channel formed therein for slidably retaining spring pressed pin 275 in the channel.

The feed pin 242 normally held in projected position by the piston in feed cylinder 239 will move the nuts in guideway 271 to engage and move spring pressed pin 275 outwardly, until the inner extremity is alined with stop shoulder 274 and the side of a nut engages the stop shoulder 274 at the inner end of guideway 271. The punch feed track section 270 has a side discharge opening 278 from which the nuts are discharged for movement toward the punching mechanism.

Figure 38:
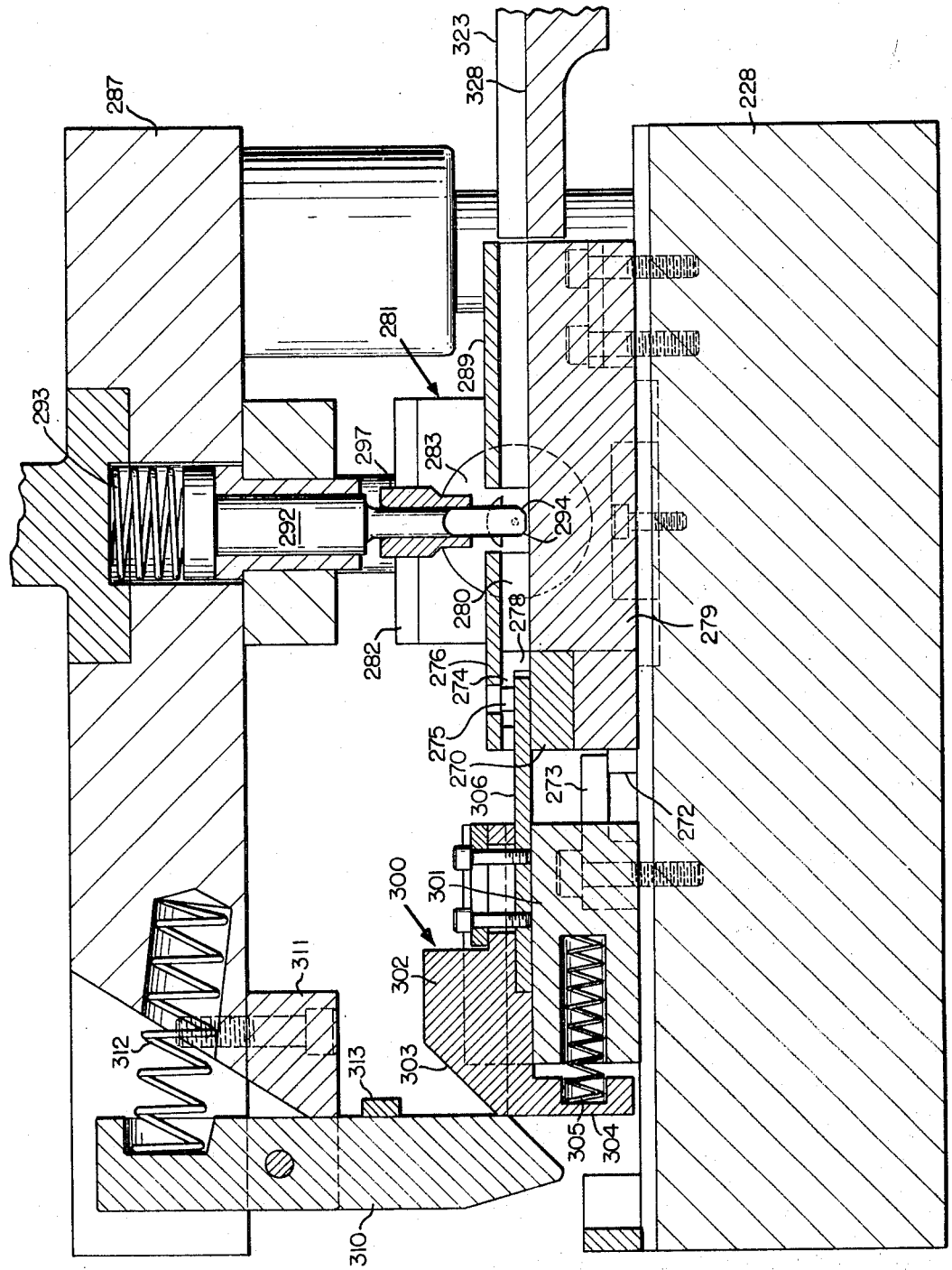
FIG. 38 is a cross section taken approximately on the line 38—38 of FIG. 34.

A punch guide track 279 is formed with a guideway 280 having the inner open end engaged with the inner side of punch feed track section 270 with the guideway 280 in registry with side discharge opening 278, as shown in FIGS. 34 and 38. The inner end of punch guide track 279 has a tongue on the bottom portion engaged in a slot in the bottom portion of track section 270, as shown in FIG. 38. The guideway 280 is of less width than the guideway 271 because the nuts are fed with opposite side faces positioned to slidably engage the side walls of punch guide track 279 forming opposite sides of the guideway 280. This operation is obtained by feeding the nut having a flat face engaged with spring pressed pin 275 along the stop shoulder 274 through side discharge opening 278 until it engages in guideway 280 with the same side face of the nut engaging the adjacent side wall of punch guide track 279 in guideway 280. The outer end of the punch guide track 279 is formed with supporting feet bolted or otherwise suitably secured to the top face of bottom punch block 228 for rigidly securing punch guide track 279 in position on top of the bottom punch block. Several hexagon type nuts are indicated in dotted lines in FIG. 34 to show the positions they occupy in being fed from guideway 271 into guideway 280.

Figure 35:
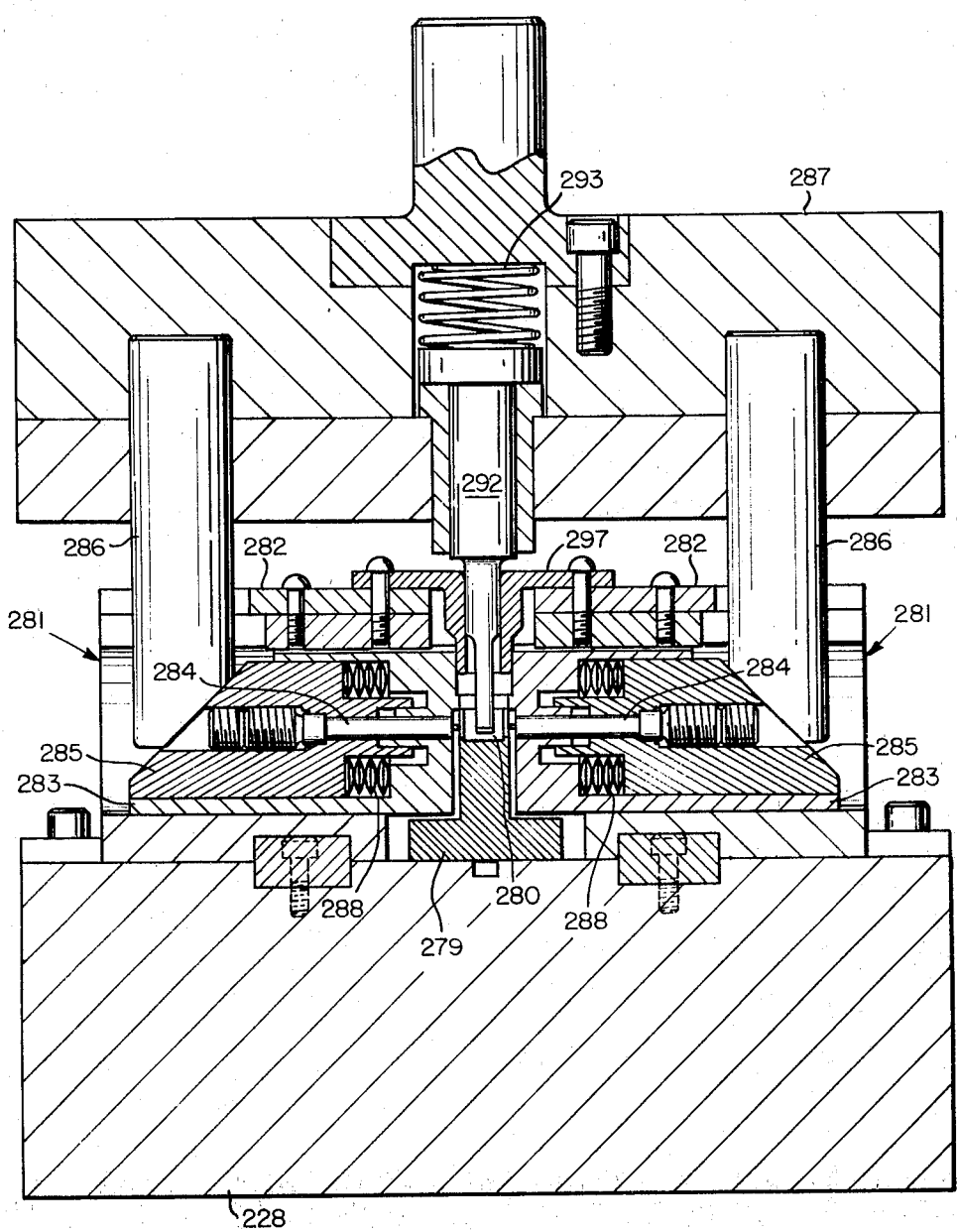
FIG. 35 is a vertical cross section through the nut punching mechanism taken approximately on line 35—35 of FIG. 34.

A pair of punch housings 281 are mounted one on each side of punch guide track 279, see FIGS. 34 and 35, with a transverse slot formed in the bottom wall of each housing engaged over a locating bar. Two locating bars are provided, one being mounted on each side of punch guide track 279, as shown in FIG. 35. Each locating bar is mounted in a recess in bottom punch block 228. The punch housings 281 are detachably mounted on the top face of bottom punch block 228, suitably secured thereto by bolts or the like and retained against movement by the locating bars. A cover plate 282 is detachably mounted on the top of each punch housing 281 to close the upper open end of the housing for cooperation therewith to adjustably support a punch slide holder 283. Each punch housing 281 has the punch slide holder 283 mounted in a fixed adjusted position at the inner end thereof for slidably supporting a punch 284 and a punch operating slide member 285. The punch operating slide member 285 is slidably engaged in the outer end of punch slide holder 283.

Figure 36:
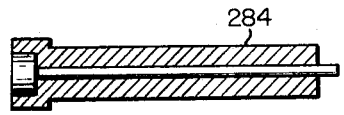
FIG. 36 is an enlarged detail cross section through the punch member used in the punching mechanism shown in FIGS. 34 and 35 for illustrating the details of construction.

The outer end of each punch 284 is rigidly and detachably mounted in a punch operating slide member 285. The inner end of a punch 284 slidably extends through a bore in the punch slide holder 283 with the inner terminal portion of a punch projecting inwardly from the punch slide member into a recessed portion in a side wall of punch guide track 279, as shown in FIGS. 34 and 35 for movement to engage and punch small apertures through opposite side walls of a nut positioned between the punches to provide the injection apertures 6 between the recess 4 in the nut 2 and the side walls thereof. These punches, 284, are located in alined relation on opposite sides of the punch guide track 279. One of the punches 284 is shown in enlarged cross section in FIG. 36 and is formed with a hardened steel punch mounted in the center bore of a cylindrical main body having one end portion projecting inwardly beyond the end of the main body a sufficient distance to punch the small opening in the side wall of a nut to form the injection aperture 6 therein. The cover plate 276 is also formed with a side extension at the inner end to fit over the top of punch guide track 279 between track section 270 and the adjacent end of the recess for receiving the punches 284, see FIG. 34. A cover plate 289 is mounted on the top outer end of punch guide track 279 and extends from the outer side of the recess for punches 284 to the outer end of the track. The cover plates 276 and 289 provide a closure for the open upper portions of guideways 271 and 280 for cooperation in guiding the nuts therein.

A nut control detent 295 is mounted on one side of punch guide track 279 and has a spring pressed ball 296 forming the detent partially projecting through an aperture in guide track 279 into guideway 280. The ball 296 is positioned a predetermined distance from the center line for punches 284 to engage a nut after it leave the punching position for limiting movement of the nuts in guideway 280 between guideway 271 and detent 295. When nut feed bar 306 is operated to feed a nut from guideway 271 into guideway 280 toward the punching mechanism, the nut engaging the spring pressed ball 296 will be pushed outwardly in guideway 280 to force ball 296 into its casing in moving past the ball. The ball 296 will be pushed out by the spring as soon as the nut is pushed by it and the next nut will be stopped by the ball 296 so that a nut to be punched with apertures 6 will be centered ready for the pushing operation.

The outer ends of the punch operating slide members 285 are beveled from the top outwardly toward the bottom to provide an upwardly facing beveled end positioned for engagement by punch operating bars 286 extending downwardly from the movable punch block 287. The lower ends of the punch operating bars 286 are formed with complementary beveled ends for engaging the beveled end portions of punch operating slide members 285. When movable punch block 287 is moved downwardly the beveled ends of punch operating bars 286 will engage the outer ends of slide members 285 and force them inwardly against the tension of compression springs 288 for moving punches 284 inwardly to punch injection apertures in opposite side walls of a nut positioned between the punches in guideway 280 as will be understood from the positions of the parts shown in FIGS. 34 to 38. The illustration of nuts is omitted from FIGS. 35 to 38. It will be understood that punch block 287 with the parts mounted thereon has been shown moved downwardly about half of the distance toward its lower limit of movement in FIGS. 35, 37 and 38.

The upper movable punch block 287 is detachably mounted on the movable punch head 290 slidably mounted in gibs on the inner face of punch head 255. An eccentric, not shown, mounted on the inner end of punch drive shaft 257 adjacent the inner end of punch head 255 mounts a drive link 291 having a pivoted connection with slidable punch head 290 for reciprocating slidable punch head 290 in a vertical direction during the rotation of shaft 257. The punch head 290 moves the movable punch block 287 between its upper and lower limits of movement for operating the punches 284 to punch the injection apertures in nuts successively positioned between the punches. Movable punch block 287 and bottom punch block 228 are provided with guide pins and bushings at the corner portions thereof for accurately guiding and holding the movable punch block 287 in position relative to stationary punch block 228 to secure accurate operation of the punches.

A centering pin 292 is slidably mounted in the movable punch block 287, FIGS. 35 and 38, so that the vertical axis of the centering pin intersects the common axis of punches 284. The upper end of centering pin 292 has an annular flange forming a head thereon for engaging a guide bushing mounted in movable punch block 287 to limit its downward movement and a compression spring 293 normally moves the centering pin to its lower position of movement relative to the slidable punch head 290. The lower end of centering pin 292 is located above the upper edges of punch guide track 279 when the movable punch block 287 is at its upper limit of movement. A guide bushing 297 has supporting arms engaging the upper faces of cover plate 282 to which it is secured with the bushing centered to guide centering pin 292 into position to accurately center a nut between punches 284. The lower end of centering pin 292 has a transverse dimension equal to the size of the beveled edge 3 formed in the nut where it merges with the adjacent wall of the recess 4, as shown in FIG. 1.

The lower extremity of centering pin 292 is formed with complementary beveled portions 294 which engage the beveled portion 3 in each nut 2 along the longitudinal center portion of nuts in the guideway 280 between punches 284. Opposite side portions of the lower end of the guide pin 292 facing punches 284 are removed so that when the lower end of the guide pin extends through the recess 4 into the nut to engage the bevel 3, it will operate to center and locate each nut in centered relation between the punches 284 and hold the nut during the punching operation. By having the sides adjacent the punches cut away, as shown in FIG. 35, sufficient space is allowed for the punches to extend through the side walls of a nut in punching the injection apertures 6 in the sides of a nut without engaging the centering pin and without interfering with the slug discharged by the punch. The slugs will fall into the recess 4 in the nut and subsequently fall out of the bottom portion of the nut through the threaded bore 3 and an opening, not shown, in the bottom of punch guide track 279.

A nut feed unit 300 has a base portion 301 mounted on the outer end portion of bottom punch block 228 in predetermined spaced relation outwardly from the outer side wall of punch feed track 270. A feed slide member 302 is slidably mounted in base portion 301 and has an upwardly facing beveled outer end portion 303 and an arm an arm 304, depending from the bottom of the outer end portion. A compression spring 305 is engaged with the inner face of the depending arm 304 and has the inner end engaged in a seat portion in base portion 301 for normally moving feed slide member 302 outwardly away from punch feed section 270.

A nut feed bar 306, FIGS. 34 and 38, has one end adjustably mounted on feed slide member 302 and the opposite end positioned to project through a slot in the outer side wall of punch feed track 270 in alined and centered relation with punch guide track 279. The free end of nut feed bar 306 has a terminal portion formed with a V-shaped recess to form an angular terminal portion on the feed bar of the same size and shape as two adjoining sidewalls of a nut engaged in the end of guideway 271. This terminal portion of nut feed bar 306 will engage two adjacent sides of a nut in the end of guideway 271 and in the sliding movement of feed slide member 302 the nut feed bar 306 will move a nut from the end of guideway 271 into the adjacent end of guideway 280 toward the punch housings 281. FIG. 34 shows the feed slide member 302 where the free end has been engaged with a nut for moving the nut from the guideway 271 into the guideway 280 through side discharge opening 278. The compression spring 305 is compressed when feed slide member 302 is in the position shown in FIG. 34. This compression spring will normally move the slide member 302 outwardly to withdraw the free end of the nut feed bar 306 until the terminal portion has moved out of the end of the guideway 271 and lies in or beyond the end of the slot in the side wall of punch feed track section 270 with depending arm 304 engaging a stop block mounted on the outer margin of bottom punch block 228.

The movable punch block 287, see FIGS. 4, 37 and 38, has a feed slide operating bar 310 projecting downwardly therefrom with a beveled lower end complementary to beveled outer end portion 303 of feed slide member 302 while the upper end portion is pivotally mounted in attaching block 311 secured to the under face of movable punch block 287 at the outer edge thereof in alined relation with the guideway 280 in punch guide track 279 and centering pin 292. The upper terminal portion of feed slide operating bar 310 projects into a recess in movable punch block 287 which contains a compression spring 312, FIG. 38, between the inner upper terminal portion feed slide operating bar 310 and the inner end of the recess.

The compression spring 312 normally holds feed slide operating bar 310 in a substantially vertical position. When the movable punch block 287 moves downwardly to operate the punches for punching the injection apertures in opposite sides of a nut, the feed slide operating bar 310 will engage the lower cam face thereon with the beveled outer end portion or cam face 303 on feed slide member 302. The slide member 302 will move inwardly to engage the free end of nut feed bar 306 with a nut in the guideway 271 and feed it into the guideway 280 before centering pin 292 operates to center a nut between the punches and before the punches are operated. This feeding operation takes place before the punches operate so that a nut is feed by nut feed bar 306 into position for centering by centering pin 292 between punches 284.

Feed slide operating bar 310 carries an operating arm 313 for operating a punch cam kickout limit switch LS23 mounted on the outer rear side of movable punch block 287, as shown in FIGS. 5 and 37. This operating arm 313 and punch cam kickout limit switch LS23 are positioned so that whenever nuts jam in the guideway 280 of punch guide track 279, movement of the movable punch block 287 downwardly to engage and operate feed slide member 302 to feed a nut will cause feed slide operating bar 310 to have the lower end move outwardly about its pivot against compression spring 312 and move operating bar 313 to disengage the operating button for limit switch LS23 to close the switch and close a circuit for stopping operation of the entire feed mechanism C. This limit switch LS23 is shown in the wiring diagram FIG. 40C and its operation is described in connection with the operation of the entire machine.

A pair of upright supporting plates 320 have the lower edges mounted in transversely extending relation on the upper edges of the top longitudinal supporting bars 211. One upright supporting plate 320 is located in the central portion across the bars 211 adjacent base portion 229 of the punch 217 while the other upright supporting plate 320 is located across the inner ends of the top longitudinal supporting bars 211 adjacent to the molding machine. A feed table 321 is secured to the upper edges of the upright supporting plates 320 in substantially horizontal and parallel relation above the upper edges of the longitudinal supporting bars 211, see FIGS. 3, 4, 5 and 25. The outer edge of feed table 321 terminates closely to the inner edge of bottom punch block 228 while the inner end terminates adjacent the outer edge of bottom support plate 7 of the mold. A pair of alining arms 322 are detachably mounted at one end on the front and rear faces of bottom support plate 7 of the mold, while the opposite ends project outwardly beyond the outer side of the mold to engage the under face of feed table 321 and support it in position to properly aline the nut feeding parts carried by the feed table with the guideway 18 and runner block 15 provided on the bottom support plate 7 of the mold.

A vibratory delivery track 323 is carried by supporting studs extending in spaced relation through slots in feed table 321 for connecting it with a vibratory armature 324. Flexible arms 325 are attached to armature 324 at one end and at the opposite ends to the casing of electromagnet 327. The armature of the electromagnet has a pin connection with the armature for vibrating the track 323. The electromagnet 327 is mounted on a supporting plate 326 extending between longitudinal supporting bars 211 and secured to the lower intermediate portions under feed table 321, see FIGS. 4 and 31. The electromagnet 327 and vibratory armature 324 form a part of a conventional construction of a track vibrator TRV, FIGS. 4, 25, 31 and 40C, known as a Syntron vibrator made by the Syntron Company of Homer City, Pennsylvania and disclosed in one or more of the following patents: 2,094,697, Flint, Oct. 5, 1937; 2,187,717, Weyandt, Jan. 23, 1940; 2,094,698, Flint, Oct. 5, 1937; 2,464,216, Devol, Mar. 15, 1949; 2,094,785, Flint, Oct. 5, 1937; 2,585,719, Alvord, Feb. 12, 1952; 2,094,786, Flint, Oct. 5, 1937; 2,918,590, Gilbert, Dec. 22, 1959; 2,094,787, Flint, Oct. 5, 1937.

With the exception of the electromagnet 327 the track vibrator TRV has the control parts for its electrical operation contained in a casing mounted on the front of top longitudinal supporting bar 211 adjacent the inner side of supporting plate 215, see FIG. 4.

Figure 31:
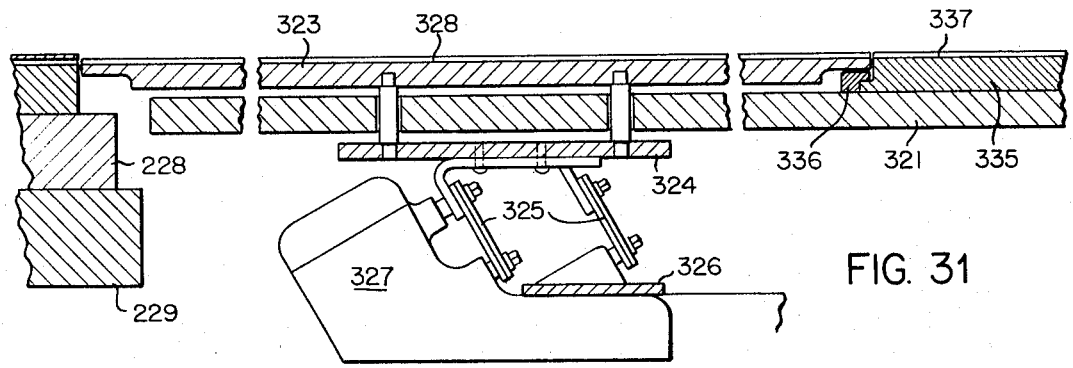
FIG. 31 is a vertical longitudinal cross section taken approximately on line 31—31 of FIG. 25.
Figure 32:
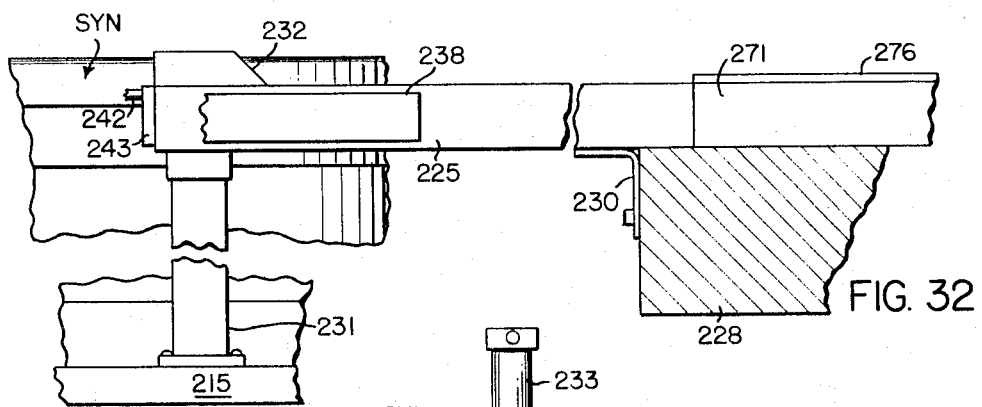
FIG. 32 is an enlarged fragmentary side elevation showing the mounting for the receiving track looking from the right in FIG. 25.

One end of delivery track 323 has the longitudinally extending guideway 328 therein alined with the guideway 280 in punch guide track 279. The terminal portion of the vibrating delivery track 323 extends over the upper surface of bottom punch block 228 and is slightly spaced from the adjacent end of punch guide track 279 as shown in FIGS. 31 and 34, so the end of the vibratory delivery track 323 will not engage the end of punch guide track 279 or punch block 228 during its vibrating motion. The vibratory motion imparted to the vibratory delivery track 323 by the armature 324 is such that it will cause nuts delivered thereto from the punch guide track 279 to slide along the track toward the opposite end thereof.

A track slide in the form of a flat substantially rectangular plate 335 has the bottom surface slidably supported on the upper surface of feed table 321. Guide bars 336 are secured to feed table 321 along opposite sides of track slide 335 and have flanges extending inwardly toward each other from the upper faces thereof engaging over outwardly extending flanges along the sides of the lower portion of track slide 335 for slidably guiding track slide 335 for transverse movement across the upper surface of feed table 321. The upper surface of track slide 335 is formed with a guideway 337 positioned in the track slide to register in the back position with the end of vibratory delivery track 323 and the guideway 328 therein, as shown in FIG. 25. The guideway 328 in vibratory delivery track 323 has an end extending over the upper face of the adjacent guide bar 336 in spaced relation and terminating at a slight distance from the near edge of track slide 335 in order to avoid contact with the track slide during vibration of the delivery track.

The guideway 337 and track slide 335 have a predetermined dimension fixed to receive a predetermined number of nuts, for example, sixteen nuts of a predetermined size, as hereinabove indicated. The length of the guideway 337 counts the number of nuts and is formed to receive only the fixed number which the guideway 18 in the mold will accommodate. When the predetermined number of nuts have been delivered into the guideway 337, the leading nut at the right end of the guideway 337, as shown in FIG. 25, will engage and close a pair of contacts, the location of which is indicated in FIG. 25 by the rectangular block 338, the contacts being designated CT–10 in the wiring diagram FIG. 40C. This pair of contacts CT–10 close a circuit when the track slide 335 is full of nuts for temporarily stopping the operation of the nut feeding and punching mechanism located in advance of the track slide.

A stop bar 339 carrying stop pins is mounted on feed table 321 with the stop pins accurately positioned to stop the movement of track slide 335 in the back position for accurately alining the guideway 337 therein with the guideway 328 in vibratory delivery track 323. The front end of the track slide 335 has a bar 340 mounted on the upper face and extending upwardly therefrom. A track cylinder 341 has the rear end mounted on stop bar 339 and the front end on a supporting block on feed table 321, as shown in FIG. 25. A piston is slidable in track cylinder 341 and is mounted on one end of piston rod 342 having the other end connected to bar 340.

Track cylinder 341 has pipe connections, not shown, with an electrically operated control valve 343 mounted on a supporting plate 344 having the upper end secured to the front top longitudinal supporting bar 211 and suspended therefrom, as shown in FIGS. 4 and 25. This electrically operated track control valve 343 also has a pipe connection with the pipe 249 for supplying compressed air through track control valve 343 to opposite ends of the track cylinder 341 for reciprocating the track back and forth between its opposite limits of movement. When the track slide 335 is filled with nuts and closes the contacts CT–10, FIG. 40C, track control valve 343 will be operated to supply compressed air to track cylinder 341 for moving the track slide 335 from the back position shown in FIG. 25 to the forward position.

Figure 30:
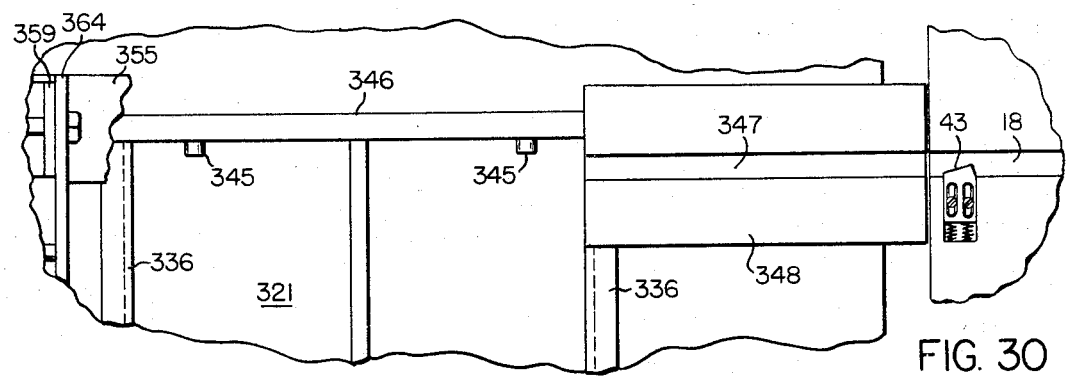
FIG. 30 is an enlarged fragmentary plan view of the feed table showing the guideway for the cross slide, the pusher with portions broken away to show the guide bar for the pusher and the auxiliary track member and its arrangement relative to the bottom mold section, the pusher and cross slide.

In the forward position of track slide 335 the rear edge will engage stop blocks 345 detachably and accurately mounted in spaced relation on pusher bar supporting rail 346, FIG. 30, for limiting the rearward movement of track slide 335 to position guideway 337 therein in registry with the guideway 347 in auxiliary track 348. Auxiliary track 348 has outwardly extending flanges formed on the lower portion thereof detachably secured on the inner marginal portion of feed table 321 with the guideway 347 therein alined with the guideway 18 in the bottom mold section. One end of the auxiliary track 348 is engaged with the adjacent face of the mold in alining the guideway 347 therein with the guideway 18 in the bottom mold section, while the opposite end of auxiliary track 348 terminates in position to substantially slidably engage the adjacent side of track slide 335 when it is moved to track forward position for alining the guideway 337 with the guideway 347. The nuts in the guideway 337 of track slide 335 are then in position to be pushed out of the track slide through the guideway 347 of auxiliary track 348 into the guideway 18 in the bottom mold section.

The bar 340 on the front end of track slide 335 also has one end of a switch operating arm 349 mounted thereon while the opposite end extends forwardly and is formed with a laterally extending terminal portion positioned to engage and operate track back limit switch LS21 in the back position of track slide 335 and track forward limit switch LS22 when the track slide is in the forward position engaged with the stop blocks 345. These limit switches LS21 and LS22 control electric circuits for operating control valve 343 to supply compressed air to track cylinder 341 for moving track slide 335 to forward and back position, as shown in FIGS. 4, 25 and 40C, for controlling operation and feeding of a supply of nuts into the mold.

The feeding mechanism provides a pusher assembly for pushing the nuts from the guideway 337 in track slide 335 through the guideway 347 in auxiliary track 348 into the guideway 18 in the bottom mold section when the mold is in open position, see FIGS. 3, 4, 5, 25 and 26 to 30. This assembly has a pusher bar 355 formed of an elongated narrow bar having flat upper and lower faces with the lower central portion formed with a longitudinally extending guide channel 356 slidably receiving the pusher bar supporting rail 346 having the lower margin engaging the upper face of feed table 321 and rigidly secured thereto for supporting pusher bar 355 for substantially horizontal sliding movement in spaced relation above feed table 321. The pusher bar 355 has the bottom face positioned to move over the top surface of track slide 335, over the top face of auxiliary track 348 and the upper face of the stationary bottom mold section in the forward position.

The pusher 355 or pusher bar or member has a marginal flange depending from the under face thereof along each side margin forming a nut engaging member 358. Each nut engaging flange or member 358 depends from the rear marginal portions at the end of pusher 355 opposite to the end adjacent auxiliary track 348 and has the forward end terminating intermediate the ends of the pusher bar in a position to clear the track slide 335 when the pusher is in the back position. The forward end of each flange 358 is formed with a V-shaped recess for engaging two adjacent sides of a nut to be engaged for feeding by the pusher, FIG. 29. The pusher flange 358 at the side adjacent to track slide 335 is located in alinement with the guideway 337 in the track slide when it is in the forward position and also in alined relation with guideway 347 in auxiliary track 348 and guideway 18 in the stationary bottom mold section.

This arrangement is such that when the track slide 335 is in the forward position, the depending flange 358 will have the V-shaped recess in the leading end thereof engage the nut in the adjacent end of the guideway 337 in track slide 335. As pusher 355 moves toward the mold, flange 358 will slidably engage in the guideways 337, 347 and 18 and push the nuts from the guideway 337 through guideway 347 into the guideway 18 in the bottom stationary mold section in position to be held by the latch 43 and plunger 46 in the bottom mold section for being subsequently located to have the injection apertures 6 therein registered with the injection nozzles 19 in the runner block 15 in the bottom mold section. The pusher 355 reciprocates between back and forward positions for feeding nuts from track slide 355 into the guideway 18 in the bottom stationary mold section when the track slide is in the forward position.

A flange 359 is rigidly mounted on the upper face of pusher bar 355 in an intermediate portion thereof and extends upwardly from the top surface of the pusher bar. A pusher cylinder 360 is mounted on spaced supporting blocks 357 projecting upwardly from feed table 321. The supporting block 357 adjacent track slide 335 has a recess through which pusher bar 355 projects. The pusher cylinder 360 is supported in spaced relation above the pusher bar and feed table 321, see FIGS. 3, 4, 5 and 25 to 30. A piston is slidably mounted in pusher cylinder 360 secured to one end of piston rod 361 having the opposite end secured to flange 359. The piston in pusher cylinder 360 is reciprocated by compressed air to move piston rod 361, flange 359 and pusher bar 355 between the back and forward positions for feeding a supply of nuts from the track slide 355 to the guideway 18 in the stationary bottom mold section.

Suitable pipe connections are made with pusher cylinder 360 and an electrically operated pusher control valve 362. Only portions of the pipes are shown for convenience in illustration. The pusher control valve 362 is mounted on supporting plate 344 above track control valve 343, as shown in FIG. 4. Pusher control valve 362 also has a pipe connection with the compressed air supply pipe 249 so that compressed air from a source of supply is provided for operating pusher 355 under the control of pusher control valve 362.

A pusher back limit switch LS18 is mounted on feed table 321 in a predetermined position so that the rear end of pusher bar 355 will engage and operate the switch arm in the back position of the pusher for closing the circuits controlled thereby. A pusher forward limit switch LS19 is mounted on a bracket carried by the forward supporting block 357 for pusher cylinder 360, FIGS. 25 to 28. A switch operating arm 363 has one end secured to a plate 364 attached to the flange 359 while the opposite end is formed with a depending arm positioned to engage and close the circuit controlled by pusher back limit switch LS19 when pusher bar 355 is in the forward position over the bottom stationary mold section. The pusher forward limit switch LS19 and pusher back limit switch LS18 are both shown in the wiring diagram FIG. 40C in addition to their locations being shown in FIGS. 3, 4, 5 and 25 to 28. The track slide 335 and pusher bar 355 are operated in sequence by compressed air or other suitable compressed fluid operating the pistons in the track cylinder 341 and pusher cylinder 360 so that the track slide will first receive a complete supply of nuts in the guideway 337. Then, track slide 335 will be moved into the forward position so that pusher 355 may be operated to push the nuts from guideway 337 into the guideway 18 in the stationary bottom mold section. The controls operate to time the operation of the pusher so that it will not operate until the top mold section moves into the upper open position. The pusher 355 is operated to deliver or push a new supply of nuts from the track slide into the bottom mold section as soon as the mold opens and during the time the ejector mechanism is operating to discharge the previous supply of molded nuts into the tray and from the mold. The operation of the track slide and pusher will be described in greater detail in connection with the subsequent description of the feeder and machine operation.

A guide roller 365 is mounted on a bracket extending upwardly from feed table 321 at the inner end thereof adjacent to the forward end of pusher bar 355 so that the roller will extend over and engage the central top face of pusher bar 355 for cooperation with pusher bar supporting rail 357 in guiding the movement of the pusher bar between forward and back positions.

A feeder instrument panel 366, FIG. 4, is mounted on the front end portions of cross bars 214 below the front edge of supporting plate 215. The manually operated switches and push buttons for controlling and starting the various parts of the feeder and the signal lights are mounted on this panel at the front of the feeder for convenient access to the machine operator.

*Fluid pressure system*

The hydraulic system for operating the molding machine is illustrated diagrammatically in FIG. 39 in addition to the cylinders and parts operated by the pistons having their locations shown in the several views illustrating the machine structure.

The electric motor M1 drives a pair of single fixed displacement pumps located in casing 100 and indicated diagrammatically at 400, FIG. 39. The pumps 400 pump hydraulic fluid from a reservoir 401 located in the bottom of bottom casing 100 of the molding machine through a suitable filter 402 and inlet pipes 403. Delivery pipes 404 extend from pump 400 and have a check valve 405 connecting them for equalizing pressure between the pipes 404. Delivery pipes 404 are connected to the inlet connections of pressure control valves 406. Valves 406 have a fluid by-pass pipe connection 407 with a heat exchanger 408 and a check valve 409 which have a discharge pipe connection 410 to the reservoir 401. A thermometer 411 is connected in discharge pipe connection 410 for registering the temperature of the hydraulic fluid so heat exchanger 408 can be controlled to maintain a desired hydraulic fluid temperature.

One pressure control valve 406 has a fluid pressure supply pipe 415 connecting it to a pressure control valve 416. Valve 416 has a pipe 417 connecting it with the inlet of the high-low pressure control valve 418. The valve 418 has an electric solenoid HPS operating a two position valve into high pressure position while a valve spring normally moves the valve to the low pressure position in which the pipe 417 discharges fluid through the valve to discharge pipe 419 and reservoir 401. Solenoid HPS is controlled by low-high pressure limit switch LS17 in the operation of the machine as hereinafter described.

A delivery pipe 404 extends from pumps 400 to supply the several valves for controlling operation of the several pistons in the cylinders on the molding machine for operating the various parts thereof. These control valves are all mounted on a supporting panel in bottom casing 100 accessible through one of the doors 103 or 104 at the front of the bottom casing. A primary clamp cylinder control valve 420 is a three position valve normally spring operated into the center position and operated into positions at opposite sides of the center position by the open press solenoid OPS and the close press solenoid CPS selectively according to the operation of electric controls hereinafter described. Delivery pipe 404 is connected to the inlet for primary clamp cylinder control valve 420 and a fluid drain pipe 421 discharges fluid through the valve into reservoir 401. In the center position valve 420 stops fluid flow from delivery pipe 404. When open press solenoid OPS is energized the valve will be moved to the right, as shown in FIG. 39, to connect the two passages in the left hand end, one with the delivery pipe 404 to supply fluid through pipe 422 to operate secondary clamp cylinder control valve 423 and the other to provide a connection with drain pipe 421.

Secondary clamp cylinder control valve 423 is a three position valve spring operated into the central position. Pipe 422 delivers fluid under pressure to valve operating cylinder 424 to move the valve 423 to the left as shown in FIG. 39. This supplies fluid under pressure from delivery pipe 404 through a passage in the right hand end of the valve 423, to pipe 425 through adjustable needle valve 426 therein to the lower end of clamp cylinder 113 for moving the piston therein upwardly to move the upper movable mold section into open position. Pipe 427 connects the upper end of clamp cylinder 113 through another passage in the right hand end of valve 423 to drain pipe 428. Limit switch operating rod 115 has a cam 118 thereon for engaging a switch arm on press open limit switch LS1 for closing the circuit controlled thereby for securing an automatic operation as hereinatfer described. When the piston in clamp cylinder 113 has moved the upper movable mold section into open position, open press solenoid OPS will be continuously energized to hold the mold in open position. Whenever the circuits to open press solenoid OPS and close press solenoid CPS are both open then primary control valve 420 will be spring operated to the center position cutting off fluid supply to valve operating cylinder 424 and connecting pipe 422 with drain pipe 421 so the springs will move secondary control valve 423 into the center position closing all passages therein and holding the piston in clamp cylinder 113 in the top position with the top movable mold section held in open position.

When close press solenoid CPS is energized, it will move primary clamp cylinder control valve 420 to the left as shown in FIG. 39 to move the right hand end of the valve into position to connect one passage therein with delivery pipe 404 to supply fluid pressure to connecting pipe 429 and valve operating cylinder 430 of secondary clamp cylinder control valve 423. The other passage in the right hand end of primary control valve 420 connects pipe 422 to fluid drain pipe 421. Secondary control valve 423 will be moved to the right to position the passages in the left end of the valve in position to supply fluid pressure from delivery pipe 404 to pipe 427 and connect pipe 425 to drain pipe 428.

The piston will be operated to move downwardly in clamp cylinder 113 for moving the top mold section into closed position. During the downward movement of the top movable mold toward closed position by the piston in clamp cylinder 113 the limit switch operating rod 116 will move the cam 118 thereon to engage the switch arm on low-high pressure limit switch LS17 to close the circuit controlled thereby and energize high pressure solenoid HPS. This will operate low-high pressure control valve 418 to move the valve to the left for connecting the passages in the right hand end with pipes 417 and 419.

Fluid flow through pipe 417 is cut off so that the pumps 400 will build up a high fluid pressure in delivery pipes 404 for transmission to pipe 427 and the upper end of clamp cylinder 113 for applying high pressure to the movable mold section as it is moved into closed position to hold the top movable mold section tightly in closed position. Limit switch operating rod 117 has a cam 118 thereon for engaging a switch arm on mold closed limit switch LS2 for closing the circuit controlled thereby for securing an automatic operation as hereinafter described. Needle valve 426 is adjustable for controlling the speed of operation of the piston in clamp cylinder 113.

The piston in ejector cylinder 125 is operated by fluid pressure through operation of primary ejector control valve 435 spring operated to move it into the position shown in FIG. 39. This connects delivery pipe 404 through one passage at the right end thereof to connecting pipe 436 to supply fluid under pressure to valve operating cylinder 437 to move secondary ejector control valve 438 into the position shown in FIG. 39 where it is held to supply fluid pressure from delivery pipe 404 through one passage to pipe 439 connected to the upper end of ejector cylinder 125. The lower end of ejector cylinder 125 is connected by pipe 440 to secondary ejector control valve 438 and will discharge fluid through the other passage in the position shown into drain pipe 428.

When ejector solenoid EJS is energized it moves primary ejector control valve 435 to the right, as shown in FIG. 39, to position the two passages at the left hand end thereof in position to connect delivery pipe 404 through one passage with connecting pipe 441 for delivering fluid pressure to valve operating cylinder 442. Secondary ejector control valve 438 will be moved to the left, as shown in FIG. 39, to position the two passages in the right hand end for supplying fluid pressure through one passage from delivery pipe 404 to pipe 440 and the lower end of ejector cylinder 125 for moving the piston therein upwardly. The other passage discharges fluid from the upper end of cylinder 125 through pipe 439 to drain pipe 428. Adjustable needle valve 443 is manually adjustable to control the rate of flow of fluid to ejector cylinder 125 and the speed at which the piston and ejector plate 60 is operated. The ejector or stripper plate 60 is operated to discharge the nuts from the mold pins 79.

The ejector return limit switch LS4 is operated to close the circuit controlled thereby in the return position of the piston in ejector cylinder 125. The ejector advance limit switch LS3 is operated to close the circuit controlled thereby in the advance position of the ejector piston in cylinder 125. The operation of the ejector piston and limit switches LS3 and LS4 is described in more detail in connection with the wiring diagram.

Injection of plastic into the heater cylinder 143 and the mold by the piston in injection cylinder 151, FIG. 39, is controlled by operation of primary injection control valve 447. This valve 447 is a two way valve spring operated into the position shown in FIG. 39 with one of the two passages in the right hand end supplying fluid pressure from delivery pipe 404 through pressure control valve 446, check valve 448 and connecting pipe 449 to valve operating cylinder 450 of secondary injection control valve 451. Control valve 451 is moved by the piston in valve operating cylinder 450 into the position shown in FIG. 39 in which the passages in the left hand end of the valve 451 connect delivery pipe 404 through one passage to supply fluid pressure to the left hand end of injection cylinder 151 through pipe 452. The injection piston in cylinder 151 is moved to the right hand end of the cylinder to move injection ram 150 into the return position. A pipe 453 connects the other end of the cylinder 150 to drain pipe 428 through the other passage in secondary injection control valve 451.

When injection solenoid INS is energized it moves primary injection control valve 447 to the right, as shown in FIG. 39, to position the two passages in the left end for conducting fluid under pressure through one passage from delivery pipe 404 to a connecting pipe 454 connected with valve operating cylinder 455 for moving secondary injection control valve 451 to the left in FIG. 39. This operation of valve 451 will supply fluid under pressure through one passage to pipe 453 to the end of injection cylinder 151 for moving the piston and ram 150 to feed plastic into the heater cylinder 143 and constantly maintain pressure on the plastic in the heater cylinder to force it into the mold when the nozzle is open. Pipe 452 is connected through the other passage in valve 451 to drain pipe 428. A manually adjustable needle valve 456 controls the speed of operation of the piston in injection cylinder 151.

During movement of the injection ram from the forward toward the return position, the cam on limit switch operating rod 156, FIG. 3, engages and closes air blast limit switch LS15 for the short period of time that it takes to pass the switch for energizing air blast solenoid AIR. Air blast solenoid AIR is energized to operate a valve for releasing compressed air to blow the nuts from the nut discharge housing 187, FIG. 23, outwardly from the machine. This air blast occurs while the mold is closed. This limit switch LS15 and air blast construction is a modification of the molding machine for the purpose of the present invention. Another modification is that the limit switches LS10 and LS11 are not used with the present invention as hereinbefore described.

The prepack position limit switch LS14 is operated by the cam on operating rod 153 when the piston in injection cylinder 151 has moved injection ram 150 forwardly an amount sufficient to deliver the required amount of plastic to the mold from the heater cylinder and require additional plastic in the heater cylinder for a further molding operation. The operation of prepack position limit switch LS14 will open the circuit to injection solenoid INS for deenergizing this solenoid. Primary injection control valve 447 will be spring operated to the position shown in FIG. 39 and secondary injection control valve 451 will be moved to the position shown in FIG. 39 for moving the piston and injection ram 150 to the return position. As hereinbefore described, limit switch LS14 is not normally operated until the mold has been completely filled with plastic and the nozzle has been closed. This operation is described in greater detail in connection with the wiring diagram in FIGS. 40A, 40B and 40C, in view of the control of the circuit to injection solenoid INS by time delay control relays.

The operation of the nozzle piston in nozzle cylinder 162 is controlled by primary nozzle control valve 460 spring operated into the position shown in FIG. 39 for supplying fluid under pressure from delivery pipe 404 controlled by pressure control valve 461 to one of the two passages in the left end of the valve, as shown in FIG. 30 to connecting pipe 462 and valve operating cylinder 463. Valve operating cylinder 463 will have the piston therein move secondary nozzle control valve 464 to the right to the position shown in FIG. 39. Fluid under pressure is supplied through one passage in the left end thereof from delivery pipe 404 to pipe 465 connected to the bottom end of nozzle cylinder 162 for moving the piston upwardly to hold injection shut off pin 160 in closed position. Pipe 466 connects the upper end of the nozzle cylinder with the other passage in secondary nozzle control valve 464 and drain pipe 428. A manually adjustable needle valve 467 controls the speed of operation of the piston in cylinder 162.

When the piston in nozzle cylinder 162 holds the injection shut off pin 160 in closed position it will operate nozzle closed limit switch LS5 to close the circuit controlled thereby. At the proper time the circuit to nozzle solenoid NOS is energized to move primary nozzle control valve 460 to the right, as shown in FIG. 39 to position the passages in the left end of the valve in position to control fluid flow through the valve. One passage in the left end of valve 460 will supply fluid under pressure through connecting pipe 468 to valve operating cylinder 469 of the secondary nozzle control valve 464. The operating cylinder 463 is connected to drain pipe 421 through the other passage.

Secondary nozzle control valve 464 will be moved to the left as shown in FIG. 39 to connect the passages in the right end for supplying fluid under pressure from delivery pipe 404 through pipe 466 to the upper end of nozzle cylinder 162 for moving the piston downwardly and the injection shut off pin 160 into open position so plastic may be injected into the mold. Pipe 465 is connected through the other passage in valve 464 with drain pipe 428. The operation of the injection shut off pin 160 and the length of time it is held in open position by operation of the nozzle piston in nozzle cylinder 162 is controlled by a nozzle timer described hereinafter. When the timer times out the nozzle solenoid NOS is deenergized so the spring will return the valve to the position shown in FIG. 39 and supply fluid under pressure to close the nozzle by operating the piston in nozzle cylinder 162 as described above.

When the nuts have had the inserts molded therein and the mold opened by the fluid pressure operation of the clamp piston in clamp cylinder 113 as above described, the tray 194, comb 181 and scraper 175 are operated.

The tray is operated by the piston in tray operating cylinder 206. A tray control valve 474 is a two position valve spring operated into the position shown in FIG. 39. In this spring operated position one passage in the right end of tray control valve 474 supplies fluid under pressure from delivery pipe 404 to pipe 475 connected to one end of tray operating cylinder 206 for operating the piston therein to move tray 194 to the return position. Pipe 476 connects the other end of tray operating cylinder 206 to drain pipe 428.

When tray solenoid TRS is energized by the electric control circuits, tray control valve 474 will be moved to the right as shown in FIG. 39 to position the two passages in the left end for supplying fluid under pressure from delivery pipe 404 through one passage to pipe 476 and one end of tray operating cylinder 206. The pipe 475 is connected through the other passage to drain pipe 428. The piston will be moved in tray operating cylinder 206 to move tray 194 into the forward position under the top mold section in open position to catch the nuts and sprue when discharged from the mold pins 79 and sprue pins 68 and 69, respectively, as above described. The manually adjustable needle valve 477 in pipe 475 controls the speed of operation of the tray 194. A tray return limit switch LS9 is operated by the tray in the return position and a tray advance limit switch LS8 is operated by the tray in advance position to control electric circuits according to the position of the tray as described hereinafter in connection with the circuit diagram.

The comb 181 is operated by the piston in comb cylinder 185 controlled by comb control valve 480. Comb control valve 480 is a two position valve spring operated into one position, as shown in FIG. 39 in which one of the passages in the right end supplies fluid under pressure from delivery pipe 404 to pipe 481 connected to one end of comb cylinder 185 for moving the piston therein to move the comb to the return position. The other passage in the right end of comb control valve 480 connects pipe 482 from the other end of comb cylinder 185 to drain pipe 428.

When the electric circuits controlling operation of the comb close the circuit to energize comb solenoid COS the comb control valve 480 will be moved to the right as shown in FIG. 39 so one passage in the left end of the valve will supply fluid under pressure from delivery pipe 404 to pipe 482 and the end of comb cylinder 185 for operating the piston therein to move the comb 181 to forward position under the open top movable mold section for stripping the sprue from the sprue pins 68 and 69 as above described in connection with the mold structure. The other passage in the left end of comb control valve 480 will connect pipe 481 with drain pipe 428. A manually adjustable needle valve 483 is located in pipe 481 for controlling the speed of comb operation.

When the comb 181 is in advance position through operation of comb control valve 480 by comb solenoid COS, it will operate comb advance limit switch LS6 for closing an electric circuit in connection with the automatic operation of the machine. When the comb is moved to the return position it will operate comb return limit switch LS7 for closing electric control circuits also described in connection with the wiring diagram and the operation of the machine.

The scraper 175 is operated by the piston in scraper cylinder 171 under the control of scraper control valve 488. Scraper control valve 488 is a two position valve spring operated into the position shown in FIG. 39 in which one of the passages in the right end of the valve supplies fluid under pressure from delivery pipe 404 to pipe 489 connected to one end of scraper cylinder 171 for moving the piston in the cylinder to move scraper 175 into return position. The other passage in the right end of scraper control valve 488 connects pipe 490 from the other end of the scraper cylinder 171 to drain pipe 428.

When the electric control circuits for the scraper operate to energize scraper solenoid SCS, scraper control valve 488 will be moved to the right as shown in FIG. 39, for supplying fluid under pressure from delivery pipe 404 through one of the passages in the left end thereof to pipe 490 and one end of scraper cylinder 171 for operating the scraper piston to move the scraper 175 to the forward position. Pipe 489 is connected through the other passage in the left end of valve 488 with drain pipe 428. A manual adjustable needle valve 491 in pipe 490 controls the speed of operation of the scraper.

The scraper operates scraper advance limit switch LS12 when the scraper is moved to the advance position and scraper return limit switch LS13 when the scraper 175 is in return position for controlling machine operation as described in connection with the circuit diagram.

A pressure gauge 495 is mounted on the instrument panel 102, FIGS. 3 and 39, and has a manually operated gauge control valve 496 spring operated into the position shown in FIG. 39 for connecting the pipe 497 between the gauge and valve 496 with a drain pipe extending to the reservoir 401. Manual operation of gauge control valve 496 moves the valve to the right as shown in FIG. 39 so the left end of the valve will connect the delivery pipe 404 with the gauge to register the pump pressure on pressure gauge 495. This gauge 495 provides a means for the operator to check the pressure in delivery pipe 404 to determine that the pumps 400 are operating to produce the pressure desired for machine operation.

A second pressure gauge 500 has a pipe 501 connected to a manually operable injection pressure gauge control valve 502 spring operated into the position shown in FIG. 39 for connecting pipe 501 with pipe 503 connected with nozzle pressure gauge control valve 504. The nozzle pressure gauge control valve 504 is also spring operated into the position shown in FIG. 39 for connecting pipe 503 with a drain pipe extending to reservoir 401. Injection pressure gauge control valve 502 is manually operable by the machine operator to position the left end of the valve 502 for connecting delivery pipe 404 in the section between pressure control valve 446 and check valve 448 to pipe 501 and pressure gauge 500 for determining the fluid pressure adjacent to primary injection control valve 447. Nozzle pressure gauge control valve 504 is manually operable to connect delivery pipe 404 adjacent to and in advance of primary nozzle control valve 460 with pressure gauge 500 through 503, injection pressure gauge control valve 502 in the spring operated position thereof, as shown in FIG. 39, for checking the fluid pressure in delivery pipe 404 in determining that the desired pressure is available for operation of the nozzle.

The second pressure gauge 500 and the handles of pressure gauge control valves 496, 502 and 504 are mounted on the instrument panel 102 for the machine to be readily accessible to the machine operator along with the other manual controls.

In addition to the compressed air control by air blast limit switch LS15, as above described, for discharging nuts from the mold discharge casing and cleaning the mold, another air blast switch LS24 is added to the machine. Air blast limit switch LS24 is mounted on one end of top platen 105, FIGS. 3, 4 and 5 for operation by the arm 121 on movable platen 52 to engage the switch arm and close the circuit to energize air blast solenoid AIR. This will provide a second discharge of compressed air through air discharge tubes 189 and 203 and air discharge nozzles 208 and 209 after the discharge produced by limit switch LS15 for further operation to discharge nuts from the discharge casing, discharge sprue from tray 194 and clean the bottom mold section.

No diagram of the compressed air pipe connections is shown in view of the illustration of the several cylinders and controls using compressed air in FIGS. 3 to 5 and the compressed air supply pipe 245.

*Operation and circuit diagram*

It is necessary when starting operation of the machine to check all parts of the machine to determine that they are in return, back or starting position. The molding machine must have the mold sections in open position with the movable mold section including top support plate 8 in the uppermost position spaced above the bottom stationary mold section including bottom support plate 7. Inspection must show the mold surfaces to be clean and the nut receiving guide channel 18 to be clean and without the presence of any nuts. The ejector or stripper plate 60 must be engaged with the top support plate 8.

The injection piston and ram 150, the scraper 175, the comb 181 and the tray 194 must all be in the return position. The injection shut off pin 160, must be in closed position.

The pusher 355 and track slide member 335 in the nut feeding and punching mechanism must be in the back positions.

A number of preliminary operations are required to put the machine in condition for operation. The hopper of the molding machine is filled with granular plastic material. The main switch MC1 and the circuit breaker CB1 are closed to connect the three wire electric supply mains W–1 to an electrical supply source for supplying electricity to the molding machine. The main switch MC2 and the circuit breaker CB2 are then closed to connect the main three wire circuit W–2 of the nut feeding and punching mechanism to the same electrical power supply as the molding machine. The three wire electrical supply used with this machine provides a 220 volt three phase current supply. The alternating current electrical supply system generally available in most cities is used with the present invention, as illustrated in the wiring diagram, FIGS. 40A, 40B and 40C. Any other suitable source of electrical supply may also be used. Fuses $f1$ and $f2$ are used in the three wire supply mains W–1 and W–2, respectively.

A transformer TRS1 has the primary connected across the center and one outside conductor of the current supply mains W–1. The secondary of transformer TRS1 has the conductors W–3 and W–5 connected to the opposite terminals thereof through suitable fuses for providing the opposite sides of main power supply conductors for the operating and control circuits in the molding machine, as shown in FIGS. 40A and 40B. A transformer TRS2 has the primary connected across the center and one outside conductor of the current supply mains W–2. The secondary of transformer TRS2 has the main supply conductors W–7 and W–9 connected to the opposite terminals thereof through suitable fuses to form the opposite sides of the power supply for the nut feeding and punching mechanism, as shown in FIG. 40C.

The heat selector switches HS1 and HS2, FIG. 40A, are closed and are usually left closed during the usual operation of the molding machine for normally keeping the plastic in the heater cylinder 143 and nozzle block 22 heated to the temperature desired by temperature controls TMP1 and 2.

The motor pump start push button PB1 is operated manually to close the circuit from one side of the power supply W–3 through circuit breaker CB3; fuse $f3$; wire W–11; to one terminal of the magnet of the main relay MR1 having the other terminal connected to the other side of the power supply W–5. This will energize the main relay MR1 for moving all five contacts into closed position. The first three contacts close the power supply circuit through the three-wire conductors W–1 to connect the hydraulic pump motor M1 with the source of power for starting the motor and pump to maintain a supply of fluid under pressure in the molding machine hydraulic system, as shown diagrammatically in FIGS. 39, 40A and 40B. The fourth contact of main relay MR1 closes a stick circuit from one side of the power supply W–3 through normally closed pump stop push button PB2; wire W-13; to the fourth contact of main relay MR1; and wire W-11 to one terminal of the magnet of main relay MR1 having the other terminal of the magnet connected to the other side of the power supply W-5. This maintains the hydraulic pump motor M1 in operation until the pump stop push button PB2 is manually operated to open the circuit to the main relay MR1 to deenergize the magnet thereof, or the main switch MC1 is opened.

The master start push button PB9, FIG. 40C, is operated to close the circuit from one side of the power supply W-7 through the push button PB9; wire W-15; the contacts of normally closed manual stop push button PB10; wire W-17; to one contact of the magnet of main relay MR2; from the other contact of the magnet through wire W-19 and closed circuit breaker CB5 to the other side of the power supply W-9. This energizes main relay MR2 to close all four contacts thereof. Closing of the first three contacts connects the punch press motor M2 in circuit with the supply mains W-2 for securing operation of the punch press motor, FIG. 40C, to operate the punch press 217 for operating the nut feeding and punching mechanism of the punch press, FIGS. 25 and 34 to 38. When the fourth contact of the main relay MR2 closes, a circuit is closed from one side of the power supply W-7 through this contact to the wire W-15; the manual stop push button PB10; wire W-17 to the magnet of main relay MR2; wire W-19 and the circuit breaker CB5 to the other side of the power supply W-9. This circuit will keep the punch press motor M2 operating continuously until it is desired to stop the machine and nut feed by operating manual stop push button PB10 or the main switch MC2 to open the circuit for deenergizing main relay MR2. When main relay MR2 is energized, a green signal light W-14 is connected in the same circuit in parallel with the magnet of the relay MR2 having opposite terminals connected to the wire W-17 and the other side of the power supply wire W-9 to visually indicate the closed circuit.

*Feeder and punch operation*

The feeder start push button PB11 is then manually operated to close the circuit for energizing control relay 111CR for closing secondary current supply circuits so that the operation of the feeder may be started. When main relay MR2 was energized closing the several contacts thereof, a circuit was closed through the fourth contact to wire W-15 providing a secondary supply circuit. This wire W-15 also closes the circuit from the power supply conductor W-7 through the normally closed third contact of pusher control relay PCR3 when deenergized; wire W-16; feeder stop push button PB12; wire W-18; feeder start push button PB11; wire W-20; to the magnet of control relay 111CR and the other side of the power supply W-9. When the control relay is energized the magnet closes the two contacts thereof. This provides a stick circuit from wire W-15; the third contact of deenergized relay PCR3; wire W-16; feeder stop push button PB12; wire W-18; through the first closed contact of energized control relay 111CR; wire W-20 to the magnet of control relay 111CR and the other side of the power supply W-9 for maintaining the relay energized independently of the push button PB11 after it is released and moves to open position. A green light W-26 on panel 366 is connected in parallel with the magnet of control relay 111CR to indicate when it is energized.

The second contact of control relay 111CR closes another power supply circuit from one side of the power supply W-7 through the closed fourth contact of the energized main relay MR2; wire W-15; the closed second contact of the energized control relay 111CR to the tertiary power supply conductor W-21. With these power supply circuits in circuit with the main power supply, the nut feeding and punching mechanism has the circuits closed for starting and continuing automatic operation of the mechanism under the control of the several control relays and limit switches, as hereinafter described.

The switches forming part of the track vibrator TRV and Syntron nut supply and feed unit SYN are manually closed prior to starting the machine and are normally kept closed. These switches are provided principally for use in servicing these two units. The manual switch AUC is included in the circuits of the nut feeding and punching mechanism for use in servicing the machine and is normally in the closed position, as shown in FIG. 40C.

The operation of push button PB11 to energize control relay 111CR closes the circuit to energize control relay 113CR from one side of the power supply W-7 through the fourth contact of energized main relay MR2; wire W-15; the second contact of energized control relay 111CR; tertiary power supply conductor W-21; pusher back limit switch LS18 closed in the back position of pusher 355; to the magnet of control relay 113CR and the other side of the power supply W-9.

The machine operator will manually operate push button PB16, FIG. 40C, in initially starting the machine to close the circuit for energizing the control relay 114CR to start operation of the nut feeding and punching mechanism. This control relay 114CR is normally operated by the top movable mold section moving into closed position for subsequent cycles of operation after the first cycle. When mold closed limit switch LS16 is operated by arm 121 on the movable mold platen 52 in closed position to close the contacts therein or push button PB16 is manually operated, the circuit is closed to energize control relay 114CR for closing the circuits through the relay contacts. The magnet of control relay 114CR is maintained energized through a stick circuit extending from one side of power supply W-7 through tertiary power supply W-21; the third closed contact of the energized control relay 113CR; wire W-22; the first closed contact of the energized control relay 114CR; a wire connection to the magnet of the energized control relay 114CR and the other side of power supply W-9.

When control relay 113CR is energized by closing push button PB11, the first four contacts are closed to close the circuits controlled thereby and the fifth contact is opened to open the circuit controlled thereby. All three contacts of control relay 114CR are closed when the relay is energized.

With relays 113CR and 114CR energized, the third closed contact of the control relay 114CR will close a circuit from the secondary power supply W-15 through wire W-25 to the track vibrator TRV, the Syntron nut feed unit SYN and the valve operating solenoids SP1 and SP2, shown at the bottom of FIG. 40C and FIG. 5. This circuit extends in parallel through the track vibrator TRV and the Syntron nut feed unit SYN and then to the other side of the power supply W-9. This circuit also extends in parallel to the valve operating solenoids SP1 and SP2 and from these solenoids to cam operated switches CS1 and CS2 respectively, and the other side of the power supply W-9.

The Syntron nut feed unit SYN operates upon closing of the circuit thereto to orient the nuts into the desired position and feed them one at a time from the outlet 221 into the offset end portion 227 of the nut guideway 226, FIGS. 3, 25 and 33. The cam 261 for operating the switches CS1 and CS2 is rotated during operation of the punch press 217 for operating switch arm 263 for alternately closing the circuits through valve operating solenoids SP1 and SP2, FIGS. 25 and 40C. The solenoids SP1 and SP2 will be alternately energized for alternately opening the valves to supply fluid pressure to the nut feeding cylinders 233 and 239 for alternately feeding a nut from the offset portion 227 of the receiving track 225 into the guideway 226 and along the guideway toward the punch press 217. The solenoid operated valves are moved by the solenoids SP1 and SP2 into one position to supply compressed air for moving the pistons in cylinders 239 and 233 to feed nuts. When the solenoids are deenergized the valves are spring operated to another position to supply compressed air for moving the pistons in cylinders 239 and 233 to the outer ends thereof. The compressed air connections with nut feed cylinders 233 and 239 are such that when solenoid SP1 is energized it supplies compressed air to the outer end of cylinder 239 to move feed pin 242 to feed the nuts in guideway 226 of receiving track 225 toward the punch. The energization of solenoid SP2 operates valve 250 to supply compressed air to the outer end of feed cylinder 233 to operate piston rod 234 to engage and feed a nut from the offset portion 227 into guideway 226. The energization of solenoid SP1 operates valve 244 to supply compressed air to the outer end of feed cylinder 239 to operate the piston rod 240 and feed pin 242 to engage feed pin 242 with the end nut in guideway 226 and feed all of the nuts in the guideway toward the punch. Cam lobe 262 operates switch arm 263 to open contacts CS1 deenergizing solenoid SP1 so valve 244 moves to a position for supplying compressed air to the inner end of feed cylinder 239 for moving feed pin 242 outwardly to the end of guideway 226 so another nut may be fed into the guideway. Simultaneously, cam lobe 262 operates switch arm 263 to close the circuit through contacts CS2 for energizing solenoid SP2. Solenoid SP2 operates valve 250 to supply compressed air to the outer end of feed cylinder 233 for operating piston rod 234 to engage a nut and feed it from offset portion 227 into the outer end of guideway 226.

When cam lobe 262 disengages switch arm 363 it will open contacts CS2 and close contacts CS1 for holding solenoid SP1 energized to keep the end of feed pin 242 in contact with the end nut in guideway 226. This operation maintains a complete supply of nuts in guideway 226 with the nut at the inner end of alined guideways 226 and 271 engaged with stop shoulder 274 and spring pressed pin 275 held in outwardly extending position beyond shoulder 274. This enables the feed slide 302 and nut feed bar 306 to engage and push the end nut engaged with shoulder 274 into the guideway 280 toward the punch.

When control relays 113CR and 114CR are energized for closing the normally open contacts as above described a circuit will be closed from one side of the power supply W–7 through the fourth contact of main relay MR2; wire W–15; the second closed contact of the energized control relay 111CR; wire W–21; the first closed contact of the deenergized control relay L1; wire W–27; the track back limit switch LS21 which is normally in the closed position with the track slide or member 335 in the back position; the wire W–29; the second closed contact of the energized control relay 113CR; the wire W–31; the first closed contact of the normally deenergized pusher control relay PCR3; the wire W–33; the second closed contact of the energized control relay 114CR; the wire W–35; to the delay timer 14DT motor and clutch and to the other side of the power supply W–9. This delay timer 14DT, FIG. 40C, is operated by the motor and clutch to delay operation of the timer contact for a short period of time sufficient for the Syntron nut feed unit SYN to start operation and feed nuts into the offset portion 227 of the receiving track 225, FIG. 25. When the timer operates to close the contact thereof, a circuit from the wire W–35 will extend through the contact; the wire W–37; to the magnet of the control relay 112CR to the other side of the power supply W–9. This energizes the control relay 112CR for opening the normally closed first contact and closing the normally open second contact for closing the circuit to start operation of the punch press 217.

The circuit for operating the punch press extends from one side of the power supply W–7 through the fourth contact of the main relay MR2; the wire W–15; the second closed contact of the energized control relay 112CR; the wire W–39; to the press trip solenoid S5 and the other side of the power supply W–9. When the press trip solenoid S5 is energized it operates the clutch 258 for connecting the continuously running motor M2 to the press drive shaft 257 for rotating the shaft and operating the press mechanism, FIGS. 5, 25, 34, 36, 38 and 40C.

The nuts fed along the receiving track 225 from the Syntron nut feed unit SYN are received in the guideway 271 in the punch feed track section 270. The feed slide member 302 of the punch press 217 is operated in each cycle of operation to feed a nut toward the punches 284 and to position a previously fed nut into position for punching of the injection apertures 6 in the side walls, while the previously punched nut is moved out of the punching position toward the vibratory delivery track 323. The vibratory delivery track 323 of track vibrator TRV receives the punched nuts from the punch guide track 279 and feeds them toward the track slide or member 335. When the track slide 335 is in the back position the guideway 337 is alined with the end of the vibratory delivery track 323. The punch press will continue operation to feed and punch nuts until the track slide 335 is filled, see FIGS. 3, 25, 33 and 34.

When guideway 337 in the track member or slide 335 is filled with the predetermined number of nuts, the contacts CT10 of the track full unit TFL will have one contact engaged by the end nut in guideway 337 of track slide 335 and moved to engage the other contact and close the circuit in the track full unit TFL.

The track full unit TFL, FIG. 40C has a transformer TRS 3 with one terminal of the primary connected to the wire W–15 for receiving current from one side of the power supply W–7 through the fourth contact of the energized main relay MR2 and the other terminal connected to the other side of the power supply W–9. The secondary of the transformer TRS3 includes an adjustable contact to control the voltage output so that a reduced voltage, compared with that of the power supply across the main supply conductors W–7 and W–9, may be obtained to reduce and substantially eliminate arcing across the contact points CT10. The circuit in the track full unit has the adjustable contact with the transformer connected to a rectifier r1. A conductor connects the rectifier r1 with one terminal of the magnet of the track full control relay 116CR. The other terminal of the magnet of control relay 116CR is connected to one of the contacts CT10 while the other contact operated by the nuts is connected to the other terminal of the transformer secondary and the other side of the power supply W–9. A condenser C1 and a resistor r2 are connected in parallel across the circuit to the magnet of the relay 116CR and the contact points to further control, reduce and substantially eliminate arcing across the contact points to prevent burning and pitting of the points, see FIG. 40C.

The magnet of the control relay 116CR is energized when the contacts CT10 are closed by the nuts in the track guideway 337 through the circuit connected with the secondary of the track full unit TFL as above described. The energization of the control relay 116CR closes the relay contact for closing a circuit from one side of the power supply W–7 through the fourth closed contact of the main relay MR2; the wire W–15; the second closed contact of the control relay 111CR; the wire W–21; the closed contact of the energized control relay 116CR; the wire W–41 to the magnet of the control relay L1 and the other side of the power supply W–9, for energizing control relay L1.

The first contact of the energized control relay L1 will open the above described circuit through the delay timer 14DT motor and clutch and the control relay 112CR magnet causing the contacts to move to the deenergized position. This opens the circuit through the second contact of deenergized control relay 112CR to the press trip solenoid S5, stopping operation of the punch press 217 and the nut feed mechanism controlled by the valve operating solenoids SP1 and SP2. The second contact of the energized control relay L1 will be closed to complete the circuit from one side of the power supply conductor W–7 through the fourth closed contact of the energized main relay MR2; the wire W–15; the second closed contact of the energized control relay 111CR; the wire W–21; the third contact of the manual switch AUC; the wire W–23; the closed second contact of the energized control relay L1; the wire W–43; the closed first contact of the deenergized control relay 112CR; the wire W–45; the closed first contact of the energized control relay 113CR; the wire W–47 to the advance track solenoid S3 and the other side of the power supply W–9. This energizes advance track solenoid S3 for operating the control valve 343 to supply compressed air to the track cylinder 341 for moving the track slide 335 from the back position into the forward position with the guideway 337 alined with the guideway 347 in auxiliary track 348 and guideway 18 in the bottom stationary mold for receiving the nuts, FIGS. 25 and 30.

As the track slide or member 335 leaves the back position, the track back limit switch LS21 is opened for holding the circuit to the delay timer 14DT above described open while the track slide 335 is in advance position. When the track slide 335 reaches the advance position with the guideway 337 therein alined with the guideway 347 in auxiliary track 348 and guideway 18 in the bottom stationary mold section, the track forward limit switch LS22 is moved to closed position, see FIGS. 25, 26 and 40C.

When the track forward limit switch LS22 closes, it closes a circuit from one side of the power supply W–7 through the closed fourth contact of the energized main relay MR2; the wire W–15; the second closed contact of the energized control relay 111CR; the wire W–21; the third closed contact of the manual switch AUC; the wire W–23; the second closed contact of the energized control relay L1; the wire W–43; the closed first contact of deenergized control relay 112CR; the wire W–45; the closed track forward limit switch LS22; the wire W–49; the closed contact b of the mold open limit switch LS20, FIGS. 3, 5 and 40B; the wire W–51 to the advance pusher solenoid S4 and the other side of the power supply W–9. This solenoid S4, when energized, operates the pusher control valve 362 for supplying compressed air to the pusher cylinder 360 for moving the pusher 355 from the back position to push the nuts from the guideway 337 in the track slide 335 into the guideway 18 in the stationary bottom mold section through guideway 347 in auxiliary track 348. This circuit for operating the pusher 355 will be closed only when the top movable mold section is in fully open position. Otherwise, the track slide 335 will be moved to the advance position and remain in advance position until mold open limit switch LS20 is operated by the top mold section to close contacts a and b and complete the circuit for securing operation of the pusher, as above described. This mold open limit switch LS20 provides one of the controls for the nut feeding and punching mechanism by the molding machine for obtaining a new supply of nuts at the desired time and in sequence with the operation of the molding machine.

When the pusher 355 moves forward, the pusher back limit switch LS18 will open the circuit to control relay 113CR magnet and deenergize the relay opening the first four contacts and closing the fifth contact and the circuits controlled by the several contacts. When control relay 113CR is deenergized it will close a circuit from one side of the power supply W–3, FIGS. 40B and 40C, through the second contact of control relay 7CR; wire W–195; the second contact of control relay 8CR; wire W–197; the fifth closed contact of deenergized control relay 113 CR; wire W–199; the magnet of control relay 9CR and the other side of the power supply W–5. A parallel circuit has wire W–197 connected to the fourth contact of control relay 5CR and then to the wire W–199 so that the circuit to control relay 9CR is closed independently of control relay 113CR whenever control relay 5CR is deenergized. Of course, energization of control relay 9CR is also dependent on the control provided by control relays 7CR and 8CR. This provides a modification of the molding machine operation and control which will become apparent in connection with the description of the circuits controlled by these several relays. The control relay 7CR will not be energized when starting operation of the press on the first cycle of operation but will be energized for all subsequent automatic operations to energize control relay 9CR and open the circuit to the alarm timer 1AT and the clamp timer 2CT to stop these timers for recycling in starting the next cycle of operation automatically. The circuit for recycling the timers is closed when the control relay 8CR is energized by the pusher forward limit switch LS19 closing the circuit through contact b thereof. This occurs when the pusher 355 is in the forward position and while the control relay 113CR is deenergized.

The pusher forward limit switch LS19 contacts a and b are closed when the pusher 355 has reached the forward position and delivered the full supply of nuts from the track slide 335 into the guideway 18 in the stationary bottom mold. The contact a of pusher forward limit switch LS19 closes the circuit from one side of the power supply W–7 through the fourth contact of main relay MR2; the wire W–15; the closed second contact of the energized control relay 111CR; the wire W–21; the third contact of the manual switch AUC; the wire W–23; the closed second contact of the energized control relay L1; the wire W–43; the closed first contact of the deenergized control relay 112CR; the wire W–45; the closed contact a of the pusher forward limit switch LS19; the wire W–53 to the magnet of control relay UL1 and the other side of the power supply W–9, for energizing the control relay UL1 for returning the pusher and track.

Simultaneously, the contact b of the pusher forward limit switch LS19 closes a circuit connected into the molding machine circuits for cooperation in controlling and modifying operation of the molding machine in proper sequence with the nut feeding and punching mechanism. This circuit extends from one side of the power supply conductor W–3, FIG. 40B; the closed contact a of the mold open limit switch LS20; the wire W–55; the closed contact b of the pusher forward limit switch LS19; the wire W–56; to the magnet of the control relay 8CR and the other side of the power supply W–5. This energizes the control relay 8CR for closing the normally open contacts.

The circuits closed by the pusher 355 operating the pusher forward limit switch LS19, as described above, conditions the nut feeding and punching mechanism for returning the pusher 355 and track slide 335 for another nut punching and feeding cycle and the molding machine for starting a molding operation cycle.

The control relay UL1 upon being energized through the closing of the circuit by the pusher in the forward position, as above described, closes both contacts for closing the circuits to the retract pusher and retract track solenoids S1 and S2 for returning the pusher 355 and the track slide 335 to their back positions. The first contact closes the circuit from one side of the power supply W–7 through the fourth contact of the energized main relay MR2; wire W–15; the second contact of the energized control relay 111CR; the wire W–21; the first closed contact of the deenergized control relay L1; the wire W–27; the first closed contact of the manual switch AUC; the wire W–57; the first contact of the energized control relay UL1; the wire W–59; to the retract pusher solenoid S1 and the other side of the power supply W–9. Simultaneously, the circuit is closed from one side of the power supply W–7 through the fourth contact of the energized main relay MR2; the wire W–15; the second contact of the energized control relay 111CR; the wire W–21; the first closed contact of deenergized control relay L1; the wire W–27; the second contact of the energized control relay UL1; the wire W–61; to the retract track solenoid S2 and the other side of the power supply W–9.

The energized retract pusher solenoid S1 and the energized retract track solenoid S2 operate pusher and track control valves 362 and 343 respectively, for supplying compressed air to the cylinders 360 and 341, respectively, for operating the piston rods 361 and 342, respectively, therein to return the pusher 355 and the track slide 335 to the return positions substantially simultaneously. As the pusher 355 and the track slide 335 move toward their return positions the pusher forward limit switch LS19 and the track forward limit switch LS22 will open the above described contacts and circuits which they control. When the pusher 355 and track slide 335 reach their respective return positions they will operate the respective pusher back limit switch LS18 and the track back limit switch LS21 to close the circuits which they respectively control.

The control relay 113CR will have the circuit to the magnet completed when the pusher back limit switch LS18 is again closed when the pusher reaches the return position. This energizes the control relay 113CR to close the first four contacts thereof for closing the circuits which they control and open the fifth contact and the circuit including this contact. This limit switch operation closes the circuits in the nut feeding and punching mechanism hereinbefore described ready for starting a new cycle of operation to feed and punch nuts so that a new supply will be fed to the track slide 335. The circuits through the fourth and fifth contacts of the control relay 113CR are described hereinafter in connection with the starting and completion of a cycle of operation of the molding maching in view of their establishing a control and cooperation for coordinating the operation and sequence of the molding machine and the nut feeding and punching mechanism.

*Molding machine operation and circuits*

The machine operator after initially starting the nut feed and punching mechanism by manually operating the push button PB16, as above described, to provide a supply of nuts to the mold immediately proceeds to start operation of the molding machine. The operator in initially starting the molding machine first moves the main selector switch MSL to the "Hand" or "H" position FIG. 40A. The operator then presses push button PB8 to obtain an initial forward movement of the injection ram 150. The push button PB8 must be manually held in closed position while the injection ram 150 is moved forward to push an initial supply of plastic into the heater cylinder 143 toward the nozzle 21. This circuit extends from power supply W–3 through main selector switch MSL, contact 1; wire W–63; push button PB8; wire W–109; to injection solenoid INS and the other side of the power supply W–5. When injection solenoid INS is energized it moves the primary injection control valve 447 to supply hydraulic fluid under pressure to injection cylinder 151 for moving the piston and ram 150 forward to supply plastic material to heater cylinder 143 and nozzle 21.

The top movable mold section is held in open position by the piston in clamp cylinder 113 while the injection ram 150 is operated to feed an initial supply of plastic to the nozzle 21. The circuit for holding the top mold section in open position extends from one side of the power supply W–3 through the main selector switch MSL, contact 1; the wire W–63; the main ram selector switch MRS; contact 2; the wire W–65; the fifth closed contact of the energized main relay MR1; the wire W–67; to the open press solenoid OPS and the other side of the power supply W–5. The injection return limit switch LS11 is not used as previously described. The cam on operating rod 155 is located on the rod so it will not engage limit switch LS11. Control relay 4 CR is maintained in energized condition by the circuit through normally closed prepack position limit switch LS14 and wire W–105 until the piston in injection cylinder 151 has moved forward sufficiently to engage the cam on operating rod 153 with this limit switch LS14 and move it to open position.

When the injection ram 150 has moved forward on its first stroke to force plastic through the heater cylinder 143 into the nozzle 21, the main selector switch MSL is manually operated from the "Hand" position to the "Automatic" or "A" position, as shown in the wiring diagram FIG. 40A. Push button PB8 is then released opening the circuit so the injection ram 150 will return to the return position. The main ram selector switch MRS, the feeder operation control switch FOS, the tray selector switch TSS and the hand ejector selector switch HES are set in the position shown in FIG. 40A and are not used in the automatic operation of the machine.

The operation of main selector switch MSL into "automatic" position, closes the circuit through MSL contact 1 from one side of the power supply W–3; wire W–71; to the magnet of control relay 10CR and the other side of the power supply W–5 for energizing control relay 10CR for closing the contact controlled thereby. When control relay 10CR is energized the contact closes the circuit from one side of the power supply W–3 through main selector switch MSL contact 1; wire W–71; the third contact of clamp timer 2CT when closed; wire W–101; nozzle closed limit switch LS5, contact *a* when the nozzle is closed; wire W–103; the closed contact of energized control relay 10CR; wire W–65; the fifth closed contact of energized main relay MR1; wire W–67; to open press solenoid OPS and the other side of the power supply W–5. When open press solenoid OPP is energized it will operate primary clamp cylinder control valve 420 for producing hydraulic operation of the clamp piston in clamp cylinder 113 upwardly for moving and holding the top movable mold section in movable position.

A circuit for starting the timers is simultaneously closed from one side of the power supply W–3 through the main selector switch MSL closed contact 1; the wire W–71; closed contact 2 of the feeder operation control switch FOS; the wire W–73; closed contact 5 of the feeder operation control switch FOS; the wire W–75; the closed contact of the deenergized control relay 9CR; the wire W–77; to the clutches for the alarm timer 1AT and the clamp timer 2CT and the other side of the power supply W–5 for starting the operation of both timers to perform their respective timing cycles while the clutches are engaged.

The alarm timer 1AT is a conventional motor driven timer containing mechanism adjustable so the timer may be set to run for a predetermined length of time if the circuit to the timer clutch and motor is kept closed for a sufficient length of time to allow it to complete its timing operation. The different contacts of the timer may be opened and closed at various times during the timing operation. Some contacts may be held open and some closed while the timer performs its timing operation and also when the timer operation is stopped by opening the circuit to the clutch and motor. The timer will automatically stop and reset in the starting position whenever the circuit thereto is opened at any point during its timing operation. Accordingly, alarm timer 1AT will reset in starting position when the circuit thereto is opened. Alarm timer 1AT is set so that contacts 1 and 3 are normally closed and contact 2 is normally open in starting a timing cycle. With contact 1 of alarm timer 1AT closed when the timer is ready to start, the circuit to the motor is closed so the clutch and motor are operated simultaneously in starting the timing cycle.

The timing cycle for alarm timer 1AT is set so the motor will run and contacts 1 and 3 thereof will remain closed for a period of time substantially greater than the time required for the mold to be closed for molding plastic in the articles or nuts positioned therein, then opened and the mechanism for discharging the molded articles or nuts has completed its operation and all mechanism reset to start a new molding cycle. Should the operation of the molding machine and feeding and punching mechanism fail to continue automatic operation as herein described, alarm timer 1AT will continue its timing operation for a period of time after any failure develops with contacts 1 and 3 remaining closed. When the timing cycle of alarm timer 1AT is completed, contacts 1 and 3 will be opened and contact 2 will be closed. This operation will keep the clutch of alarm timer 1AT engaged while the closing of contact 2 will close the circuit from wire W–77 to the wire W–99, alarm bell BE1 and the other side of the power supply W–5. Operation of the alarm bell signals machine failure to the operator. The operator will operate the necessary switches described above to stop the automatic operation of the machine. While the alarm bell is ringing and contact 3 is open, the circuit through contact 3 which controls the heaters will be held open. As soon as the controls for stopping the machine are operated, the circuit through alarm timer 1AT will be opened to open the circuit to the clutch. Alarm timer 1AT will then be deenergized and automatically reset in starting position and contacts 1 and 3 will close and contact 2 will open to stop the ringing of the alarm bell.

When the several switches are closed as described above and preliminary operations started, it will be understood that closed contact 3 of the alarm timer 1AT will close the circuit to the heaters so the plastic in heater cylinder 143 and nozzle block 22 will be heated to the proper temperature for injection into the mold during the first cycle of operation.

This heater control circuit FIGS. 40A and 40B, extends from one side of the power supply W–3 through the third closed contact of the alarm timer 1AT; the wire W–79; the closed heat selector switch HS1; the wire W–81 to the magnet of the control relay HC3. The wire W–81 is connected to one terminal of temperature control unit TMP1. The wire W–81 is also connected through a fuse to rear zone heat selector switch HS2. A wire W–83 connects switch HS2 to temperature control unit TMP2. The temperature control unit TMP1 has a wire W–85 connecting another terminal to the magnet of control relay HC2. The temperature control unit TMP2 has a wire W–87 connecting another terminal to the magnet of the control relay HC1. The magnets of the control relays HC1, 2 and 3 and the temperature control units TMP1 and 2 are connected to the other side of the power supply W–5 by the wire W–89.

The control relays HC1, 2 and 3 are energized to close the contacts and circuits which they control. The control relay HC1 when energized closes its contacts to connect the several heater units forming the rear zone heater units HE1 to the power supply conductors W–1 by the parallel wires W–91. The control relay HC2 when energized closes it contacts to connect the opposite terminals of the front zone heater units HE2 through the wires W–93 to the power supply conductors W–1. The control relay HC3 when energized closes its contact to connect the nozzle heater units HE3 to the power supply conductors W–1 through the wire W–95 and the relay contact at one side and the wire W–97 at the other side having the variable rheostat RH1 connected in the circuit for controlling the temperature of the heater units HE3. This controls the temperature about the nozzle 21 and nozzle block 22 so the plastic will be heated to the desired temperature for delivery into the mold channels.

The clamp timer 2CT provides for the operation of the mold and molding machine for closing and holding the mold closed while the articles or nuts in the mold have the recesses filled with plastic and the mold opened and held open while the molded parts are discharged and the mold cleaned. The clamp timer also holds the mold open while a new supply of articles or nuts are delivered to the mold. The clamp timer 2CT is the same type of timer as the alarm timer and has contact 1 open and contacts 2 and 3 closed when the timer is not running and the circuit is open. As soon as the above described circuit for starting the timers is closed, the circuit to the clutch of clamp timer 2CT is closed simultaneously with the circuit to the clutch of alarm timer 1AT. The circuit to the motor of the clamp timer 2CT is simultaneously closed with the clutch.

This starting operation immediately opens contact 3 and closes contact 1 of clamp timer 2CT for starting movement of the movable mold section toward closed position while contact 2 remains closed. The circuit for the clutch of clamp timer 2CT is closed from wire W–77 directly to the clutch and the other side of the power supply W–5. The circuit is simultaneously closed to the motor of clamp timer 2CT from wire W–77 through closed contact 2 thereof. Contact 1 of clamp timer 2CT is also closed to close the circuit to close press solenoid CPS. This circuit FIGS. 40A, 40B and 40C, extends from power supply W–3 through main selector switch MSL contact 1; wire W–71; closed contact 1 of clamp timer 2CT; wire W–111; the fourth closed contact of energized control relay 113CR; wire W–113; the closed first contact of control relay 3CR; the wire W–115; tray return limit switch LS9, contact *a* closed when tray 194 is in the return position; wire W–117; closed contact *a* of the closed comb return limit switch LS7 closed when the comb 181 is in the return position; wire W–119 to close press solenoid CPS and the other side of the power supply W–5. A partially parallel circuit for close press solenoid CPS extends from wire W–115 through the second closed contact of energized control relay 5CR; wire W–121; tray selector switch TSS, contact 1 to wire W–117. This insures the holding of the movable mold section in open position until the tray 194, comb 181, and scraper 175 have been moved to the respective return positions. The pusher 355 also has to be in back position to close pusher back limit switch LS18 before the movable mold section can be closed. The molding machine operation is modified and controlled according to the invention by control relay 113CR and pusher back limit switch LS18 controlling the circuit through wires W–111 and W–113 to close press solenoid CPS to insure the supply of the required number of nuts to guideway 18 in the bottom stationary mold section before the mold can be closed.

The injection ram 150 having been moved to its return position after the push button PB8 was released as above described, it will be moved forward to supply a new charge of plastic to the heater cylinder 143 as soon as main selector switch MSL is moved to automatic position. Control relay 4CR controls operation of the injection cylinder and ram and has a time delay in operation to maintain the contacts closed for a limited time after the circuit to the magnet is opened. The control relay 11CR, a time delay relay, is normally deenergized so the contact is normally closed to close a circuit from one side of power supply W–3 through wire W–127 to the magnet of control relay 4CR and the other side of the power supply W–5 to energize the relay. The second contact of control relay 4CR upon closing connects one side of the power supply W–3 through the normally closed prepack position limit switch LS14 to the magnet of the control relay 4CR through the wire W–105, the second closed contact of the energized control relay 4CR to the magnet thereof through the wire W–69 and the other side of the power supply W–5 for keeping the control relay 4CR energized independently of the circuit through the contact of control relay 11CR.

The circuit through the first contact of the energized control relay 4CR secures operation of the injection ram 150 to feed plastic material into the heater cylinder 143 for subsequent feeding into the mold when closed. This circuit extends from one side of the power supply W–3 through the closed third contact of the alarm timer 1AT; the wire W–79; the first closed contact of the energized control relay 4CR; the wire W–107; the main selector switch MSL contact 12; the wire W–109 to injection solenoid INS and the other side of the power supply W–5.

The injection ram 150 will be operated by the energized solenoid INS operating primary injection control valve 447 FIG. 39 for supplying fluid under pressure to move the piston forward and force a new supply of plastic received from the hopper into the heater cylinder 143 to add to that already contained in the cylinder. The control relay 4CR will continue to be energized by control relay 11CR and independently through the prepack position limit switch LS14 which remains closed as long as there is sufficient plastic in the heater cylinder 143. The injection ram 150 is operated to continuously maintain pressure on the plastic to feed in the mold whenever the nozzle opens. The circuit to control relay 4CR magnet is independently held closed by nozzle closed limit switch LS5, contact b, held closed while the nozzle is open during injection of plastic to insure completion of plastic injection into the mold.

The close press solenoid CPS is energized by the clamp timer 2CT closing the circuit described above for operating primary clamp cylinder control valve 420, as above described, to supply fluid under pressure to the clamp cylinder 113 and piston for moving the top movable mold section downwardly toward the closed position into engagement with the stationary bottom mold section.

When the main switches and circuit breakers to the power supply line are closed to provide the power for operating the machine through the transformers, the primary power supply circuits receive power from the secondary. At this time the high pressure solenoid HPS is energized through the normally closed low-high pressure limit switch LS17. This secures operation of the hydraulic system under high pressure as long as limit switch LS17 remains closed.

At the time the motor pump start switch PB1 was closed energizing main relay MR1 closing all five contacts, the closing of the fifth contact closed the circuit to the magnet of control relay 6CR.

This circuit extends from one side of the power supply W–3 through main selector switch MSL, contact 1; wire W–71; closed contact 3 of clamp timer 2CT; wire W–101; closed contact a of nozzle closed limit switch LS5 closed when the piston in nozzle cylinder 162 holds injection shut off or nozzle pin 160 in closed position; wire W–103; the closed contact of energized control relay 10CR; wire W–65; the closed fifth contact of energized main relay MR1; the wire W–67 to the magnet of control relay 6CR and the other side of the power supply W–5. This energizes control relay 6CR and moves the contact into closed position. This contact closes a circuit from one side of the power supply W–3 through the closed contact of energized control relay 6CR; wire W–129 to high pressure solenoid HPS and the other side of the power supply W–5. The high pressure solenoid HPS is energized under the control of control relay 6CR. High pressure solenoid HPS when energized operates low-high pressure control valve 418, FIG. 39, into position for cutting off the bypass of hydraulic fluid through pipes 417 and 419 so the pressure will immediately build up to a high pressure of the character desired for high pressure operation.

The piston in clamp cylinder 113 for moving the top mold toward closed position with the stationary bottom mold will be started on its downward movement from open position under high pressure at the time the close press solenoid CPS is energized as above described. The close press solenoid CPS will operate primary clamp cylinder control valve 420, FIG. 39 to supply hydraulic fluid under high pressure to the clamp cylinder 113 of the molding machine for moving the piston in the clamp cylinder downwardly for moving the top movable mold section toward closed position as the top movable mold moves to an intermediate position just before contacting the bottom stationary mold, the low-high pressure limit switch LS17 will be moved to open the circuit controlled thereby.

By this time the clamp timer 2CT will also have completed a timing cycle for contact 3 thereof and open the circuit to the high pressure solenoid HPS by deenergizing control relay 6CR to open the contact and circuit to the high pressure solenoid HPS. The high pressure solenoid HPS is deenergized allowing the hydraulic fluid to bypass for operation of the piston in the clamp cylinder 113 at low pressure as the top mold is moved into engagement with the bottom stationary mold.

The purpose of having the top mold operated under low pressure approaching engagement with the bottom stationary mold is to prevent damage to the mold in case foreign matter of any kind is located on any part of the mold surfaces.

The mold surfaces being clean so the mold can close, the low pressure operation in the clamp cylinder 113 will move the top movable mold against the bottom stationary mold. This movement of the movable mold and piston rod 112 has the cam operated thereby disengage the low-high pressure limit switch LS17. The top mold is then fully closed under high pressure operation of the clamp piston rod 112 ready for molding plastic into the nuts in the mold. The clamp piston forces the top mold under high pressure against the lower stationary mold and clamps the molds together in intimate contact to prevent leakage of plastic during the molding operation.

When the clamp piston in clamp cylinder 113 moves the top movable mold section toward the closed position, the cam 118 on operating rod 115 disengages the arm on press open limit switch LS1, the limit switch will operate to open the circuit through contact a and close the circuit through contact b, FIGS. 40A and 40B. The closed circuit extends from one side of the power supply W–3 through ejector advance limit switch LS3 contact b, closed when the piston in ejector cylinder 125, FIG. 39 is in the upper position to hold ejector or stripper plate 60 in the return position against top movable plate 8; wire W–131; tray advance limit switch LS8, contact b, closed when tray 194 is in the return position FIGS. 4, 39 and 40A and 40B; wire W–133; press closed limit switch LS2 contact a, closed when the top movable mold section is in fully closed position with the cam 118 on operating rod 117 FIG. 7 engaged with and holding the arm of mold closed limit switch LS2 in closed position; wire W–135; to the clutch of nozzle timer 3NT and the other side of the power supply W–5.

Nozzle timer 3NT is the same type as the alarm timer 1AT and clamp timer 2CT. The contacts are set for the desired operation in which contacts 2 and 3 will be normally closed when the circuit to the timer is open and the timer is reset ready to operate. Contact 1 of nozzle timer 3NT is open when the timer circuit is open and the timer is reset for the next cycle of operation.

Closing of the circuit to the clutch of nozzle timer 3NT, as above described, simultaneously closes the circuit from wire W–135 through contact 3 to the timer motor to start the motor and a new timing operation. The nozzle timer 3NT, is set to complete its timing operation in less time than the clamp timer 2CT or alarm timer 1AT.

Contact 2 of the nozzle timer 3NT being closed when the timer clutch circuit is closed, closes a circuit from wire W–135 through wire W–137; main selector switch MSL contact 11; wire W–139 to nozzle solenoid NOS and the other side of the power supply W–5. Closing this circuit energizes nozzle solenoid NOS for operating primary nozzle control valve 460, FIG. 39, as above described, to move the piston in nozzle cylinder 162 downwardly and move nozzle pin 160 FIG. 10, into open position for injecting plastic into the mold channels and recesses in the nuts. As soon as nozzle pin 160 is moved to the open position, the injection piston and ram 150 will be operated as above described to move forward for injecting plastic under pressure through the mold channels and into the recesses in the nuts in the mold guideway 18.

As soon as the nozzle piston moves nozzle pin 160 toward open position, nozzle closed limit switch LS5 will be disengaged by the arm 164 on injection pin operating rod 161 so limit switch LS5 will operate to open the circuit through contact *a* and close the circuit through contact *b* thereof. The circuit to open press solenoid OPS is held open by open contact *a* of limit switch LS5. Closing of contact *b* of nozzle closed limit switch LS5 while the nozzle is open closes the circuit from one side of the power supply W–3 through nozzle closed limit switch LS5, closed contact *b*; wire W–69; to the magnet of control relay 4CR and the other side of the power supply W–5 for maintaining control relay 4CR energized independently of the other contacts for closing this circuit. This keeps the injection piston and ram constantly engaging the plastic in the heating cylinder under pressure while the nozzle is open for insuring complete injection of plastic into the mold, as above described.

Control relay 11CR has the magnet thereof energized at the same time as the circuit to nozzle solenoid NOS is closed. Wire W–139 is connected to the magnet of control relay 11CR to provide a parallel circuit through the relay magnet. The circuit through the contact of control relay 11CR to control relay 4CR is opened when the relay is energized. This control relay 11CR is a time delay relay and will hold the contact open for a predetermined time after the nozzle is closed.

Nozzle time 3NT is set so it will open contact 2 and the circuit to nozzle solenoid NOS for deenergizing the nozzle solenoid while the injection ram 150 is still operated to maintain pressure to feed the plastic into the heater cylinder 143. Contact 3 of the nozzle timer will be held closed to continue its operation after the nozzle is closed. When contact 2 opens the circuit to deenergize nozzle solenoid NOS, primary nozzle control valve 460 will be spring operated into the position shown in FIG. 39 for operating the piston in nozzle cylinder 162 to move the nozzle pin into closed position.

Nozzle closed limit switch LS5 is operated when the nozzle is closed to open the circuit through contact *b* to control relay 4CR magnet, while the circuit is held open by control relay 11CR. The injection ram 150 will have moved forward far enough for the cam on limit switch operating rod 153, FIG. 3, to engage and operate prepack position limit switch LS14 to open the circuit to control relay 4CR magnet and deenergize this control relay because the circuit is open at control relay 11CR and at contact *b* of nozzle closed limit switch LS5. This opens the circuit to injection solenoid INS for operating the injection ram 150 to return position to receive a new supply of plastic for heater cylinder 143. Control relay 11CR will then time out and control relay 4CR will be energized and the injection ram 150 will be moved forward to hold the plastic in heater cylinder 143 ready for the next injection into the mold.

Nozzle timer 3NT continues its timing operation after the nozzle is closed and during the time the plastic in the mold is cooling and setting. When nozzle timer 3NT nears the end of its timing operation it operates contact 1 into closed position. This closes a circuit from one side of the power supply W–3 through ejector advance limit switch LS3 contact *b*, closed when the ejector or stripper plate 60 is in return position; wire W–131; tray advance limit switch LS8 contact *b* while tray 194 is in return position; wire W–133; press closed limit switch LS2, contact *a*, closed when the movable mold section is in closed position; wire W–135; closed contact 1 of nozzle timer 3NT; wire W–143; contact *a* of injection forward limit switch LS10 not used, the circuit being closed permanently across contact *a*; wire W–145; press open limit switch LS1 contact *b* closed when the top movable mold section is in closed position; wire W–147; main selector switch MSL contact 3; wire W–149; to the magnet of control relay 1CR and the other side of the power supply W–5. This circuit is also connected from wire W–149 to the first contact of control relay 1CR.

The control relay 1CR is energized by the above mentioned circuit to close the two normally open contacts. A partial parallel circuit to the circuit last above described is closed from permanently closed contact *a* of injection forward limit switch LS10 through wire W–145; the second closed contact of control relay 1CR to wire W–147 and main selector switch MSL contact 3 for bypassing the circuit connection through press open limit switch LS1, contact *b*. A second circuit for holding relay 1CR energized extends from one side of the power supply W–3 through main selector switch MSL contact 1; wire W–71; feeder operation control switch FOS contact 2; wire W–73; contact *b* of scraper advance limit switch LS12, closed when the scraper 175 is in return position; wire W–151; the first closed contact of control relay 1CR; wire W–149 to the magnet of relay 1CR and the other side of the power supply W–5.

Nozzle timer 3NT completes its timing cycle and will stop while alarm timer 1AT and clamp timer 2CT continue their respective timing operations.

Clamp timer 2CT is set to open contact 1 for opening the circuit to close press solenoid CPS and close contact 3 for closing the circuit to open press solenoid OPS. When the nozzle piston has operated the nozzle into closed position, switch operating arm 164 on nozzle pin operating rod 161 will engage and operate the arm of nozzle closed limit switch LS5 to open contact *b* and close contact *a*. The circuit will be closed from one side of the power supply W–3 through main selector switch MSL contact 1; wire W–71; closed contact 3 of clamp timer 2CT; and the other side of the power supply W–5.

Nozzle timer 3NT completes its timing cycle and will stop while alarm timer 1AT and clamp timer 2CT continue their respective timing operations.

Clamp timer 2CT is set to open contact 1 for opening the circuit to close press solenoid CPS and close contact 3 for closing the circuit to open press solenoid OPS. When the nozzle piston has operated the nozzle into closed position, switch operating arm 164 on nozzle pin operating rod 161 will engage and operate the arm of nozzle closed limit switch LS5 to open contact *b* and close contact *a*. The circuit will be closed from one side of the power supply W–3 through main selector switch MSL contact 1; wire W–71; closed contact 3 of clamp timer 2CT; wire W–101; contact *a* of nozzle closed limit switch LS5 closed when the nozzle reaches the closed position; wire W–103; the closed contact of energized control relay 10CR; wire W–65; the fifth closed contact of main relay MR1; wire W–67 to open press solenoid OPS and the other side of the power supply W–5. As a result of close press solenoid CPS being deenergized and open press solenoid OPS being energized the primary clamp cylinder control valve 420 will be moved from the position, as shown in FIG. 39, to the right to position the passages in the left end of the valve 420 so hydraulic fluid will flow through pipe 422 to valve operating cylinder 424. Valve operating cylinder 424 will have the fluid pressure move secondary clamp cylinder control valve 423 to the left as shown in FIG. 39 to position the passages in the right end for supplying fluid pressure to clamp cylinder 113 to move the contact *a* closed when the mold is open; wire W–153; contact 4 of main selector switch MSL; wire W–155; contact 2 of tray selector switch TSS; wire W–157; contact 5 of main selector switch MSL; wire W–159; to the tray solenoid TRS and the other side of the power supply W–5. This circuit also extends to the magnet of control relay 1CR through wire W–149 and from the magnet to the other side of the power supply W–5 so control relay 1CR remains energized during tray operation.

When the tray solenoid TRS is energized it operates tray control valve 474, as described in connection with FIG. 39, to supply hydraulic fluid under pressure for operating the piston in tray cylinder 206 to move tray 194 forward under the top movable mold section in open position. As the tray 194 moves forward, tray return limit switch LS9 will be operated to open contact *a* and close contact *b*.

When the tray reaches advance position it operates tray advance limit switch LS8 to open contact *b* and close contact *a* for closing the circuit to ejector solenoid EJS. This circuit extends from one side of the power supply W–3 through main selector switch MSL contact 1; wire W–71; the second contact of feeder operation control switch FOS; wire W–73; contact *b* of scraper advance limit switch LS12 closed with the scraper in return position; wire W–151; the first closed contact of energized control relay 1CR; wire W–149; the third contact of main selector switch MSL; wire W–147; closed contact 2 of energized control relay 1CR; wire W–145; press open limit switch LS1 contact *a* closed when the movable mold section is open; wire W–153; tray return limit switch LS9 contact *b* closed when the tray 194 is in the advance position; wire W–161; tray advance limit switch LS8 contact *a* closed when the tray 194 is in the advance position; wire W–163; comb advance limit switch LS6 contact *b* closed when the comb is in the return position; wire W–165; main selector switch MSL contact 7; wire W–167; closed contact 3 of energized control relay 5CR; wire W–169; to the magnet of ejector solenoid EJS and the other side of the power supply W–5.

As soon as ejector solenoid EJS is energized, it immediately operates primary ejector control valve 435 for moving the valve to the right as shown in FIG. 39 for supplying fluid under pressure to ejector cylinder 125, FIGS. 4, 8, 16, 17 and 39 for moving the piston rod 126 upwardly and moving ejector supporting plate 53 and ejector or stripper plate 60 downwardly relative to top support plate 8 for discharging the molded nuts from mold pins 79 into tray 194. The sprue pins 68 and 69 are also moved downwardly to space the sprue below top support plate 8 as previously described, see FIGS. 16 and 17.

The movement of ejector or stripper plate 60 away from the top mold plate 8 disengages switch operating cam 133 from ejector return limit switch LS4 for opening the circuit to control relay 3CR for deenergizing this relay. When the ejector or stripper plate 60 reaches the lower or advance position relative to the top movable plate 8, FIG. 8, cam 133 engages the switch arm of ejector advance limit switch LS3 and operates the switch to open the circuit through contact *b* and close the circuit through contact *a* thereof. This closes the circuits for operating the comb by energizing control relay 2CR. Opening of the circuit through contact *b* opens the circuit to nozzle timer 3NT causing it to reset for the next cycle of operation.

The circuit for energizing control relay 2CR extends from one side of the power supply W–3 through main selector switch MSL contact 1; wire W–71; feeder operation control switch FOS contact 2; wire W–73; scraper advance limit switch LS12 contact *b* closed when scraper 175 is in the return position; wire W–151; the closed first contact of energized control relay 1CR; wire W–149; main selector switch MSL contact 3; wire W–147; the closed second contact of energized control relay 1CR; wire W–145; press open limit switch LS1 contact *a* closed when the movable mold section is in open position; wire W–153; tray return limit switch LS9 contact *b* closed when the tray 194 is in advance position; wire W–161; injection forward limit switch LS10, contact *b* permanently closed, limit switch LS10 not being used; wire W–171; press closed limit switch LS2 contact *b* closed when the top movable mold section is in open position; wire W–173; the closed second contact of deenergized control relay 3CR; wire W–175; ejector advance limit switch LS3 contact *a* closed when ejector or stripper plate 60 is in the lower or advance position, FIG. 8 spaced below top movable plate 8; wire W–177 to magnet of control relay 2CR and the other side of the power supply W–5. This circuit has a branch circuit extending from ejector advance limit switch LS3 contact *a* through wire W–177; main selector switch MSL contact 8, wire W–181 to comb solenoid COS and the other side of the power supply W–5 for energizing comb solenoid COS simultaneously with magnet of control relay 2CR.

As soon as control relay 2CR is energized, another circuit is closed for by-passing the permanently closed contacts of injection forward limit switch LS10, press closed limit switch LS2 contact *b*; the second closed contact of deenergized control relay 3CR and ejector advance limits switch LS3 contact *a*. This other circuit extends from one side of the power supply W–3 through main selector switch MSL contact 1; wire W–71; feeder operation control switch FOS contact 2; wire W–73; scraper advance limit switch LS12, contact *b*, closed when scraper 175 is in return position; wire W–151; the first closed contact of energized control relay 1CR; wire W–149; main selector switch MSL contact 3; wire W–147; the second closed contact of energized control relay 1CR; wire W–145; press open limit switch LS1 contact *a*, closed when the top movable mold section is in open position; wire W–153; tray return limit switch LS9, contact *b*, closed when tray 194 is in advance position; wire W–161; the closed contact of control relay 2CR energized when the ejector or stripper plate 60 is in advance position; wire W–177; main selector switch MSL contact 8; wire W–181 to comb solenoid COS and the other side of the power supply W–5. A branch parallel circuit extends from the closed contact of control relay 2CR through wire W–177 to the relay magnet and the other side of the power supply W–5 for keeping the relay energized with this last mentioned circuit.

The energized comb solenoid COS operates comb control valve 480 FIG. 39 to supply fluid under pressure to comb cylinder 185 for moving the piston therein to move comb 181 into the advance position under ejector plate 60 with sprue pins 68 and 69 received in slot 183 in comb plate 181 above the sprue, FIGS. 16 and 17 as heretofore described. The comb plate 181 is located above tray 194 in advance position so the sprue will fall into the tray when removed from the sprue pins.

It will be noted that the circuit to the magnet of control relay 3CR through wire W–123 from ejector return limit switch LS4, contact *a*, is closed to energize control relay 3CR only when the ejector plate 60 is in return position against top support plate 8. When ejector plate 60 is moved to advance position and the circuit through the magnet and contact of control relay 2CR is closed holding the relay energized, the comb 181 will be held in advance position independently of control relay 3CR.

As the comb 181 leaves the return position, the comb disengages from the arm of comb return limit switch LS7, FIG. 6. The comb return limit switch LS7 is operated to open contact *a* and the circuit controlled thereby as hereinbefore described in connection with operation of close press solenoid CPS and close the circuit through contact *b* thereof. When the comb 181 reaches advance position, comb advance limit switch LS6 will be engaged and operated by arm 184 on connecting bar 179 FIG. 6 to open the circuit through contact *b* and close the circuit through contact *a* thereof.

Ejector solenoid EJS is deenergized when contact *b* of comb advance limit switch LS6 is opened which will provide for spring operation of primary ejector control valve 435, to the position shown in FIG. 39 for operating secondary ejector control valve 438 for supplying fluid under pressure to operate the piston in ejector cylinder 125 and the other parts operated by the piston to move ejector plate 60 to the return position against the lower face of top movable support plate 8.

During this return movement of the ejector plate 60 and ejector supporting plate 53, the sprue pins 68 and 69 are moved upwardly while the sprue will be disengaged from the lower ends of the sprue pins 68 and 69 by the comb plate 181 as described in connection with the construction of the mold and shown in FIGS. 16 and 17. The sprue falls into the tray 194 as sprue is held by comb 181 and the sprue pins are withdrawn in upward movement above the comb. When the ejector plate 60 moves upwardly toward the return position, ejector advance limit switch LS3 is operated by switch operating cam 133 on limit switch operating rod 132, FIGS. 4, 40A and 40B to open the circuit through contact $a$ and close the circuit through contact $b$ thereof. The ejector return limit switch LS4 is operated as ejector plate 60 reaches the return position to close the circuit controlled thereby through wire W–123 for energizing control relay 3CR. The circuit through the third contact of control relay 3CR is closed when the relay is energized for securing operation of the scraper 175 to push the molded nuts from the tray 194 into the nut discharge casing 187, FIGS. 23 and 24.

The circuit for operating the scraper 175 extends from one side of the power supply W–3, FIGS. 40A and 40B, through main selector switch MSL contact 1; wire W–71; feeder operation control switch FOS contact 2; wire W–73; scraper advance limit switch LS12 contact $b$, closed when scraper 175 is in the return position; wire W–151; the first closed contact of energized control relay 1CR; wire W–149; main selector switch MSL contact 3; wire W–147; the second closed contact of energized control relay 1CR; wire W–145; press open limit switch LS1 contact $a$; closed when the movable mold section is in open position; wire W–153; tray return limit switch LS9, contact $b$, closed when tray 194 is in the advance position; wire W–161; tray advance limit switch LS8 contact $a$, closed when the tray is in advance position; wire W–163; comb advance limit switch LS6, contact $a$, closed when comb 181 is in advance position; wire W–183; comb return limit switch LS7 contact $b$, closed when the comb 181 is in advance position; wire W–185; main selector switch MSL contact 10; wire W–187; the closed third contact of energized control relay 3CR; wire W–189 to scraper solenoid SCS and to the other side of the power supply W–5.

As soon as the scraper solenoid SCS is energized it operates scraper control valve 488 for moving it to the right as shown in FIG. 39 to supply fluid under pressure to scraper cylinder 171 for moving the piston therein and scraper 175 to the advance position. As the scraper 175 is moved forwardly in tray 194 it will push the molded nuts into discharge casing 187, FIGS. 20 to 24. When the scraper 175 reaches the forward position at the outer end of the tray, the scraper shaft connecting bar 170 will engage the operating arm of scraper advance limit switch LS12 and open the circuit through contact $b$ and close the circuit through contact $a$ thereof. As the scraper leaves the return position, scraper shaft connecting bar 170, FIG. 6, will disengage the arm of scraper return limit switch LS13 for opening the contact thereof and the circuit from power supply W–3 through wire W–125 to the magnet of control relay 5CR and the other side of the power supply W–5 for deenergizing control relay 5CR to open the circuits through the first four contacts and close the circuit through the fifth contact thereof.

When scraper advance limit switch LS12 contact $b$ is opened as the scraper 175 reaches the advance position it opens the circuits to control relay 1CR for deenergizing the relay and the circuits through the contacts thereof to the tray solenoid TRS, the comb solenoid COS, and the scraper solenoid SCS for deenergizing all three solenoids simultaneously. The tray control valve 474 is spring operated when tray solenoid TRS is deenergized to move the valve to the position shown in FIG. 39. The comb control valve 480 is spring operated to the position shown in FIG. 39, and the scraper control valve 488 is spring operated to the position shown in FIG. 39 upon deenergization of the solenoids. Fluid under pressure will be delivered substantially simultaneously to tray cylinder 206, scraper cylinder 171 and comb cylinder 185 for operating the respective pistons in the cylinders for moving the tray 194, scraper 175 and comb 181 from the advance to the return positions together.

As previously described, air blast limit switch LS15 is operated when injection ram 150 is returned for a new supply of plastic. This occurs each time that a molding operation for filling the recesses in a plurality of nuts with plastic is completed so that air blast limit switch LS15 will be closed each time before the mold opens. When the cam on operating rod 156, FIG. 3, engages the arm of air blast limit switch LS15 it operates the switch to close a circuit, FIGS. 40A and 40B, from one side of the power supply W–3, through the contact of air blast limit LS15, wire W–191 to air blast solenoid AIR and the other side of the power supply W–5 for energizing the air blast solenoid. When air blast solenoid AIR is energized it opens a valve controlling the discharge of compressed air from air discharge tubes 189 and 203 for blowing nuts out of the discharge casing 187, sprue out of tray 194 while the mold remains closed. An air blast limit switch 24 is operated by the arm 121 on movable platen 52 engaging the arm of limit switch LS24 when the mold is moving upwardly to open position for closing the contacts of the limit switch. Air blast limit switch LS24 is connected in parallel with air blast limit switch LS15 so that the circuit will extend from one side of power supply W–3 through the limit switch contacts and wire W–191 to air blast solenoid AIR and the other side of power supply W–5. Air blast limit switch LS24 operates air blast solenoid AIR for discharging compressed air through air discharge tubes 189, 203 and nozzles 208 and 209 independently of air blast limit switch LS15 for blowing nuts out of the discharge casing, sprue out of the tray 194 and loose particle out of the bottom stationary mold section in the open position of the mold.

When the top movable mold section moves to open position it operates mold open limit switch LS20 by the operating arm 122 on one end of the movable platen 53 engaging the switch arm to close both contacts $a$ and $b$ thereof. When scraper 175 reaches the advance position it operates scraper advance limit switch LS12 to close contact $a$. This closes a circuit from one side of the power supply W–3 through closed contact $a$ of mold open limit switch LS20; wire W–55; closed contact $a$ of scraper advance limit switch LS12 when the scraper 175 is in the forward position; wire W–193; to the magnet of control relay 7CR and the other side of the power supply W–5. Closing of this circuit energizes control relay 7CR when scraper 175 reaches the advance position. When control relay 7CR is energized it closes both of the contacts controlled thereby. The first contact of control relay 7CR closes a circuit from one side of the power supply W–3 through mold open limit switch LS20 contact $a$ closed when the top mold section is in open position; wire W–55; the closed first contact of control relay 7CR to wire W–193, the magnet of relay 7CR and the other side of the power supply W–5 for W–197; the closed fifth contact of control relay 113CR, maintaining control relay 7CR energized independently of contact $a$ of scraper advance limit switch LS12.

A circuit extends from one side of the power supply W–3 through closed contact $a$ of a mold open limit switch LS20; wire W–55; pusher forward limit switch LS19 contact $b$, closed when the pusher 355 has been moved to deliver a new supply of nuts into guideway 18 of the bottom mold section; wire W–56 to the magnet of control relay 8CR and the other side of the power supply W–5. When the magnet of control relay 8CR is energized it closes both contacts thereof. A circuit is closed from power supply W–3 through mold open limit switch LS20 contact *a*; wire W–55; the first closed contact of energized control relay LS8; wire W–56 to the magnet of the control relay and the other side of the power supply W–5, for maintaining control relay 8CR energized independently of pusher forward limit switch LS19.

Another circuit is closed from one side of the power supply W–3 through the second closed contact of energized control relay 7CR; wire W–195; the second closed contact of energized control relay 8CR; wire W–197; the closed fifth contact of control relay 113CR, closed in the deenergized condition of control relay 113CR; wire W–199; to the magnet of control relay 9CR and the other side of the power supply W–5. A parallel circuit is connected with wire W–197 to the fourth contact of control relay 5CR closed in deenergized condition and wire W–199. When control relay 9CR is energized the contact thereof is moved to open position for opening the previously described circuit to the alarm timer 1AT and clamp timer 2CT through wire W–77 for stopping both timers after which they will reset for the next molding operation.

It will be understood from the above description of the circuits for control relays 7CR, 8CR and 9CR, that they are operated under the combined control of the movable mold section, the scraper 175 and the pusher 355 in completing a cycle of operation of the machine for molding plastic in a plurality of articles, discharging the molded articles and completing the resetting of the machine for the next cycle of operation. In completing a cycle of operation the tray 194, the comb 181, the scraper 175 and the pusher 355 will all be moved to their respective return positions for operating the respective return limit switches in the return positions.

The operation and control of the machine as herein described obtains the feeding of a new supply of nuts into guideway 18 of the bottom stationary mold section after the air blast cleans the mold and while the molded nuts are being removed with the sprue from the top movable mold section into the tray and then discharged from the machine.

The molding machine and nut feeding and punching mechanism have their operation made interdependent by the control provided by control relay 113CR, and limit switches LS19 and LS20, without regard to the speed at which each part of the mechanism may operate.

*Manual operation*

Provision is made for manual operation of parts of the molding machine and nut feeding mechanism principally for making adjustments and servicing.

For manual operation of some of the main parts of the molding machine, the main selector switch MSL is operated from the automatic position shown in FIG. 40A to the manual position. In the manual position push buttons PB4 through PB7 have one terminal connected to one side of the power supply through a common circuit. This common circuit extends from the main power supply W–3 through main selector switch MSL contact 9; wire W–145; press open limit switch LS1 contact *a*, closed when the mold is open; wire W–153; main selector switch contact 4; wire W–203; main selector switch contact 6 and wire W–205 to one terminal of each of the push buttons PB4 to 7 inclusive.

Tray advance push button PB4 has the other terminal connected by wire W–159 to the tray solenoid TRS and the other side of the power supply W–5. This circuit provides for independent manual operation of the tray 194 by push button PB4.

Comb advance limit switch PB5 is operated to close the circuit to comb solenoid COS through wire W–181 to secure independent manual operation of the comb 181. Scraper advance limit switch PB6 is operated to close the circuit to scraper solenoid SCS through wire W–187; the third closed contact of energized control relay 3CR and wire W–189 to the scraper solenoid and the other side of the power supply W–5 to secure independent manual operation of scraper 175.

Manual operation of the nozzle is obtained by operating nozzle open push button PB7 to close the circuit through wire W–139 to nozzle solenoid NOS and the other side of the power supply W–5. The nozzle can be independently manually operated to open position by push button PB7 to check on the operation of not only the nozzle or injection shut-off pin 160 but also to check on the operation of the injection cylinder 151 and injection ram 150.

Hand ejector selector switch HES is manually operable to close the circuit from wire W–203 to wire W–167; the closed third contact of energized control relay 5CR and wire W–169 to ejector solenoid EJS and the other side of the power supply W–5. This enables independent manual operation of stripper plate 60 and the associated parts for checking the adjustment and operation thereof.

The manual switch AUC is used for manual operation to open the circuits to the retract pusher solenoid S1 and retract track solenoid S2 in case nuts jam in the guideway 18 in the bottom mold section preventing the pusher from completing its movement to advance position to place a full supply of nuts in the mold.

It is seen from the foregoing disclosure that the objects and purposes of the invention are well fulfilled. It is to be understod that the foregoing disclosure is given by way of illustrative example only, rather than by way of limitation, and that without departing from the invention, the details may be varied within the scope of the appended claims.

What is claimed is:

1. A machine for molding a plastic insert in a recess in a nut about the bolt receiving aperture therein through an injection aperture in a side of said nut, comprising a mold formed of stationary and movable sections, means for moving said movable section between open and closed positions relative to said stationary section, said stationary mold section comprising a runner block, having a side wall forming one side of a guideway formed with a plurality of spaced injection nozzles opening in longitudinal relation along said side wall, and a locating member movable transversely relative to said runner block forming an adjacent side of said guideway along said side wall, said mold sections being formed with registering channel portions in opposed faces thereof closed in the closed position of said mold sections for passage of plastic material therethrough, said movable mold section forming a portion of said guideway opposed to said locating member, means for feeding a plurality of nuts equal in number to the number of injection nozzles into said guideway along said locating member and mold side wall while said movable mold section is in open position, said movable mold section engaging said nuts in said guideway in closed position and cooperating with said locating member in locating said injection aperture in said nuts in aligned relation with said injection nozzles, means carried by said mold sections engaging and moving said nuts along said side wall and locating member to register said injection apertures with said injection nozzles, holding means operated by said movable mold section in closed position to engage and hold the nuts in said guideway with the surface portions adjacent said injection apertures in tight engagement with said side wall about said injection nozzles, and means for injecting plastic material through said channel portions and injection nozzles into said injection aperture, and recesses in said nuts.

2. A machine as claimed in claim 1, wherein said locating member moves said nuts along said side wall for shearing the plastic material across the juncture of said injection nozzle and aperture with the opening movement of said movable mold section.

3. A machine as claimed in claim 1, wherein mold pins are mounted in said movable mold section in position to engage in the bores of the nuts in said guideway for filling said bores, defining the plastic receiving recess in each nut and cooperating in locating the nuts in position to register said injection aperture of each nut with a corresponding injection nozzle when said movable mold section is closed, said mold pins removing the nuts after the recesses are filled with plastic material from said stationary mold and after the locating member moves the nuts along said side wall for shearing the plastic at the junctures of said injection nozzles and apertures, and means for removing the molded nuts from said mold pins.

4. A machine for molding a plastic insert in a recess in a nut about the bolt receiving bore therein through an injection aperture in a side of said nut, comprising a mold formed of stationary and movable sections, mold operating means for moving said movable section between open and closed positions relative to said stationary section, said stationary mold section comprising a runner block having a side wall forming one side of a guideway formed with a plurality of spaced injection nozzles opening in longitudinal relation along said side wall, and a locating member movable transversely relative to said runner block toward the movable mold section, forming an adjacent side of said guideway along said side wall, said mold sections being formed with registering channel portions in opposed faces thereof closed in the closed position of said mold sections for passage of plastic material therethrough to said injection nozzles, said movable mold section forming a portion of said guideway in opposed relation to said locating member, feeding means for automatically feeding a predetermined number of nuts equal to the number of injection nozzles in said runner block into said guideway in oriented position for locating said injection apertures in position for registry with said injection nozzles, when said movable mold section is in open position, means on said stationary mold section for holding nuts fed into said guideway to limited longitudinal movement therein, mold pins mounted in said movable mold section in position to engage in the bores of the nuts in said guideway for filling said bores, defining the plastic receiving recess in each nut and cooperating in locating the nuts in position to register said injection aperture in each nut with a corresponding injection nozzle when said movable mold section is closed, said movable mold section engaging said nuts in said guideway in closed position and cooperating with said mold pins and locating member in locating said injection apertures in said nuts in aligned relation with said injection nozzles, and injection means for injecting plastic material through said channel portions and injection nozzles into the recesses in said nuts about said mold pins in the closed position of said movable mold section.

5. A machine as claimed in claim 4, wherein said means for automatically feeding a predetermined number of nuts comprises feeding means for receiving, orienting and feeding a plurality of nuts in successive relation, a guide track receiving nuts from said feeding means and conveying said nuts toward said mold sections, means for feeding nuts through said guide track, and means for receiving a predetermined number of nuts from said guide track equal to the number of injection nozzles in said runner block and feeding them into the guideway in said stationary mold section.

6. A machine as claimed in claim 4, wherein said means for automatically feeding a predetermined number of nuts comprises feeding means for receiving, orienting and feeding a plurality of nuts in successive relation, a guide track for successively receiving nuts from said feeding means and conveying said nuts in oriented relation therethrough, a track slide movable between two positions, one with a guideway therein alined with said guide track for receiving nuts therefrom and the other with the guideway therein alined with the guideway in the stationary mold section, said track slide having the guideway therein formed to receive only a predetermined number of nuts equal to the number of injection nozzles in said runner block, and means for delivering the nuts from said track slide in the other position into the guideway in said stationary mold section.

7. A machine as claimed in claim 4, wherein said means for automatically feeding a predetermined number of nuts comprises feeding means for containing a supply of nuts, orienting said nuts into a predetermined position and feeding said nuts one at a time outwardly from an outlet therein, a guide track for receiving nuts from said outlet and guiding said nuts in alined relation from said feeding means toward the opposite end thereof, a track member formed with a guideway proportioned to receive a predetermined number of nuts in alined relation equal to the number of nozzles in said runner block, said track member being movable between a first position with the guideway therein alined with the end of said guide track for receiving nuts in said guideway therein and into a second position with the guideway alined with the guideway in said stationary mold section, and a pusher member operable to push the nuts in said track member into said stationary mold section when said guideway in said track member is in said second position and said movable mold section is in open position.

8. A machine as claimed in claim 4, wherein said means for automatically feeding a predetermined number of nuts comprises feeding means for containing a supply of nuts, orienting said nuts into a predetermined position and feeding said nuts one at a time outwardly from an outlet therein, a guide track for receiving nuts from said outlet and guiding said nuts in alined relation from said feeding means toward the opposite end thereof, track feed means for feeding the nuts along said guide track, a track slide at the opposite end of said guide track having a guideway for receiving a predetermined number of nuts from said guide track in one position and movable into another position for alining the guideway therein, with the guideway in said stationary mold section, and a pusher member operable to push the nuts in said track slide into said stationary mold section when said track slide is in said second position and said movable mold section is in open position.

9. A machine as claimed in claim 4, wherein said means for automatically feeding a predetermined number of nuts comprises feeding means for containing a supply of nuts each formed with a recess, orienting said nuts into a predetermined position and feeding said nuts one at a time outwardly from an outlet therein, a guide track having a section for receiving nuts from said outlet and guiding said nuts in alined relation from said feeding means toward the opposite end thereof, forming means for receiving nuts from said guide track section, operable to form an injection aperture in each nut extending through one side thereof into said recess, punch feed means for feeding nuts through said forming means into another section of said guide track toward the opposite end thereof, track feed means for feeding nuts along said guide track sections, a track slide at the opposite end of said another section of said guide track having a guideway for receiving a predetermined number of nuts from said guide track in one position and movable into another position for alining the guideway therein with the guideway in said stationary mold section, and a pusher member operable to push the nuts in said track slide into said stationary mold section when said track slide is in said second position and said movable mold section is in open position.

10. A machine as claimed in claim 4, wherein said mold pins are formed for cooperation with the plastic material in said recesses for removing said nuts therewith from said guideway after said locating member slides said nuts along the side wall of said runner block for shearing the plastic between the outer end of the injection aperture and injection nozzle during initial opening movement of said movable mold section, ejector means on said movable mold section operable to remove said nuts from said mold pins when said movable mold section reaches open position, and tray means movable between said mold sections in open position to receive the nuts when discharged from said mold pins for subsequent delivery from said machine.

11. A machine as claimed in claim 4, wherein said mold pins are formed with tapered portions in said recesses in said nuts for cooperation with the molded plastic material for removing said nuts therewith from said guideway as the movable mold section is moved toward open position, said locating member sliding along the side wall of said runner block and pushing said nuts for shearing the plastic along the sides of said nuts and said side wall as the mold moves toward open position, sprue pins mounted in said movable mold section having end portions extending into said channel portions in said runner block and movable mold section in closed position for having the plastic molded on the ends of said sprue pins for removal of the plastic sprue from said channel portions of said stationary mold section with movement of the movable mold section into open position, ejector means on said movable mold section operable to remove said nuts from said mold pins when said movable mold section is in open position, pin moving, means for moving said sprue pins to move the sprue into spaced relation away from said movable mold section, tray means movable between said mold sections in open position to receive nuts discharged from said mold pins, comb means movable between said sprue and movable mold after said pin moving means has moved said sprue into spaced relation to said movable mold section and said nuts have been discharged into said tray means, said pin moving means being operated to retract said sprue pins for withdrawing the ends from the sprue while engaged with said comb means for discharge of the sprue into said tray means and discharge means for discharging the nuts and sprue from said tray means in separated relation.

12. A machine as claimed in claim 4, wherein automatic control means controls operation of said mold operating means, feeding means and injection means for feeding a supply of nuts into the stationary mold section in the open position of said mold sections, closing said mold sections and injecting plastic into said mold and nuts therein, and moving said mold sections to open position for discharge of the molded nuts from said open mold sections, and means for stopping operation of the machine upon failure of uniform nut feed.

13. A machine as claimed in claim 4, wherein automatic control means secures automatic machine operation and controls operation of said mold operating means, feeding means and injection means for feeding a supply of nuts into said stationary mold section in the open position of said mold sections, closes said mold sections, and operates said injection means to inject plastic into the nuts in said mold, and then move said movable mold section to open position for removal of the molded nuts, mold operated means for controlling operation of said feeding means for said nuts to stop operation of said feeding means, when a predetermined supply of nuts are available to feed to said mold, and nut feed operated control means for holding said mold operating means until a fully supply of nuts is delivered to the guideway in said stationary mold section.

14. A machine as claimed in claim 4, wherein automatic control means secures automatic operation of the mold operating means, the feeding means and the injection means, in timed relation to feed a supply of nuts into the guideway in said stationary mold section when said movable mold is in open position, for operation of said injection means to inject plastic material into the nuts in said stationary mold section when said mold is closed, mold operated means for holding operation of said feeding means until said stationary mold section is ready for a new supply of nuts, and control means operated by said feeding means for holding said movable mold section in open position until a supply of nuts is obtained by said feeding means and delivered to said stationary mold section.

15. A machine as claimed in claim 4, wherein automatic control means controls operation of said mold operating means, the feeding means and injection means in sequential relation to feed a supply of nuts into the guideway in said stationary mold section when said movable mold is in open position, for operation of said injection means to inject heated plastic material into the nuts in said stationary mold section when said mold sections are in closed position, timing means for holding said mold sections closed for a predetermined length of time sufficient to allow said injection means to fill the cavities in all of the nuts and allow it to harden, and timing means for said injection means for continuing operation of said injection means for a time sufficient to fill the cavities in said nuts with plastic material.

16. A machine as claimed in claim 4, wherein automatic control means secures automatic operation of the mold operating means, the feeding means and the injection means in sequential timed relation to feed a supply of nuts into the guideway in said stationary mold section when said movable mold section is in open position, for operation of said injection means to inject plastic material into the nuts in said stationary mold section when said movable mold section is in closed position, clamp timer means for holding said mold sections closed for a predetermined length of time sufficient to allow said injection means to fill the cavities in all of the nuts and allow it to harden, injection timing means for continuing operation of said injection means for a time sufficient to fill the cavities in said nuts with plastic material, and an alarm timing means operable to time the operation of the molding machine for each nut molding operation cycle for signalling the failure of said machine to complete a molding cycle within a predetermined period of time.

17. A machine for molding a plastic insert in a recess in a nut about the bolt receiving bore therein through an injection aperture, comprising a mold formed of stationary and movable sections, mold operating means for moving said movable mold section between open and closed positions relative to said stationary section, said stationary mold section having a runner block providing a side wall forming one side of a guideway formed with a plurality of spaced injection nozzles opening in longitudinal spaced and alined relation through said side wall, a locating member movable transversely relative to said runner block forming an adjacent side of said guideway along said side wall, said mold sections being formed with registering channel portions in opposed faces thereof closed in the closed position of said mold sections for passage of plastic material therethrough to said injection nozzles, said movable mold section forming a portion of said guideway in opposed relation to said locating member, feeding means for receiving, orienting and feeding a plurality of nuts in successive relation, a guide track for successively receiving nuts from said feeding means and conveying said nuts in oriented relation therethrough, a track slide movable between two positions, a return position with a guideway therein alined with said guide track for receiving nuts therefrom and a forward position with the guideway therein alined with the guideway in the stationary mold section, said track slide having the guideway therein formed to receive a predetermined number of nuts equal to the number of injection nozzles in said runner block, pusher means for delivering the nuts from said track slide in the forward position into the guideway in said stationary mold section, means on said stationary mold section for holding nuts fed into said guideway to limited longitudinal movement therein, mold pins mounted in said movable mold section in position to engage in the bores of the nuts in said guideway for filling said bores, defining the plastic receiving recess in each nut and cooperating in locating the nuts in position to register said injection aperture in each nut with a corresponding injection nozzle when said movable mold section is closed, said movable mold section engaging said nuts in said guideway in closed position and cooperating with said mold pins and locating member in positioning said injection apertures in said nuts in alined relation with said injection nozzles, injection means for injecting plastic material through said channel portions and injection nozzles into the recesses in said nuts about said mold pins in the closed position of said movable mold section, and electric control means for producing an automatic cycle of operation in operating said feeding means to feed oriented nuts, into the guideway in said track slide, moving said track slide from said return to the forward position, operating said pusher means for delivering a supply of nuts to said stationary mold section, operating said mold operating means to close said mold, operating said injection means for injecting plastic into the nuts in said mold, subsequently opening said mold for discharge of said nuts in sequence and repeating said cycle of operation.

18. A machine as claimed in claim 17, wherein said electric control means has a mold operated means controlling operation of said pusher means for delaying the operation of said pusher means until said movable mold section is in open position.

19. A machine as claimed in claim 17, wherein said electric control means has means for holding said mold in open position until a complete supply of nuts in properly oriented position are delivered into the guideway in said stationary mold.

20. A machine as claimed in claim 17, wherein said electric control means includes electric controls for stopping the operation of the feeding means for nuts when the track slide is filled with nuts.

21. A machine as claimed in claim 17, wherein said electric control means has means for stopping operation of the nut feed when said track slide is filled with nuts, then operates the track slide to the forward position, operates the pusher means for delivering the nuts from the track slide into the mold guideway, and mold controlled means for preventing operation of the pusher means except when the mold is in open position.

22. A machine as claimed in claim 17, wherein said electric control means comprises operating a control for stopping operation of the nut feed when the track slide is filled with nuts, then operates a control for moving the track slide to the forward position, then operates a control for operating the pusher means to deliver the nuts from said track slide to the guideway in said stationary mold, then operates a control for returning the pusher means and track slide to return position, a mold operated control holding delivery of the nuts to the mold by said pusher means until the mold is in open position, then operates controls to start the nut feed to supply nuts to the track slide in return position while starting a cycle of operation of said mold to close and mold plastic in the nuts delivered thereto.

23. A machine as claimed in claim 17, wherein a punch is included in the nut feeding means operable to punch an injection aperture in the side of each nut, and electric control means comprises a control for stopping the punch and feeding means when said track slide is full of nuts, a control for operating the track slide into the forward position, a control operated by the track slide in said forward position to operate the pusher means for delivering nuts to said stationary mold section, and controls for returning the pusher means and track slide to their return positions and starting the punch and feeding means.

24. A machine as claimed in claim 17, wherein a punch is included in the nut feeding means operable to punch an injection aperture in the side of each nut fed by said feeding means, and electric control means comprises a control for stopping the punch and feeding means when said track slide has received a complete supply of nuts in said return position, a control for operating said track slide to the forward position, a control for operating the pusher means to feed the nuts in the track slide into the guideway in said stationary mold section, a control for holding said movable mold open during operation of said pusher means, a control for returning said pusher means and track slide to their return positions, starting said punch and feeding means and operating a control to start a cycle of operation of said mold to close said mold, inject plastic material into the nuts in said mold through said injection nozzles and apertures and open the mold for discharge of molded nuts, and a control for starting repeat cycles of operation of said feeding means, punch, track slide, feeding means and mold operating means.

25. A machine as claimed in claim 17, wherein said electric control means has means for stopping operation of the nut feed when said track slide is filled with nuts, operates the track slide to the forward position, operates the pusher means for delivering the nuts from the track slide into the mold guideway when the track slide is in forward position, has mold controlled means for preventing operation of the pusher means except when the mold is in open position, operates the mold operating means to move said movable mold section into closed position when a supply of nuts has been positioned in said stationary mold section said pusher means has been returned to its returned position and operates said injection means to inject plastic into the recesses in the nuts in said mold, operates said movable mold section into open position after said nut recesses are filled with plastic material, operates timing means for controlling the operation of said mold operating means to hold said mold closed for a predetermined length of time during which said injection means is operated to fill the recesses in the nuts with molten plastic material and allow it to harden, operates control the starting of repeat cycles of operation of said machine, and operates to stop operation of said machine for failure to complete a cycle of operation within a predetermined length of time.

26. A machine as claimed in claim 17, wherein a punch is included in the nut feeding means operable to punch an injection aperture in the side of each nut fed by said feeding means, ejector means for removing said nuts from said movable mold section and mold pins in open position of said movable mold section, and said electric control means has means for stopping operation of the nut feed when said track slide is filled with nuts, operates the track slide to the forward position, operates the pusher means when the track slide is in forward position for delivering the nuts from the track slide into the guideway in the stationary mold section, has mold controlled means for preventing operation of the pusher means except when the mold is in open position, operates to stop the feeding means and punch when said track slide is filled with nuts and during movement of the track slide out of return position, operates the pusher means and track slide into return position, operates the mold operating means to move said movable mold section into closed position, operates said injection means to inject plastic into the recesses in the nuts in said mold, operates said mold operating means to move said movable mold section into open position, operates timing means for controlling the operation of said mold operating means to hold said mold closed for a predetermined length of time during which said injection means is operated to fill the recesses in the nuts with molten plastic material and allow it to harden before said movable mold section is moved to open position, operates said ejector means to eject the molded nuts from said movable mold section in open position, operates to control the starting of repeat cycles of operation of said machine, and operates to stop operation of said machine for failure to complete a cycle of operation within a predetermined length of time.

27. A molding machine, comprising a mold formed of a stationary bottom section and a movable top section, said bottom section formed of a plate having a substantially flat upper surface, formed with a recess opening through said upper surface, a runner block mounted in a portion of said recess having the upper face substantially flush with the upper face of said plate, having one side wall thereof opening in said recess, having the upper portion formed with channel portions opening through said upper face and having a predetermined number of longitudinally spaced apertures opening through said side wall a predetermined distance below said upper face and forming injection nozzles, said apertures opening into said channel portions at the inner ends, a locating bar slidably mounted in said recess with the upper portion on one side adjacent said side wall of said runner block, said locating bar having the upper end formed to provide the bottom of a guideway in said bottom section, the side wall of said runner block cooperating to form a side wall of said guideway, means securing said locating block to said bottom plate for limited vertical sliding movement along said side wall of the runner block, resilient means for normally moving said locating block to the upper limit of movement, a slide member mounted in the recess in said plate for movement toward and from said runner block and locating block, resilient means normally moving said slide member away from said runner block, means for limiting sliding movement of said slide member, said guideway slidably receiving a plurality of objects formed with a recess and an injection aperture extending from said recess through the side wall of said object, means for positioning said objects with the injection aperture in each object in registry with one of said injection nozzles, means on said slide member for engaging and holding said objects against said side wall, means for moving said movable top section into and out of engagement with said bottom section, said movable top section having a substantially flat bottom face for engaging the top face of said bottom section, said top section having channel portions formed therein for registry with the the channel portions of said bottom section to form a passage for conducting molten plastic to said injection nozzles for filling said recesses in said objects when said mold sections are engaged, said top section engaging said objects in said guideway and cooperating with said locating bar for holding said injection apertures in registry with said injection nozzles, and cam means on said top section for engaging said slide member in movement into closed position for moving said slide member towards said runner block for engaging said means thereon with said objects for holding them engaged with the side wall of said runner block.

28. A molding machine, comprising a mold formed of a stationary bottom and a movable top section, said bottom section having a plate formed with a substantially flat upper surface and a recess opening through the upper surface and extending between opposite sides thereof, a runner block mounted in said recess and extending between opposite sides thereof, with the upper face substantially flat and forming a continuation of the upper face of said plate, said runner block having a side wall opening into said recess and formed with a predetermined number of apertures providing injection nozzles arranged in uniformly spaced horizontal relation below said upper face, said apertures opening at the inner ends into channel portions formed in the upper face of said runner block, said side wall forming one side of a guideway opening through one side of said bottom section, a locating bar mounted for substantially vertical sliding movement in said recess along the side wall of said runner block with the upper edge formed to provide the bottom of said guideway in cooperation with said runner block, said locating bar being mounted in said recess for limited movement of the upper end thereof toward and from the side wall of said runner block, resilient means mounted in the recess in said plate engaging the side of said locating bar opposite said runner block for normally moving the upper end of said locating bar toward said runner block, means for limiting vertical sliding movement of said locating bar including resilient means normally moving said bar upwardly, a stop bar removably mounted in said recess below said locating bar for limiting downward movement in said recess for limiting the depth of said guideway to position a plurality of articles having a recess and an injection aperture in each with the injection aperture in each in position to register with an injection nozzle in said runner block, a slide bar extending between opposite sides of said plate slidably mounted in said recess for movement toward and from said locating bar and runner block on the side of said locating bar opposite to said runner block, resilient means normally moving said slide bar away from said runner block, a plurality of article engaging members mounted in said slide bar for limited movement and having one end of each resiliently projected toward said runner block, said article engaging members being mounted in spaced horizontally alined relation with said injection nozzles and equal in number to said nozzles for having the projecting ends engage and resiliently hold articles in said guideway in engagement with the side wall of said runner block when said injection apertures and nozzles are in registry, means mounted on said stationary mold section for retaining articles in said guideway against longitudinal movement, said movable mold section having a bottom face formed to match the upper face of said bottom section and formed with channel portions registering with the channel portions of said runner block in closed position, a cam bar mounted on said movable mold section for engaging the outer edge of said slide bar for moving it toward said runner block for engaging said article engaging members with said articles in the closed position of said mold sections, and means mounting said mold sections for movement into open and closed positions.

29. In a machine for making lock nuts, a mold formed of a stationary bottom and a movable top section, said bottom section having a plate formed with a substantially flat upper surface and a recess opening through the upper surface and extending between opposite sides thereof, a runner block mounted in said recess and extending between opposite sides thereof with the upper face substantially flat and forming a continuation of the upper face of said plate, said runner block having a side wall opening into said recess and formed with a predetermined number of apertures providing injection nozzles arranged in uniformly spaced horizontal relation below said upper face, said apertures opening at the inner ends into channel portions formed in the upper face of said runner block, said side wall forming one side of a guideway opening through one side of said bottom section, a locating bar mounted for limited vertical movement along the side wall of said runner block with the upper edge formed to provide the bottom of said guideway in cooperation with said runner block, said locating bar being mounted in said recess for limited movement of the upper end thereof toward and from the side wall of said runner block, resilient means mounted in the recess in said plate engaging the side of said locating bar opposite said runner block for normally moving the upper end of said locating bar toward said runner block, means for limiting vertical sliding movement of said locating bar including resilient means normally moving said bar upwardly, a stop bar removably mounted in said recess for limiting the depth of said guideway to position a plurality of nuts, having a recess and an injection aperture in each in position to register with an injection nozzle in said runner block, means for holding said nuts in said guideway against the side wall of said runner block, said movable top section having a bottom face formed to match the upper face of said bottom section and runner block and cooperating with said locating bar for holding said nuts with said injection nozzles and apertures in registry in the closed position thereof, and means mounting said mold sections for movement between open and closed positions.

30. In a machine for making lock nuts, a mold formed of a stationary bottom and a removable top section, said bottom section having a guideway for slidably receiving a plurality of nuts having a recess opening through one end and an injection aperture in one side, said movable top section having a plurality of mold pins, having the lower ends projecting below the bottom of the movable top section, a mold pin housing detachably mounted on said movable top section, the upper ends of said mold pins being slidably mounted in said pin housing for limited movement, resilient means in said housing normally moving said mold pins to their outer limit of movement in said housing, said mold pins being formed with mold sections on portions outside said housing for engaging in the openings in the central portions in said nuts for closing the inner portions of the recesses in said nuts, and said mold pins having the free ends extending below said mold sections formed with inclined terminal portions for engaging through the threaded bores of said nuts for locating said nuts in said guideway in cooperation with said mold sections for positioning said injection apertures to receive plastic for molding in the recesses in said nuts about said mold sections when said movable top section is moved into closed position with said bottom section.

31. A machine as claimed in claim 30, wherein said mold pins have the free ends of predetermined pins longer than other pins for progressively engaging and positioning said nuts in said guideway.

32. A machine as claimed in claim 29, wherein the locating bar is formed with a plurality of bores equal to the number of nuts in said guideway and alined with said injection nozzles, and the movable top section having a plurality of mold pins mounted thereon equal in number to said bores in said locating block and substantially alined therewith, each of said mold pins having one end projecting below the lower face of said movable top section and formed with a mold section to engage in the bore in a nut to define the inner portion of the recess in said nut and a tapered guide portion extending beyond said mold section for engaging in the bore of a nut and an alined bore in said locating bar for cooperation with the locating bar when the movable top section is moved into closed position for positioning said nuts in said guideway with the injection apertures in registry with said injection nozzles and said mold sections engaged in the bores in said nuts.

33. A machine as claimed in claim 17, wherein said movable mold section has an ejector plate mounted on the bottom of the movable mold section for movement into an advance position spaced below said movable mold section and a return position against the bottom of said movable mold section, said ejector plate being formed with said channel portions and having a portion extending over said guide channel cooperating with said locating bar, said mold pins having the upper ends mounted in said movable mold section and slidably extending through said ejector plate and formed with mold sections below said ejector plate in return position and the lower ends formed to engage in the bores of the nuts in said guideway in said stationary mold section and bores in said locating block for cooperation in positioning the nuts in said guideway with the injection apertures in registry with the injection nozzles in said runner block as the movable mold section is moved into closed position and engages said mold sections in the bores in said nuts, and means operated by said control means for moving said ejector plate to the advance position after the nuts in said guideway have had plastic molded in the recesses thereof and after said movable mold section has moved to the open position with the molded nuts on said mold pins, for pushing the nuts downwardly from said mold sections for delivery from the machine.

References Cited by the Examiner
UNITED STATES PATENTS

| | | | |
|---|---|---|---|
| 1,553,129 | 9/1925 | Bartlett | 264—267 |
| 2,504,751 | 4/1950 | Studle | 18—20 |
| 2,568,274 | 9/1951 | Clark | 264—267 |
| 2,677,149 | 5/1954 | Fineran | 264—267 X |
| 2,705,814 | 4/1955 | Feldmann | 18—36 |
| 2,878,515 | 3/1959 | Strauss | 18—30 |
| 2,932,081 | 4/1960 | Witte | 264—267 X |
| 2,937,428 | 4/1960 | Pocidalo | 18—20 X |
| 3,018,519 | 1/1962 | Morin et al. | 264—328 X |
| 3,191,246 | 6/1965 | Pouell | 18—36 |
| 3,202,749 | 8/1965 | White. | |

J. SPENCER OVERHOLSER, *Primary Examiner.*

ROBERT F. WHITE, *Examiner.*

J. A. FINLAYSON, W. L. McBAY, *Assistant Examiners.*